(12) United States Patent
Shin et al.

(10) Patent No.: US 11,737,055 B2
(45) Date of Patent: Aug. 22, 2023

(54) RESOURCE SELECTION METHOD AND APPARATUS FOR SIDELINK TRANSMISSION

(71) Applicant: Samsung Electronics Co., Ltd., Gyeonggi-do (KR)

(72) Inventors: Cheolkyu Shin, Gyeonggi-do (KR);
Jeongho Yeo, Gyeonggi-do (KR);
Taehyoung Kim, Gyeonggi-do (KR);
Jinyoung Oh, Gyeonggi-do (KR);
Hyunseok Ryu, Gyeonggi-do (KR);
Jonghyun Bang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 127 days.

(21) Appl. No.: 16/919,647

(22) Filed: Jul. 2, 2020

(65) Prior Publication Data

US 2021/0007081 A1    Jan. 7, 2021

(30) Foreign Application Priority Data

| Jul. 2, 2019 | (KR) | 10-2019-0079707 |
| Aug. 16, 2019 | (KR) | 10-2019-0100565 |
| Nov. 7, 2019 | (KR) | 10-2019-0142104 |

(51) Int. Cl.
*H04W 72/02* (2009.01)
*H04W 72/12* (2023.01)
*H04W 92/18* (2009.01)

(52) U.S. Cl.
CPC ....... *H04W 72/02* (2013.01); *H04W 72/1257* (2013.01); *H04W 92/18* (2013.01)

(58) Field of Classification Search
CPC . H04W 72/02; H04W 72/1257; H04W 92/18; H04W 4/46; H04W 72/048; H04L 5/0053
See application file for complete search history.

(56) References Cited

U.S. PATENT DOCUMENTS 11,057,870 B2 * 7/2021 Huang ................. H04W 72/02
2017/0331577 A1  11/2017 Parkvall et al.
(Continued)

OTHER PUBLICATIONS

3GPP TSG RAN WG1 Meeting #97; R1-1906799; Reno, USA, May 13-17, 2019; Source: Intel Corporation Title: Physical layer procedures for NR V2X sidelink communication (Year: 2019).*

(Continued)

*Primary Examiner* — Chi H Pham
*Assistant Examiner* — Weibin Huang
(74) *Attorney, Agent, or Firm* — The Farrell Law Firm, P.C.

(57) ABSTRACT

A method performed by a first user equipment includes identifying sidelink (SL) resource pool information, determining whether a hybrid automatic repeat request (HARQ) retransmission is configured based on the SL resource pool information, and selecting at least one resource for transmission of a physical sidelink shared channel (PSSCH) based on the determining that the HARQ retransmission is configured. The at least one resource is determined for ensuring a time gap, based on at least one of a period of resources configured for a physical sidelink feedback channel (PSFCH), an offset between a slot of a PSSCH transmission and a slot of a PSFCH reception, or a time required for reception and processing of the PSFCH plus a time required for SL retransmission preparation.

16 Claims, 24 Drawing Sheets

(56) References Cited

U.S. PATENT DOCUMENTS

| | | | | |
|---|---|---|---|---|
| 2020/0008183 A1* | 1/2020 | Chen | ................ | H04W 72/0446 |
| 2020/0099479 A1* | 3/2020 | Park | ....................... | H04W 4/70 |
| 2020/0169984 A1* | 5/2020 | Lee | .................. | H04W 72/0453 |
| 2021/0127383 A1* | 4/2021 | Hui | ....................... | H04W 72/10 |
| 2021/0377912 A1* | 12/2021 | El Hamss | ............. | H04L 1/1819 |
| 2021/0400681 A1* | 12/2021 | Wang | ................... | H04L 5/0053 |
| 2022/0070846 A1* | 3/2022 | Yang | .................... | H04L 5/0094 |
| 2022/0159624 A1* | 5/2022 | Ko | ....................... | H04L 1/0038 |

OTHER PUBLICATIONS

Intel Corporation, "Physical Layer Procedures for NR V2X Sidelink Communication", R1-1906799, 3GPP TSG RAN WG1 Meeting #97, May 13-17, 2019, 14 pages.

Vivo, "Discussion on Mode 1 Resource Allocation Mechanism", R1-1906138, 3GPP TSG RAN WG1 #97, May 13-17, 2019, 13 pages.

Ericsson, "Feature Lead Summary #2 on Resource Allocation for NR Sidelink. Mode 1", R1-1905834, 3GPP TSG-RAN WG1 Meeting 96bis, Apr. 8-12, 2019, 22 pages.

CATT, "Sidelink Physical Layer Structure in NR V2X", R1-1906314, 3GPP TSG RAN WG1 Meeting #97, May 13-17, 2019, 15 pages.

International Search Report dated Oct. 21, 2020 issued in counterpart application No. PCT/KR2020/008696, 10 pages.

Intel Corporation, "Sidelink Resource Allocation Mode-2 Design for NR V2X", R1-1906796, 3GPP TSG RAN WG1 Meeting #97, May 13-17, 2019, 18 pages.

Samsung, "On Sidelink Feedback Channel Format", R1-1906947, 3GPP TSG RAN WG1 #97, May 13-17, 2019, 6 pages.

LG Electronics, "Discussion on Physical Layer Procedures for NR Sidelink", R1-1907018, 3GPP TSG RAN WG1 Meeting #97, May 13-17, 2019, 11 pages.

Huawei, HiSilicon, "PSFCH Formats for NR V2X", R1-1905899, 3GPP TSG RAN WG1 Meeting #96bis, Apr. 8-12, 2019, 5 pages.

Fraunhofer HHI, Fraunhofer IIS, "Design of NR V2X Physical Layer Structures", R1-1906649, 3GPP TSG RAN WG1 #97, May 13-17, 2019, 10 pages.

European Search Report dated Jul. 19, 2022 issued in counterpart application No. 20834122.2-1206, 12 pages.

\* cited by examiner

FIG. 2
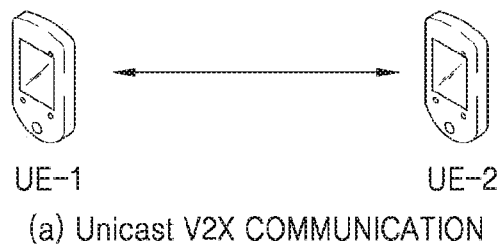
(a) Unicast V2X COMMUNICATION
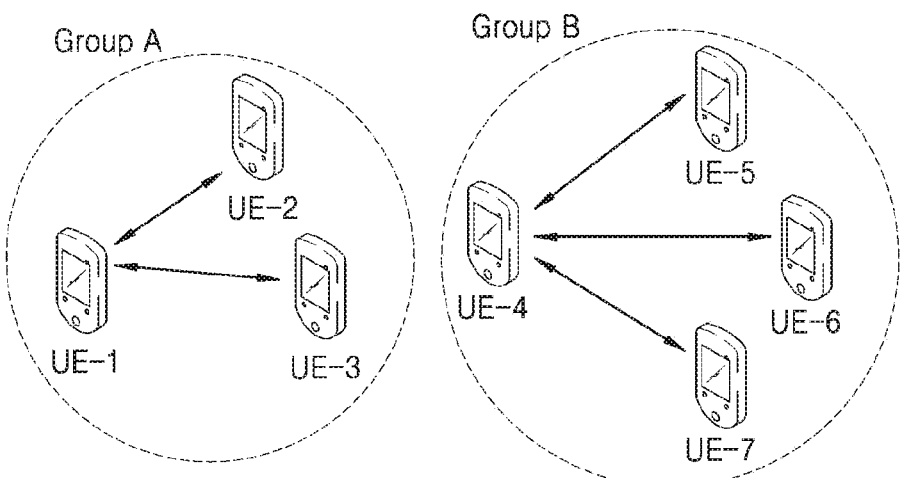
(b) Groupcast V2X COMMUNICATION

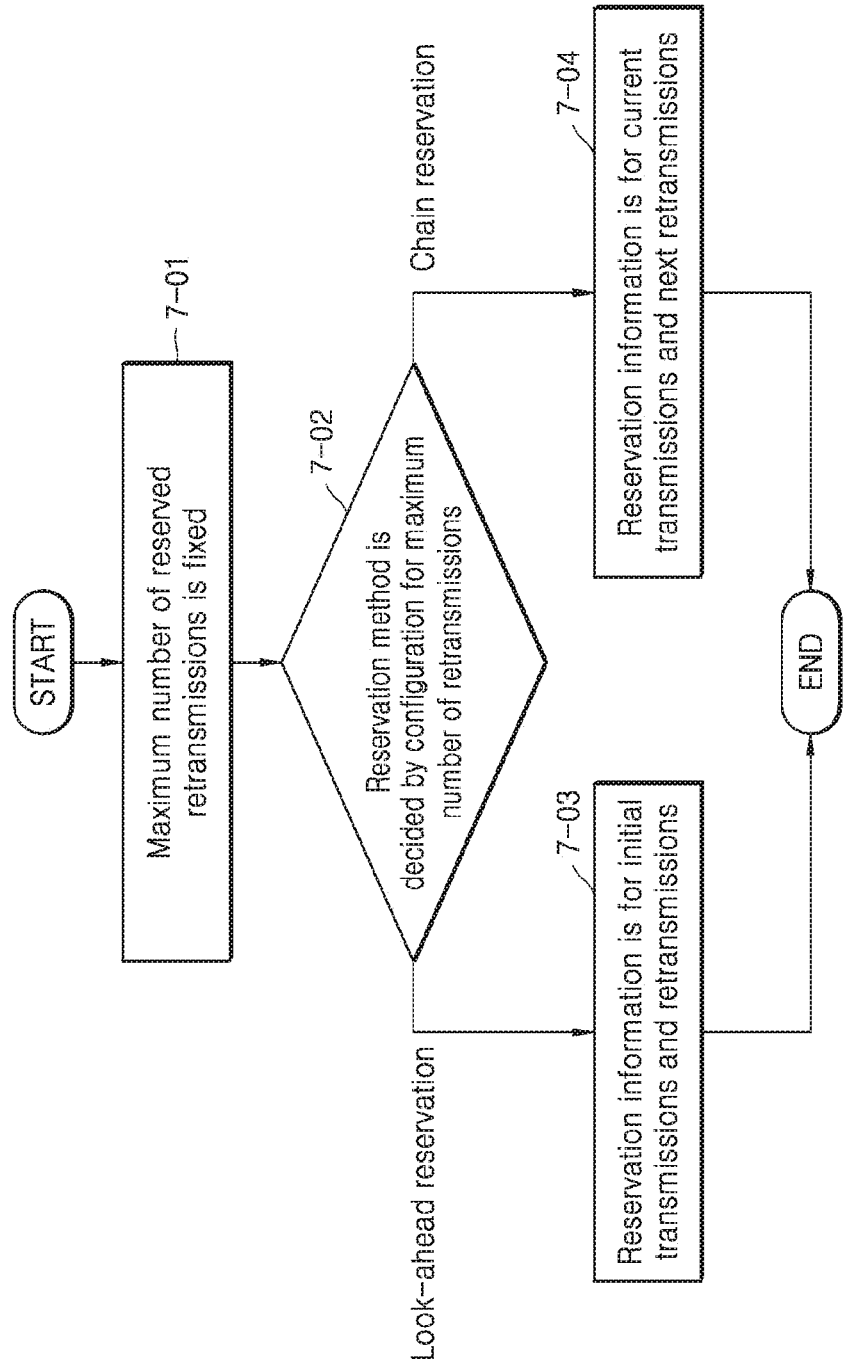

RESOURCE SELECTION METHOD AND APPARATUS FOR SIDELINK TRANSMISSION

CROSS-REFERENCE TO RELATED APPLICATION(S)

This application is based on and claims priority under 35 U.S.C. § 119 to Korean Patent Application No. 10-2019-0079707, filed on Jul. 2, 2019, Korean Patent Application No. 10-2019-0100565, filed on Aug. 16, 2019, and Korean Patent Application No. 10-2019-0142104, filed on Nov. 7, 2019, in the Korean Intellectual Property Office, the disclosures of each of which are incorporated by reference herein in their entirety.

BACKGROUND

1. Field

The present disclosure relates generally to a resource selection method and apparatus for sidelink transmission in a wireless communication system. More particularly, the present disclosure relates to a method and apparatus for selecting a resource when a vehicle supporting vehicle-to-everything (V2X) transmits and receives information to and from another user equipment (UE) by using sidelink (SL).

2. Description of Related Art

To meet the exploding increase in demand for wireless data traffic due to the commercialization of a 4th generation (4G) system and the increase of multimedia services, an improved 5th generation (5G) communication system or a pre-5G communication system is being developed. This is one reason why '5G communication systems' or 'pre-5G communication systems' are called 'beyond 4G network communication systems' or 'post long-term evolution (LTE) systems.'

In order to increase a data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, such as beamforming, massive multiple-input multiple-output (MIMO), full dimensional MIMO (FD-MIMO), array antennas, analog beam-forming, and large-scale antennas.

Also, in order to improve system network performance for 5G communication systems, various technologies have been developed, such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, such as hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved to the Internet of things (IoT), where distributed configurations, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc., have been studied. In the IoT environment, intelligent Internet technology services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

SUMMARY

The present disclosure has been made to address at least the disadvantages described above and to provide at least the advantages described below.

In accordance with an aspect of the present disclosure, a method, performed by a first UE, is provided. The method includes identifying SL resource pool information, determining whether a hybrid automatic repeat request (HARQ) retransmission is configured based on the SL resource pool information, and selecting at least one resource for transmission of a physical sidelink shared channel (PSSCH) based on the determining that the HARQ retransmission is configured. The at least one resource is determined for ensuring a time gap, based on at least one of a period of resources configured for a physical sidelink feedback channel (PSFCH), an offset between a slot of a PSSCH transmission and a slot of a PSFCH reception, or a time required for reception and processing of the PSFCH plus a time required for SL retransmission preparation.

In accordance with an aspect of the present disclosure, a first UE in a wireless communication system is provided. The UE includes a transceiver and a least one processor coupled with the transceiver. The at least one processor is configured to identify SL resource pool information, determine whether a HARQ retransmission is configured based on the SL resource pool information, and select at least one resource for transmission of a PSSCH based on the determining that the HARQ retransmission is configured. The at least one resource is determined for ensuring a time gap, based on at least one of a period of resources configured for a PSFCH, an offset between a slot of a PSSCH transmission and a slot of a PSFCH reception, or a time required for reception and processing of the PSFCH plus a time required for SL retransmission preparation.

In accordance with an aspect of the present disclosure, a method, performed by a second UE, is provided. The method includes identifying SL resource pool information, identifying at least one resource for a PSSCH based on the SL resource pool information, determining whether a HARQ retransmission is configured based on the SL resource pool information, and transmitting a PSFCH based on the determining that the HARQ retransmission is configured. The at least one resource is determined for ensuring a time gap, based on at least one of a period of resources configured for a PSFCH, an offset between a slot of a PSSCH transmission and a slot of a PSFCH reception, or a time required for reception and processing of the PSFCH plus a time required for SL retransmission preparation.

In accordance with an aspect of the present disclosure, a second UE in a wireless communication system is provided. The UE includes a transceiver and at least one processor coupled with the transceiver. The at least one processor is configured to identify SL resource pool information, identify at least one resource for a PSSCH based on the SL resource pool information, determine whether a HARQ retransmission is configured based on the SL resource pool information, and transmit a PSFCH based on the determining that the HARQ retransmission is configured. The at least one resource is determined for ensuring a time gap, based on at least one of a period of resources configured for a PSFCH, an offset between a slot of a PSSCH transmission and a slot of a PSFCH reception, or a time required for reception and processing of the PSFCH plus a time required for SL retransmission preparation.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 2 is a diagram of a V2X communication method performed via sidelink, according to an embodiment;

FIG. 7 is a flowchart of a method of reducing signaling overhead, according to an embodiment;

DETAILED DESCRIPTION

Figure 1:
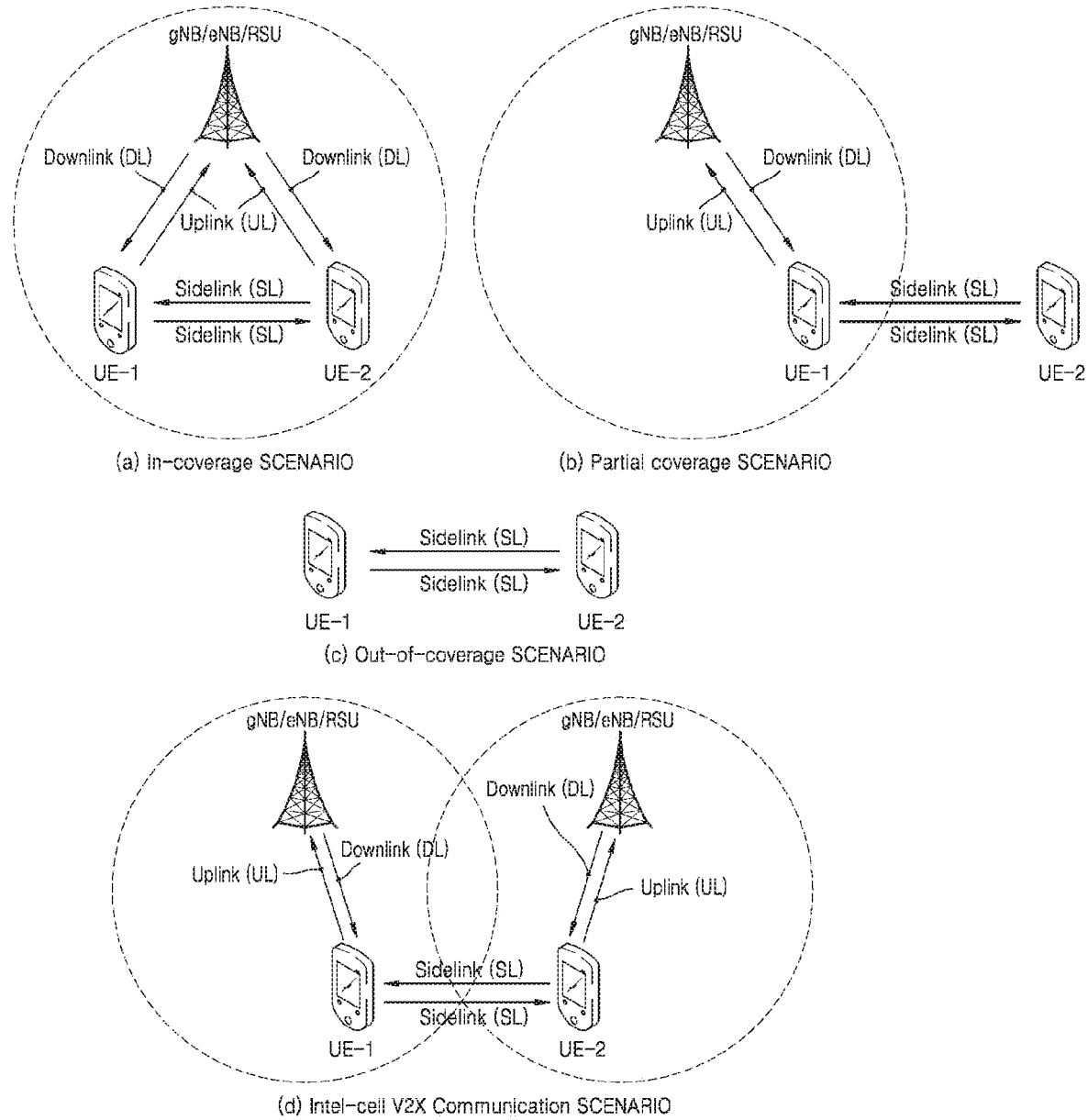
FIG. 1 is a diagram of a system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

Examples of a terminal may include a UE, a mobile station (MS), a cellular phone, a smartphone, a computer, a multimedia system capable of performing a communication function, or the like.

In the disclosure, a controller may also be referred to as a processor.

Throughout the disclosure, a layer (or a layer apparatus) may also be referred to as an entity.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" used in the embodiments of the disclosure means a software component or hardware component such as an FPGA or an ASIC, and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more CPUs in a device or security multimedia card. Also, in the embodiments, the "unit" may include at least one processor.

Embodiments of the disclosure will be described mainly based on a new radio access network (RAN) (new radio (NR)) on the 5G mobile communication standard specified by the $3^{rd}$ generation partnership project (3GPP) that is a standardization organization for mobile communication standards, and a packet core (e.g., 5G system, 5G core network, or next generation (NG) core) that is a core network. However, it will be understood to one of ordinary skill in the art that the main subject matter of the disclosure is applicable to other communication systems having a similar technical background, with a slight modification within a range that is not significantly outside the scope of the disclosure.

In the 5G system, a network data collection and analysis function (NWDAF) that is a network function for providing a function of analyzing and providing data collected in a 5G network may be defined to support network automation. NWDAF may provide results of collecting/storing/analyzing information from the 5G network to an unspecified network function (NF), and the analysis results may be independently used in each NF.

Hereinafter, for convenience of description, some terms and names defined by the 3GPP LTE standard (standard of 5G, NR, LTE, or similar systems) may be used. However, the disclosure is not limited by such terms and names, and may be equally applied to systems conforming to other standards.

Also, terms for identifying access nodes, terms denoting network entities, terms denoting messages, terms denoting interfaces between network entities, terms denoting various types of identification information, etc., used herein are exemplified for convenience of description. Thus, the terms used in the disclosure are not limited and other terms denoting targets having the same technical meanings may be used.

To meet the increase in demand for wireless data traffic after the commercialization of 4G communication systems, efforts have been made to develop improved 5G communication systems (or NR systems). To achieve a high data rate, 5G communication systems have been designed to support resources in a super-high frequency band (mmWave) (for example, a frequency band of 28 GHz). In order to reduce the path loss of radio waves in such a super-high frequency band and to increase a transmission distance of radio waves in 5G communication systems, various technologies have been discussed and are being studied, for example: beam-forming, massive MIMO, FD-MIMO, array antennas, analog beam-forming, and large-scale antennas. In addition, the 5G communication systems support various subcarrier spacings including 15 kHz, 30 kHz, 60 kHz, and 120 kHz unlike LTE, wherein a physical control channel uses polar coding and a physical data channel uses low density parity check (LDPC). Also, not only discrete Fourier transform spread orthogonal frequency division multiplexing (DFT-S-OFDM), but also cyclic prefix (CP)-OFDM is used as waveforms for uplink (UL) transmission. In LTE, HARQ retransmission in transport block (TB) units is supported, whereas in 5G, code block group (CBG)-based HARQ retransmission in which several CBs are grouped may be additionally supported.

In order to improve system networks for 5G communication systems, various technologies have been developed, e.g., evolved small cells, advanced small cells, Cloud-RAN, ultra-dense networks, D2D communication, wireless backhaul, V2X networks, cooperative communication, CoMP, and interference cancellation.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology. As such, a plurality of services may be provided to a user in a communication system, and a method for providing the plurality of services in the same time duration according to characteristics so as to provide the plurality of services to the user and an apparatus using the method are required. Various services provided in a 5G communication system have been studied and one of the services is a service satisfying requirements of low latency and high reliability.

In vehicle communication, standardization of LTE-based V2X in 3GPP Rel-14 and Rel-15 has been completed based on a D2D communication structure, and currently, attempts have been made to develop V2X based on 5G NR. In NR V2X, unicast communication between UEs, groupcast (or multicast) communication, or broadcast communication is to be supported. Also, unlike LTE V2X that aims at providing basic safety information transmission and reception required for driving of a vehicle, NR V2X aims at providing further advanced services, such as platooning, advanced driving, extended sensor, and remote driving.

In an existing LTE system-based SL, a HARQ feedback is not supported, and thus retransmission is necessarily performed regardless of whether reception regarding initial transmission is successful when SL performs the retransmission. Here, a method of performing retransmission without being based on HARQ feedback information is referred to as blind retransmission. On the other hand, in an NR system-based SL, a HARQ feedback may be supported in unicast and groupcast communication between UEs, and retransmission may be determined based on an ACK/NACK feedback result. In particular, the retransmission may occur only when NACK is fed back. Here, a method of performing retransmission based on a HARQ ACK/NACK feedback is referred to as HARQ feedback-based retransmission. In NR V2X, a method (Mode 1) by which a base station allocates a transmission resource of SL and a method (Mode 2) by which a UE directly allocates a transmission resource of SL via sensing are supported. In Mode 1, the base station may determine resource allocation for initial transmission and retransmission and transmit corresponding information to a transmission terminal via downlink control information (DCI). Upon receiving the DCI from the base station, the UE may allocate an SL resource based on the corresponding information and transmit the corresponding information by adding the corresponding information to SL control information (SCI). In Mode 1, resource allocation information included in DCI and SCI may be transmission time points of the initial transmission and retransmission and frequency allocation location information. On the other hand, in Mode 2, a UE may determine time and frequency resource allocation for initial transmission and retransmission via direct sensing and transmit corresponding information by adding the corresponding information to SCI. In Mode 2 as well, resource allocation information included in SCI may be transmission time point of initial transmission and retransmission and frequency allocation location information. In the existing LTE system-based SL, retransmission for TB was supported only up to two times. In particular, when retransmission is configured for one TB, initial transmission and one retransmission for the one TB is possible. However, in the NR system-based SL, not only are blind retransmission and HARQ feedback-based retransmission supported, but also the maximum number of retransmissions for one TB may be increased. A sensing operation of Mode 2 may be effectively used when the resource allocation information regarding the transmission time points and the frequency location information of initial transmission and retransmission are transmitted via SCI. In particular, the sensing operation of Mode 2 includes a process of performing SCI decoding on another UE. Here, after a transmission UE successfully decodes SCI transmitted by another UE, the other UE obtains SCI. Transmission time points of initial transmission and retransmission and frequency location information of the other UE may be obtained from the SCI of the other UE, and accordingly, the transmission UE may determine whether to select a corresponding resource as a transmission resource. Accordingly, when SCI includes both the transmission time points of initial transmission and retransmission and the frequency location information, performances of sensing and resource selection of Mode 2 may be improved. However, when the maximum number of retransmissions for one TB is increased, signaling overhead regarding the retransmission time points of initial transmission and retransmission and the frequency location information is unavoidable. Accordingly, a method simultaneously considering performance improvement of resource selection and signaling overhead included in DCI and SCI is required. Also, because blind retransmission is performed without a HARQ feedback, a constraint may not occur while determining transmission time points between initial transmission and retransmission. However, in the HARQ feedback-based retransmission, because transmission is performed based on an ACK/NACK feedback result, a method of selecting a transmission resource considering an ACK/NACK feedback and an available retransmission time point is required in determining the transmission time point between initial transmission and retransmission. In NR SL, not only a method by which a PSCCH and a PSSCH are multiplexed, but also a structure of PSCCH may be different from those in LTE SL. Accordingly, to perform sensing via SCI decoding in Mode 2, a method by which a UE monitors PSCCH of NR SL considering such differences is required.

As such, because not only blind retransmission but also HARQ feedback-based retransmission are supported in NR SL as HARQ ACK/NACK feedback is supported, the maximum number of retransmissions may also increase. Accordingly, a method that simultaneously considers an increase in signaling overhead related to resource allocation included in SCI, and SCI and a performance of resource selection is required. Also, a method of selecting a transmission resource considering ACK/NACK feedback and a retransmission time point according to the ACK/NACK feedback is required. Also, a method by which a UE monitors PSCCH of NR SL is required for SCI decoding during a sensing process of Mode 2. Accordingly, the disclosure considers a transmission scenario in SL and provides a resource selection method and apparatus for retransmission suitable for the transmission scenario. In addition, a signaling method for DCI and SCI is provided.

Embodiments of the disclosure are provided to support the above-described scenario and relate to a method and apparatus for selecting a transmission resource while a vehicle UE supporting V2X transmits and receives information to and from another vehicle UE and a pedestrian mobile UE by using SL. More particularly, provided are a resource selection criterion when a base station allocates a transmission resource in SL and when a UE directly allocates a SL transmission resource via sensing, and operation methods of the base station and UE therefor.

By providing a method of selecting a transmission resource in SL communication, resource selection considering initial transmission and retransmission may be effectively performed.

FIG. 1 is a diagram of a system, according to an embodiment.

Referring to FIG. 1, FIG. 1 (*a*) illustrates an example when all V2X UEs UE-1 and UE-2 are located within coverage of a base station (in-coverage (IC)).

The all V2X UEs UE-1 and UE-2 may receive data and control information from the base station via downlink (DL) or transmit data and control information to the base station via UL. Here, the data and control information may be data and control information for V2X communication. The data and control information may be data and control information for general cellular communication. Also, the V2X UEs UE-1 and UE-2 may transmit/receive the data and control information for V2X communication via SL.

FIG. 1 (b) illustrates an example when the V2X UE UE-1 among V2X UEs UE-1 and UE-2 is located within coverage of the base station and the V2X UE UE-2 is located outside the coverage of the base station. In other words, FIG. 1 (b) illustrates an example of partial coverage in which one V2X UE UE-2 is located outside coverage.

The V2X UE UE-1 located within the coverage of the base station may receive data and control information from the base station via DL or transmit data and control information to the base station via UL.

The V2X UE UE-2 located outside the coverage of the base station is unable to receive data and control information from the base station via DL and is unable to transmit data and control information to the base station via UL.

The V2X UE UE-2 may transmit/receive data and control information for V2X communication to/from the V2X UE UE-1 via SL.

FIG. 1 (c) illustrates an example when the all V2X UEs UE-1 and UE-2 are located outside coverage of a base station (out-of-coverage (OOC)).

Thus, The V2X UEs UE-1 and UE-2 are unable to receive data and control information from the base station via DL and unable to transmit data and control information to the base station via UL.

The V2X UEs UE-1 and UE-2 may transmit/receive data and control information for V2X communication via SL.

FIG. 1 (d) illustrates an example of a scenario of performing V2X communication between the V2X UEs UE-1 and UE-2 located in different cells. In particular, FIG. 1 (d) illustrates the V2X UEs UE-1 and UE-2 accessing different base stations (radio resource control (RRC) connected state) or are camped (RRC disconnected state, i.e., RRC idle state). Here, the V2X UE UE-1 may be a V2X transmission UE and the V2X UE UE2 may be a V2X reception UE. Alternatively, the V2X UE UE-1 may be a V2X reception UE and the V2X UE UE-2 may be a V2X transmission UE. The V2X UE UE-1 may receive a V2X dedicated system information block (SIB) from a base station to which the V2X UE UE-1 is accessed (or camped), and the V2X UE UE-2 may receive a V2X dedicated SIB from another base station to which the V2X UE UE-2 is accessed (or camped). Here, information of the V2X dedicated SIB received by the V2X UE UE-1 and information of the V2X dedicated SIB received by the V2X UE UE-2 may be different from each other. Accordingly, to perform V2X communication between the V2X UEs UE-1 and UE-2 located in different cells, information needs to be unified or parameter configuration may be further flexibly supported via a method and apparatus for configuring a related parameter.

In FIG. 1, a V2X system including the V2X UEs UE-1 and UE-2 is illustrated, but is not limited thereto and communication may be performed between more V2X UEs. Also, UL and DL between the base station and V2X UEs UE-1 and UE-2 may be referred to as a Uu interface and SL between the V2X UEs UE-1 and UE-1 may be referred to as a PC5 interface. Accordingly, UL and DL may also be referred to as a Uu interface and SL may also be referred to as a PC5 interface in the disclosure.

Meanwhile, a UE may denote a vehicle supporting vehicle-to-vehicle (V2V) communication, a vehicle or handset (for example, a smart phone) of a pedestrian supporting vehicle-to-pedestrian (V2P) communication, a vehicle supporting vehicle-to-network (V2N) communication, or a vehicle supporting vehicle-to-infrastructure (V2I) communication. Also, a UE may denote a road side unit (RSU) with a UE function, an RSU with a base station function, or an RSU with a part of a base station function and a part of a UE function.

Also, a base station may be a base station supporting both V2X communication and general cellular communication or a base station supporting only V2X communication. Also, here, the base station may denote a gNB, a 4G base station (eNB), or an RSU. Accordingly, in the disclosure, the base station may also be referred to as an RSU.

FIG. 2 is a diagram of a V2X communication method performed via SL, according to an embodiment. As shown in FIG. 2 (a), a transmission UE and a reception UE (i.e., a UE-1 and a UE-2) may perform communication in a one-to-one manner, which may be referred to as unicast communication.

As shown in FIG. 2 (b), a transmission UE and a reception UE may perform communication in a one-to-many manner, which may be referred to as groupcast or multicast communication.

In FIG. 2 (b), UE-1, UE-2, and UE-3 may form one group (i.e., group A) to perform groupcast communication and UE-4, UE-5, UE-6, and UE-7 may form another group (i.e., group B) to perform groupcast communication. Each UE may perform groupcast communication only within a group to which it belongs, and communication between different groups may be performed via unicast, groupcast, or broadcast communication. In FIG. 2 (b), two groups (i.e., group A and group B) are formed but the disclosure is not limited thereto.

Meanwhile, V2X UEs may perform broadcast communication. The broadcast communication indicates that all V2X UEs receive data and control information transmitted by a V2X transmission UE via SL. In FIG. 2 (b), when UE-1 is a transmission UE for broadcast communication, all UEs (UE-2 through UE-7) may receive data and control information transmitted by UE-1.

Unlike LTE V2X, in NR V2X, support in which a vehicle UE transmits data only to one specific node via unicast communication and to a plurality of specific nodes via groupcast communication may be considered. In a service scenario such as platooning (a technology of grouping and moving two or more vehicles in a form of a group by connecting the two or more vehicles via one network), such unicast and groupcast technologies may be useful. In particular, unicast communication may be required for a leader node of a group connected via platooning to control one specific node, and groupcast communication may be required for the leader node to simultaneously control groups including a plurality of specific nodes.

Figure 3:
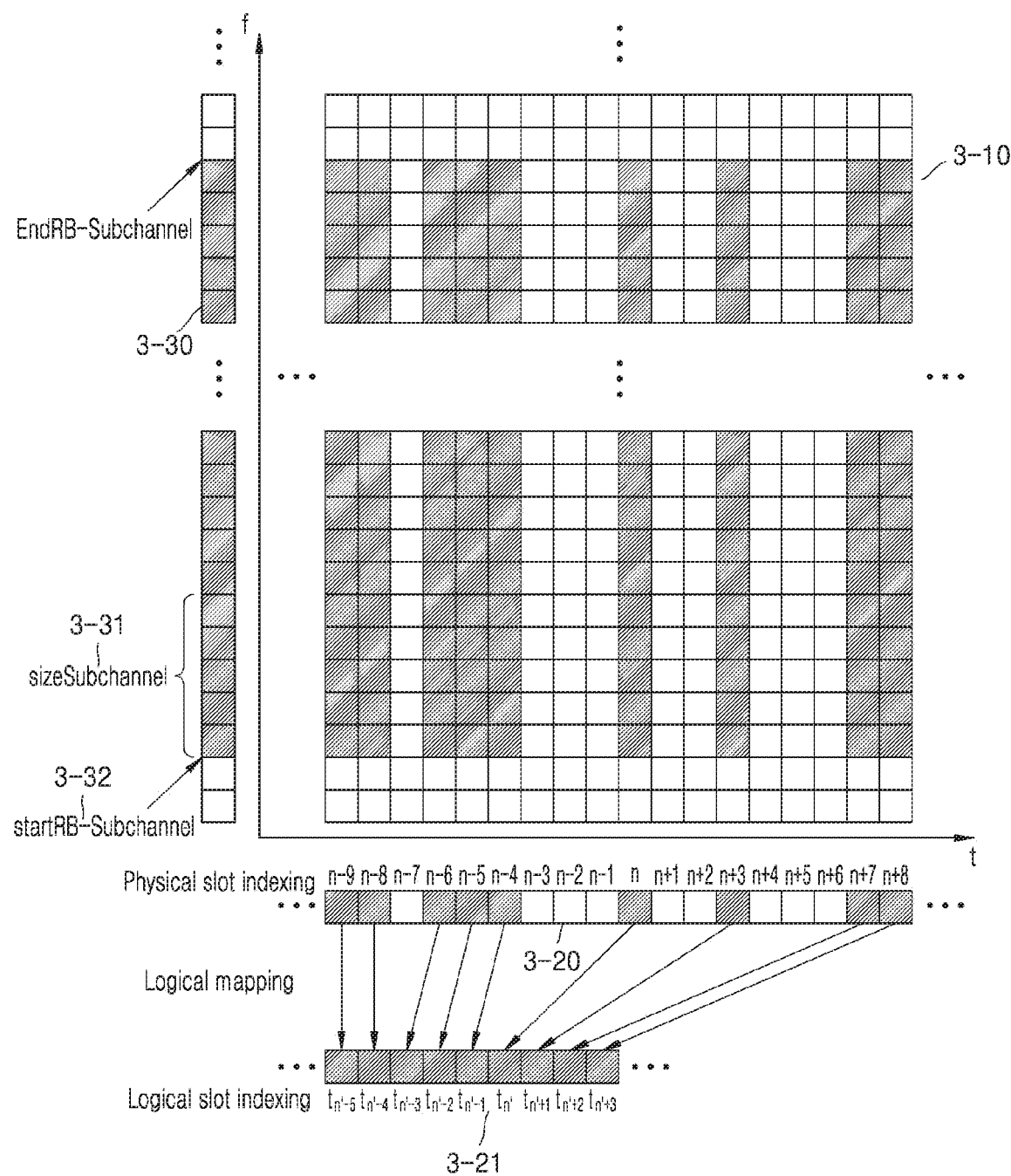
FIG. 3 is a diagram of a resource pool defined by a set (group) of resources on time and frequency used for transmission and reception of sidelink, according to an embodiment.

FIG. 3 is a diagram of a resource pool defined by a set (group) of resources on time and frequency used for transmission and reception of SL, according to an embodiment.

In the resource pool, a resource allocation unit of a time axis may be one or more OFDM symbols. Also, a resource allocation unit (resource granularity) of a frequency axis may be one or more physical resource blocks (PRBs).

In a case 3-10 where the resource pool is allocated on time and frequency, a shaded region indicates a region configured as the resource pool on time and frequency. In the disclosure, the resource pool is discontinuously allocated on time, but the resource pool may be continuously allocated on time. Also, in the disclosure, the resource pool is continuously allocated on frequency, but the resource pool may be discontinuously allocated on frequency.

Referring to FIG. 3, a case 3-20 where discontinuous resource allocation is performed on time is illustrated. Referring to FIG. 3, a case 3-30 where a unit (granularity) of resource allocation on time includes a slot is illustrated. In particular, one slot including 14 OFDM symbols may be a resource allocation base unit of a time axis. In FIG. 3, a shaded slot indicates a slot allocated as a resource pool on time and may be indicated as resource pool configuration information on time within SIB. In particular, a slot configured as a resource pool on time may be indicated via a bitmap. Referring to FIG. 3, a physical slot 3-20 belonging to a discontinuous resource pool on time may be mapped to a logical slot 3-21. Generally, a set (group) of slots belonging to a PSSCH resource pool may be indicated as $(t_0, t_1, \ldots, t_i, \ldots, tT_{max})$.

Referring to FIG. 3, the case 3-30 where the resource pool is continuously allocated on frequency is illustrated.

On a frequency axis, resource allocation may be performed in units of subchannels 3-31. The subchannel 3-31 may be defined as a resource allocation unit on frequency including one or more resource blocks (RBs). In other words, the subchannel 3-31 may be defined as multiples of integers. Referring to FIG. 3, in the subchannel 3-31, a subchannel size (sizeSubchannel) may include 5 continuous PRBs. The size of a subchannel may be differently set, and one subchannel generally includes continuous PRBs, but is not necessary. The subchannel 3-31 may be a base unit of resource allocation for PSSCH.

A startRB-Subchannel 3-32 may indicate a start location of the subchannel 3-31 on frequency in the resource pool. When resource allocation is performed in units of the subchannels 3-31 on the frequency axis, resource pool configuration on frequency may be performed via an RB index (startRB-Subchannel 3-32) where the subchannel 3-31 starts, information (sizeSubchannel) about the number of RBs included in the subchannel 3-31, and configuration information about the total number (numSubchannel) of the subchannels 3-31. startRB-Subchannel, sizeSubchannel, and numSubchannel may be indicated by frequency resource pool configuration information within SIB. In the disclosure, a UE being configured with related information via resource pool information may generally indicate that the related information is configured via system information from a base station. However, when the UE is unable to receive the system information from the base station as in OOC, resource pool-related information may be pre-configured. Here, the pre-configured resource pool-related information may be information pre-stored and configured in the UE or information that is configured when the UE accessed the base station previously. Also, when the UE receives SIB from the base station and then receives resource pool information via RRC after RRC connection is established with the base station, the resource pool information configured via RRC may overwrite information received via SIB. In other words, the resource pool information may be updated via RRC.

Figure 4:
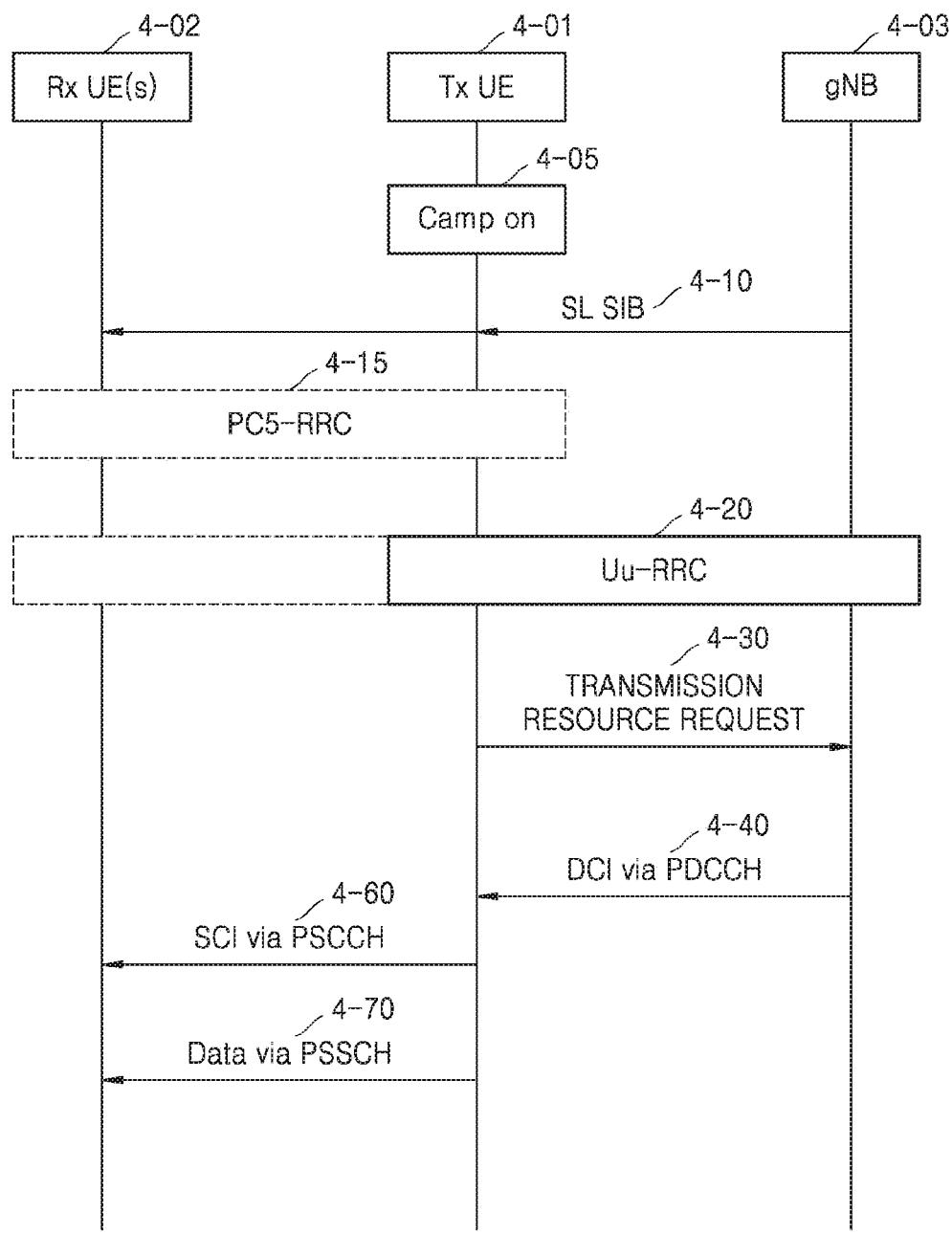
FIG. 4 is a diagram of a method, performed by a next generation Node B (gNB), of allocating a transmission resource in sidelink, according to an embodiment.

FIG. 4 is a diagram of a method, performed by a gNB 4-03, of allocating a transmission resource in SL, according to an embodiment.

The method, performed by the gNB 4-03 of allocating a transmission resource in SL will now be referred to as Mode 1. Mode 1 may be scheduled resource allocation. Mode 1 may indicate a method, performed by the gNB 4-03, of allocating a resource used for SL transmission to RRC-connected UEs via a dedicated scheduling method. In the method of Mode 1, because the gNB 4-03 can manage a resource of SL, interference and resource pool may be effectively managed.

Referring to FIG. 4, a transmission UE 4-01 that is camped on at step 4-05 and a reception UE 4-02 may receive, from the gNB 4-03, SL SIB at step 4-10. Here, the reception UE 4-02 is a UE that receives data transmitted by the transmission UE 4-01. SL SIB may include SL resource pool information for SL transmission and reception, parameter configuration information for a sensing operation, information for configuring SL synchronization, or carrier information for SL transmission and reception operating in different frequencies. When data traffic for V2X is generated in the transmission UE 4-01, the transmission UE 4-01 may be RRC-connected with the gNB 4-03, at step 4-20. Here, RRC connection between the transmission UE 4-01 and the gNB 4-03 may be referred to as Uu-RRC. Step 4-20 (Uu-RRC connection procedure) may be performed before the data traffic of the transmission UE 4-01 is generated. Also, in Mode 1, the transmission UE 4-01 may perform transmission to the reception UE 4-02 via SL after step 4-20 is performed. Alternatively, in Mode 1, the transmission UE 4-01 may perform transmission to the reception UE 4-02 via SL even when step 4-20 is not performed. The transmission UE 4-01 may request the gNB 4-03 for a transmission resource capable of V2X communication with the reception UE 4-02, at step 4-30. Here, the transmission UE 4-01 may request the gNB 4-03 for SL transmission resource by using physical UL control channel (PUCCH), an RRC message, or a media access control (MAC) control element (CE). Meanwhile, MAC CE may be a buffer status report (BSR) MAC CE of a new format (including an indicator indicating a BSR for at least V2X communication and information about a size of data buffered for D2D communication). Also, an SL resource may be requested via a scheduling request (SR) bit transmitted via PUCCH. The gNB 4-03 may allocate a V2X transmission resource to the transmission UE 4-01 via a dedicated Uu-RRC message. The dedicated Uu-RRC message may be included in a message (e.g., RRCConnectionReconfiguration) for reconfiguring parameter information regarding RRC connection configuration. Information requesting for resource allocation may include a resource allocation request for V2X or PC5 via Uu depending on a type of traffic requested by the transmission UE 4-01 or congestion of a corresponding link. To determine the resource allocation request, the transmission UE 4-01 may additionally transmit UE assistance information or, via MAC CE, proximity service (ProSe) per packet priority (PPPP) of V2X traffic or logical channel identification (LCID) information. The gNB 4-03 may indicate the transmission UE 4-01 for final scheduling for SL communication with the reception UE 4-02 by transmitting DCI via a physical DL control channel (PDCCH), at step 4-40. SL scheduling information included in the DCI may include parameters related to transmission time points of initial transmission and retransmission and a frequency allocation location information field.

Next, in a case of broadcast transmission, the transmission UE 4-01 may broadcast SCI to the reception UE 4-02 via PSCCH, at step 4-60, without having to perform additional RRC connection of SL at step 4-15. Also, the transmission UE 4-01 may broadcast data to the reception UE 4-02 via PSSCH, at step 4-70.

On the other hand, in a case of unicast or groupcast transmission, the transmission UE 4-01 may perform RRC connection with other UEs in a one-to-one manner, at step 4-15. Here, such RRC connection may be referred to as PC5-RRC to be distinguished from Uu-RRC. In groupcast as well, UEs in one group may be individually connected at step 4-15. Referring to FIG. 4, step 4-15 is performed after step 4-10, but step 4-15 may be performed at any time before step 4-10 or step 4-60. When RRC connection is required between UEs, PC5-RRC connection of SL may be performed and SCI may be transmitted to the reception UE 4-02 via PSCCH using unicast or groupcast, at step 4-60. Here, groupcast transmission of SCI may be referred to as group SCI. Also, the transmission UE 4-01 may transmit the data to the reception UE 4-02 via PSSCH using unicast or groupcast at step 4-70. In Mode 1, the transmission UE 4-01 may interpret SL scheduling information included in the DCI received from the gNB 4-03, perform scheduling on SL via the SL scheduling information, and transmit following scheduling information with SCI: transmission time points of initial transmission and retransmission and frequency allocation location information field; new data indicator (NDI) field; redundancy version (RV) field; and an information field indicating reservation interval.

The information field indicating the reservation interval is indicated in one value in which an interval between TBs is fixed during resource selection for a plurality of TBs (a plurality of MAC protocol data units (PDUs)), and '0' may be indicated as the value when a resource is selected only for one TB.

Figure 5:
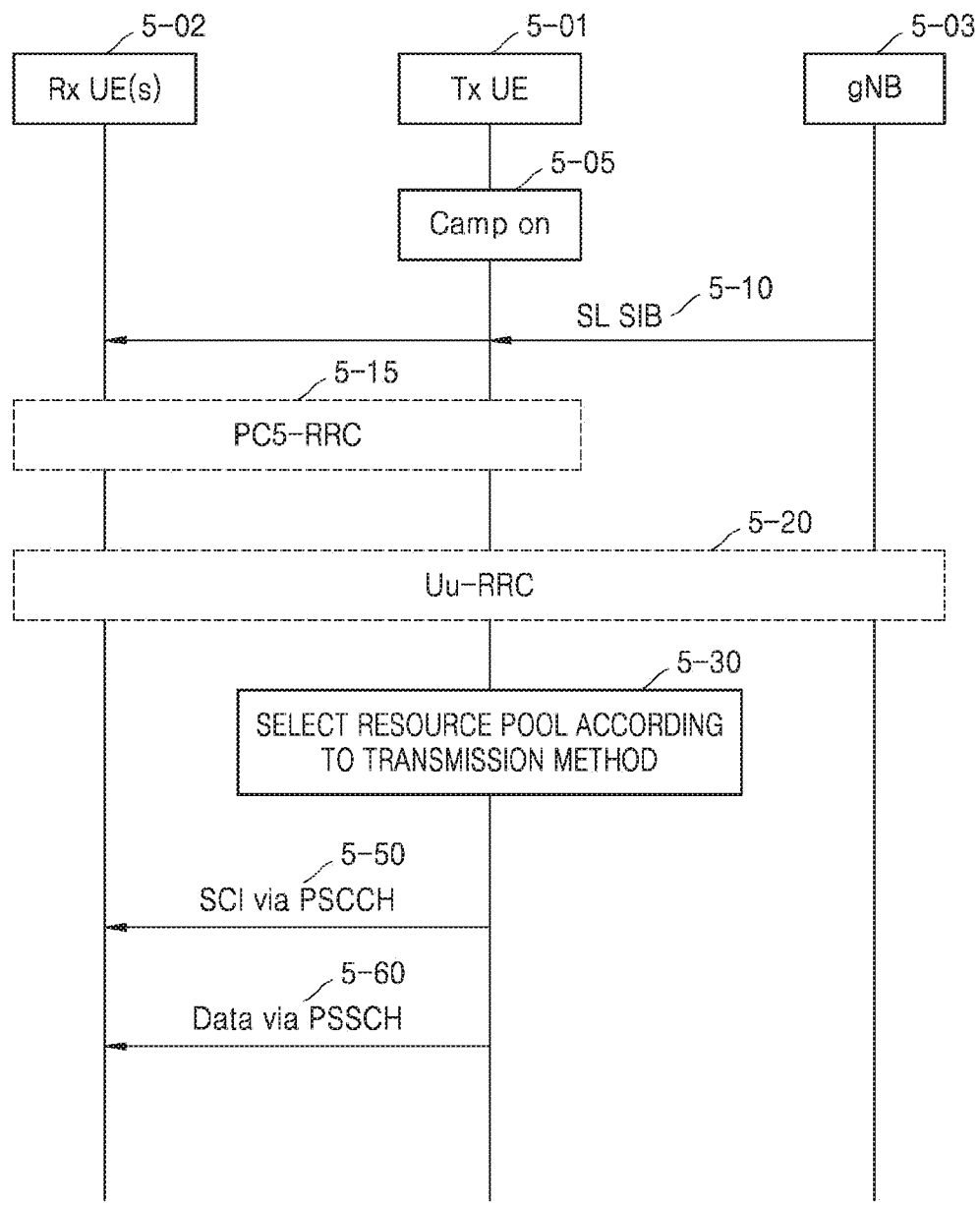
FIG. 5 is a diagram of a method, performed by a UE, of directly allocating a transmission resource of sidelink by sensing in sidelink, according to an embodiment.

FIG. 5 is a diagram of a method, performed by a UE, of directly allocating a transmission resource of SL via sensing in SL, according to an embodiment.

Hereinafter, the method by which a UE directly assigns a transmission resource of SL via sensing in SL will be referred to as Mode 2. Mode 2 may be referred to as UE autonomous resource selection.

In Mode 2, a gNB 5-03 may provide an SL transmission and reception resource pool for V2X as system information and a transmission UE 5-01 may select a transmission resource according to a determined rule. Unlike Mode 1 where the gNB 4-03 directly participates in resource allocation, the transmission UE 5-01 autonomously selects a resource based on a resource pool pre-received via system information and transmits data in FIG. 5.

Referring to FIG. 5, the transmission UE 5-01 that is camped on at step 5-05 and a reception UE 5-02 may receive SL SIB from the gNB 5-03, at step 5-10. Here, the reception UE 5-02 is a UE that receives data transmitted by the transmission UE 5-01. SL SIB may include SL resource pool information for SL transmission and reception, parameter configuration information for a sensing operation, information for configuring SL synchronization, or carrier information for SL transmission and reception operating in different frequencies. A difference between steps of FIGS. 4 and 5 is that in FIG. 4, the gNB 4-03 and the transmission UE 4-01 operate while being RRC-connected whereas in FIG. 5, the gNB 5-03 and the transmission UE 5-01 may operate at step 5-20 in an idle mode in which RRC is not connected. At step 5-20, even when RRC is connected, the gNB 5-03 may not directly participate in resource allocation and the transmission UE 5-01 may autonomously select the transmission resource. Here, the RRC connection between the transmission UE 5-01 and the gNB 5-03 will be referred to as Uu-RRC. When data traffic for V2X is generated in the transmission UE 5-01, the transmission UE 5-01 is configured with a resource pool via the system information received from the gNB 5-03 and may select a time/frequency domain resource according to a transmission operation configured in the configured resource pool, at step 5-30.

Next, in a case of broadcast transmission, the transmission UE 5-01 may broadcast SCI to the reception UE 5-02 via PSCCH, at step 5-50, without having to perform additional RRC connection of SL at step 5-20. Also, data may be broadcasted to the reception UE 5-02 via PSSCH, at step 5-60.

On the other hand, in a case of unicast or groupcast transmission, the transmission UE 5-01 may perform RRC connection with other UEs in an one-to-one manner. Here, such RRC connection may be referred to as PC5-RRC to be distinguished from Uu-RRC. In groupcast as well, UEs in one group may be individually connected via PC5-RRC at step 5-15. In FIG. 5, step 5-15 is performed after step 5-10, but step 5-15 may be performed at any time before step 5-10 or 5-50. When RRC connection is required between UEs, PC5-RRC connection of SL may be performed at step 5-15 and SCI may be transmitted to the reception UE 5-02 via PSCCH using unicast or groupcast, at step 5-50. Here, groupcast transmission of SCI may be referred to as group SCI. Also, the data may be transmitted to the reception UE 5-02 via PSSCH using unicast or groupcast at step 5-60. In Mode 2, the transmission UE 5-01 may directly perform scheduling on SL by performing sensing and transmission resource selection, and may transmit following scheduling information added to SCI: transmission time points of initial transmission and retransmission and frequency allocation location information field; NDI field; RV field; and an information field indicating reservation interval.

The information field indicating the reservation interval is indicated in one value in which an interval between TBs is fixed during resource selection for a plurality of TBs (a plurality of MAC PDUs), and '0' may be indicated as the value when a resource is selected only for one TB.

A resource selection criterion and operating methods of a base station and UE with respect to a case (Mode 1) where a base station allocates a transmission resource in SL and a case (Mode 2) where a UE directly allocates an SL transmission resource via sensing will be described in detail via specific examples described below.

Example 1

In Example 1, a method of simultaneously considering signaling overhead regarding resource allocation information, which may occur due to an increased number of retransmissions in NR SL, and performance of resource selection is provided. First, a retransmission method includes a blind retransmission method in which retransmission is performed without based on HARQ feedback information. Alternatively, there is a HARQ feedback-based retransmission method that is a method of performing retransmission based on a HARQ ACK/NACK feedback. In particular, the blind retransmission method may necessarily perform retransmission regardless of whether reception regarding initial transmission is successful. However, in the HARQ feedback-based retransmission method, it may be determined whether to perform retransmission based on an ACK/NACK feedback result transmitted from a reception UE to a transmission UE. When the HARQ feedback-based retransmission method is used, the reception UE may not transmit the ACK/NACK feedback to the transmission UE when retransmission corresponds to a configured maximum number of retransmissions. Because not only blind retransmission but also HARQ feedback-based retransmission are supported in NR SL as HARQ ACK/NACK feedback is supported, the maximum number of retransmissions may also increase. Table 1 below illustrates an example of the maximum number of retransmissions and the number of resource reservations, which may be considered for blind retransmission (Case 1) and HARQ feedback-based retransmission (Case 2).

TABLE 1

| | Blind retransmissions (Case 1) | | | |
|---|---|---|---|---|
| | Case 1-1 | Case 1-2 | Case 1-3 | Case 1-4 |
| Maximum number of retransmissions supported for one TB | 4 | 4 | 4 | 2 |
| Maximum number of reserved retransmission | 4 | 2 | 2 | 2 |
| | HARQ feedback-based retransmissions (Case 2) | | | |
| | Case 2-1 | Case 2-2 | Case 2-3 | Case 2-4 |
| Maximum number of retransmissions supported for one TB | 4 | 4 | 4 | 2 |
| Maximum number of reserved retransmission | 4 | 2 | 4 | 2 |

In Table 1, compared with cases (Case 1-4 and Case 2-4) where the maximum number of retransmissions is 2, and cases (Case 1-1, Case 2-1, and Case 2-3) where a resource is reserved and transmitted considering the maximum number of retransmissions 4 when the maximum number of retransmissions is increased to 4, some cases may have increased overhead for DCI and SCI when corresponding resource allocation information is included in DCI and SCI.

Figure 6:
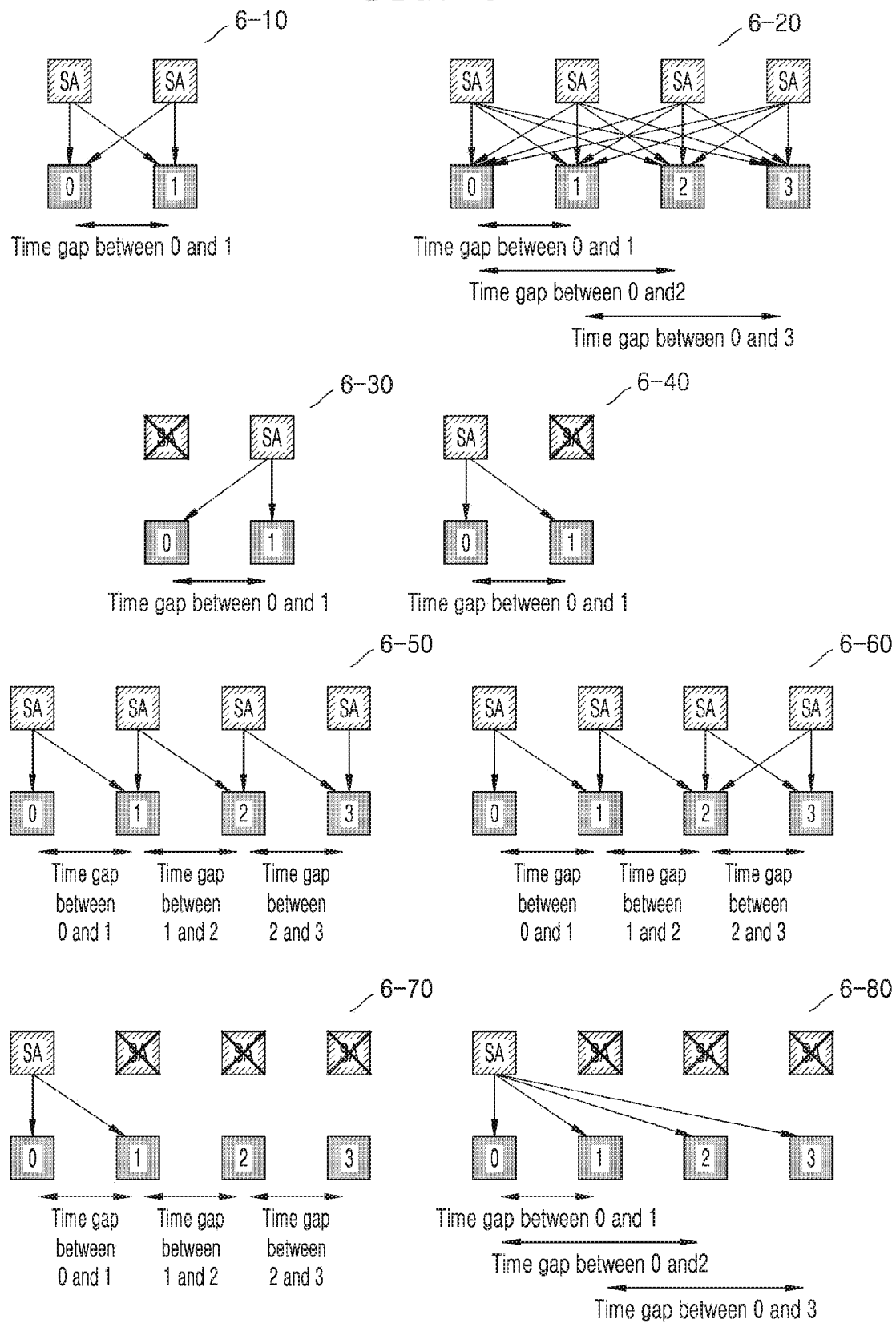
FIG. 6 is a diagram of resource allocation information related to a time gap between initial transmission and retransmission, according to an embodiment.

FIG. 6 is a diagram of resource allocation information related to a time gap between initial transmission and retransmission, according to an embodiment. FIG. 7 is a flowchart of a method of reducing signaling overhead, according to an embodiment.

In particular, referring to FIG. 6, resource allocation information indicating a time gap between initial transmission and retransmission is illustrated in terms of an information field. However, reservation information regarding resource allocation may include both transmission time points of initial transmission and retransmission and frequency allocation location information. In FIG. 6, scheduling assignment (SA) denotes that a UE indicates information about resource allocation and may be referred to as an operation in which the UE signals the resource allocation information to SCI via PSCCH in SL. Referring to FIG. 6, a case 6-10 in which the number of resource reservations is 2 when the maximum number of retransmissions is 2 (e.g., Case 1-4 and Case 2-4 of Table 1). Here, SA may indicate a transmission time point between initial transmission and retransmission via one time gap. Also, when the maximum number of retransmissions is 4 (e.g., Case 1-1, Case 2-1, and Case 2-3 of Table 1), the number of resource reservations may be 4 (case 6-20). In this case, SA may indicate a transmission time point between initial transmission and retransmission via three time gaps. As such, a method of signaling the transmission time points of initial transmission and retransmission and the frequency allocation location information via DCI and SCI after resource selection regarding the initial transmission and retransmission may be referred to as a look-ahead reservation method. In the look-ahead reservation method, sensing and resource selection performances for Mode 2 may be improved. The sensing for Mode 2 may be defined as an operation of performing SCI decoding on another UE and an operation of performing SL measurement. A method, performed by a UE, of monitoring PSCCH for SCI decoding will be described with reference to Example 2 described below. Also, a detailed operation of selecting a resource by performing sensing in Mode 2 will be described with reference to Example 3-7 described below. When SCI includes both the transmission time points of initial transmission and retransmission and the frequency allocation location information, even when one of two SAs were unable to be successfully received and decoded (cases 6-30 and 6-40) at the transmission time points of the initial transmission and retransmission, the transmission time points between the initial transmission and retransmission may be verified by using one of the SAs. Also, a transmission UE may determine whether it is possible to use, as a transmission resource, a resource of initial transmission and retransmission occupied by another UE via a result of SL measurement. However, referring to the case 6-20 of FIG. 6 and step 7-03 of FIG. 7, when the look-ahead reservation method is used, the maximum number of retransmissions and the number of times a resource is reserved (step 7-02 of FIG. 7) and transmitted are increased, and thus overhead for signaling the transmission time points of initial transmission and retransmission and the frequency allocation location information are increased.

Referring to step 7-04 of FIG. 7, a chain reservation method may be considered to prevent such signaling overhead. Referring to cases 6-50 through 6-70 of FIG. 6, an example of a chain reservation method is illustrated. In Table 1 above, in the cases (Case 1-2, Case 2-2, and Case 1-3) where the number of times the resource is reserved and transmitted is limited to 2 when the maximum number of retransmissions is increased to 4, the resource allocation information included in DCI and SCI may be decreased. In particular, the chain reservation method is a method (case 6-50) of signaling all of transmission time points of current transmission and next retransmission and frequency allocation location information via DCI and SCI after resource selection for initial transmission and retransmission. However, unlike in the case 6-50 of FIG. 6, an interpretation of a time gap field may vary depending on a time point when SA is indicated in the chain reservation method. In the case 6-50 of FIG. 6, SA at the last retransmission time point is illustrated as indicating only the resource allocation information for the current time point. However, considering that the number of resource reservations is supported up to 2, a method of indicating resource allocation information for a previous retransmission time point may be considered at the last retransmission time point. Referring to the case 6-60 of FIG. 6, resource allocation information for current and next retransmissions are indicated at initial transmission and intermediate retransmission time points, but resource allocation information for current and previous retransmission time points may be indicated at the last retransmission time point. However, in the chain reservation method, performances of sensing and resource selection for Mode 2 may deteriorate compared to the look-ahead reservation method. Referring to the case 6-70 of FIG. 6, information about third and fourth retransmission time points is unable to be determined when only SA for initial transmission is successfully decoded and SA indicated at second, third, and fourth retransmission time points are not all successfully received and decoded in the chain reservation method. However, when the retransmission is performed two times or more. The time gap may not be uniform based on a physical slot index when resources on time allocated to a resource pool is not continuous as shown in Table 2. Table 2 is an example of a case where initial transmission occurs in a slot n and a time gap is configured as 4 slots. As shown in Table 2, a corresponding resource may be transmitted from a first transmittable slot among time resources allocated to a resource pool, when the corresponding slot is a slot that is not transmittable to PSSCH after 4 slots. To maintain the uniform time gap, the time gap selected for the initial transmission and first retransmission may be identically applied for remaining retransmissions.

TABLE 2

| | Logical slot index (Resource pool configuration) | | | | | | | | | |
|---|---|---|---|---|---|---|---|---|---|---|
| | 1 | 2 | 3 | 4 | 5 | 6 | 7 | 8 | 9 | 10 |
| Physical slot index | n | n+1 | n+2 | n+3 | n+4 n+5 n+6 n+7 n+8 | n+9 n+10 n+11 n+12 n+13 n+14 | n+15 | n+16 | n+17 | n+18 | n+19 |
| Possibility to transmit PSSCH | ○ | X | ○ | ○ | ○ X X X X | ○ X X X X X | ○ | ○ | ○ | ○ | ○ |
| Possibility to Transmit PSFCH | Inti-TX | | | Re-TX1 | | Re-TX2 | | Re-TX3 | | | Re-TX4 | referring to a case 6-80 of FIG. 6, information about all transmission time points may be determined from SA for initial transmission even when only SA for initial transmission is successfully decoded and SA indicated at second, third, and fourth retransmission time points are not all successfully received and decoded in the look-ahead reservation method.

In the above, the overhead occurred when the signaling is performed for the resource allocation information by using the look-ahead reservation method according to an increase of the maximum number of retransmissions and the number of resource reservations has been described. Also, it has been described that performance of the sensing and resource selection may deteriorate in Mode 2 when the chain reservation method is used to prevent the signaling overhead. First, the disclosure may provide a method of preventing the signaling overhead for the resource allocation information when the look-ahead reservation method is used. As described above, the reservation information regarding resource allocation may include the transmission time points of initial transmission and retransmission and the frequency allocation location information. In the look-ahead reservation method, the following methods may be used to reduce the signaling overhead for the resource allocation information:

(1) A frequency allocation location selected for initial transmission may be identically applied to all retransmissions and only frequency allocation location information regarding initial transmission may be signaled;

(2) A retransmission resource is allocated such that a uniform time gap is maintained on time between initial transmission and retransmission, and only one piece of fixed time gap information may be signaled. The retransmission resource may be allocated such that the uniform time gap on time is maintained even on time between all retransmissions A combination of the look-ahead reservation method and the chain reservation method may be used to prevent the overhead occurring when the signaling regarding the resource allocation information is performed by using the look-ahead reservation method according to the increase in the maximum number of retransmissions and the number of resource reservations. As described above, the reservation information regarding resource allocation may include the transmission time points of initial transmission and retransmission and the frequency allocation location information. The following methods may be used to reduce the signaling overhead regarding the resource allocation information by combining the look-ahead reservation method and the chain reservation method:

(1) The maximum number of resource reservations for retransmission is fixed to 1. The fixed maximum number of resource reservations is not limited. However, overhead of signaling resource allocation information may increase when the number of resource reservations is increased. Accordingly, the maximum number of resource reservations of retransmission may be configured to 2 as an appropriate value including only initial transmission and one retransmission.

(2) The maximum number of retransmissions is configurable. The configurable maximum number of retransmissions may not be limited. When the configurable maximum number of retransmissions is 2, a set (A, B) may be represented. When the configurable maximum number of retransmissions is 3, a set (A, B, C) may be represented. When the configurable maximum number of retransmissions is 2, a set (A, B)=(2, 4) may be configured as an appropriate value. The maximum number of retransmissions may be configured via SL SIB. In particular, the maximum number of retransmissions may be configured for resource pool configuration in SIB. When the maximum number of retransmissions is configured in a resource pool, it may be understood that UEs operating in the resource pool are configured with the same maximum number of retransmissions. On the other hand, the maximum number of retransmissions may be further dynamically configured via DCI and SCI. In this case, the maximum number of retransmissions of UEs operating in the same resource pool may be differently configured. In Mode 1, a base station may determine configuration of the maximum number of retransmissions via DCI and a transmission UE may signal the configuration of maximum number of retransmissions to another UE via SCI. In Mode 2, a UE may directly determine configuration of the maximum number of retransmissions and indicate the configuration of maximum number of retransmissions via SCI. When the maximum number of retransmissions is configured via SCI, it is possible for a transmission UE to decode SCI and determine the maximum number of retransmissions of another UE during a sensing operation of Mode 2.

(3) It may be determined whether to use the look-ahead reservation method or the chain reservation method depending on the configured maximum number of retransmissions. The look-ahead reservation method may be used when the maximum number of retransmissions is determined and configured as a set (A,B)=(2, 4) and the maximum number of retransmissions is configured as 2. Then, a respective resource allocation configuration signaling interpretation may be used. In this case, the following information may be included in DCI for resource allocation configuration: frequency start location information field regarding initial transmission; length of allocated subchannel and frequency start location information field regarding retransmission; and an information field indicating time gap between initial transmission and retransmission. In this case, the following information may be included in SCI for resource allocation configuration: length of allocated subchannel and frequency start location information field regarding retransmission and previous transmission; and an information field indicating time gap between initial transmission and retransmission. The chain reservation method may be used when the maximum number of retransmissions is determined and configured as a set (A,B)=(2, 4) and the maximum number of retransmissions is configured as 4. Then, a respective resource allocation configuration signaling interpretation may be used. In this case, the following information may be included in DCI for resource allocation configuration: frequency start location information field regarding current transmission (may be initial transmission or retransmission); length of allocated subchannel and frequency start location information field regarding next retransmission; and an information field indicating time gap between current transmission (may be initial transmission or retransmission) and next retransmission. In this case, the following information may be included in SCI for resource allocation configuration: length of allocated subchannel and frequency start location information field regarding next retransmission (only resource allocation information regarding current time point may be included as in case 6-50 of FIG. 6 at last retransmission time point. Alternatively, resource allocation information regarding current time point and previous retransmission time point may be included as in case 6-60 of FIG. 6 at last retransmission time point); and an information field indicating time gap between current transmission (may be initial transmission or retransmission) and next retransmission In the above, a resource allocation configuration signaling interpretation method when a resource is reserved for retransmission has been described. When a resource is not reserved for retransmission but only a resource for initial transmission is present, only resource allocation information for the initial transmission may be signaled. A method of including resource allocation information in SCI will be described in detail below with reference to Example 2.

In particular, a method of reducing signaling overhead regarding resource allocation information by combining the look-ahead reservation method and the chain reservation method described above will be described with reference to FIG. 7.

Example 2

In Example 2 of the disclosure, a method by which a UE monitors PSCCH of NR SL for SCI decoding is described. In NR SL, not only a method by which PSCCH and PSSCH are multiplexed, but also a structure of PSCCH may be different from those in LTE SL. Accordingly, to perform sensing via SCI decoding in Mode 2, a method by which a UE monitors PSCCH of NR SL is required. An operation, performed by a transmission UE, of performing SCI decoding regarding another UE may include an operation of successfully decoding SCI by monitoring PSCCH and obtaining SCI of the other UE. First, a following method may be considered as a method of multiplexing PSCCH and PSSCH in NR SL.

A part of PSCCH and the associated PSSCH are transmitted using overlapping time resources in non-overlapping frequency resources, but another part of the associated PSSCH and/or another part of the PSCCH are transmitted using non-overlapping time resources.

Here, 'associated' may indicate that PSCCH includes information required to decode at least PSSCH. A method of multiplexing PSCCH and PSSCH according to the method described above is shown in FIGS. 8A through 8C. Next, as described with reference to FIG. 3, when resource allocation is performed in units of subchannels in a frequency axis, startRB-Subchannel, sizeSubchannel, and numSubchannel may be indicated as frequency configuration information regarding a resource pool in SIB. In NR SL, a subcarrier spacing according to a frequency range supported in an NR Uu system may be supported. Table 3 and Table 4 describe a system transmission bandwidth and a part of a corresponding relationship between subcarrier spacing and channel bandwidth respectively in a frequency range 1 lower than 6 GHz and a frequency range 2 higher than 6 GHz in NR Uu. In Tables 3 and 4, N/A may indicate a bandwidth-subcarrier combination not supported in an NR system. When units of subchannels is defined in SL, sizeSubchannel and numSubchannel may be determined based on the number of RBs available in the subcarrier spacing and the channel bandwidth. The NR system having 100 MHz channel bandwidth as 30 kHz subcarrier spacing may include 273 RBs as a transmission bandwidth. Thus, in this case, when sizeSubchannel includes 10 RBs, maximum 27 numSubchannels may be supported.

TABLE 3

Configuration of Frequency Range 1

| | | Channel bandwidth BW$_{Channel}$ [MHz] | | | | | |
|---|---|---|---|---|---|---|---|
| | subcarrier spacing | 5 MHz | 10 MHz | 20 MHz | 50 MHz | 80 MHz | 100 MHz |
| Transmission bandwidth configuration N$_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 4

Configuration of Frequency Range 2

| | | Channel bandwidth BW$_{Channel}$ [MHz] | | | |
|---|---|---|---|---|---|
| | subcarrier spacing | 50 MHz | 100 MHz | 200 MHz | 400 MHz |
| Transmission bandwidth configuration N$_{RB}$ | 60 kHz | 66 | 132 | 264 | N/A |
| | 120 kHz | 32 | 66 | 132 | 264 |

Accordingly, when resource allocation of the PSSCH in NR SL is performed in units of subchannels, it may be determined whether to transmit the PSCCH by always including the PSCCH in a subchannel or allow the PSCCH to be transmitted through subchannels.

Figure 8A:
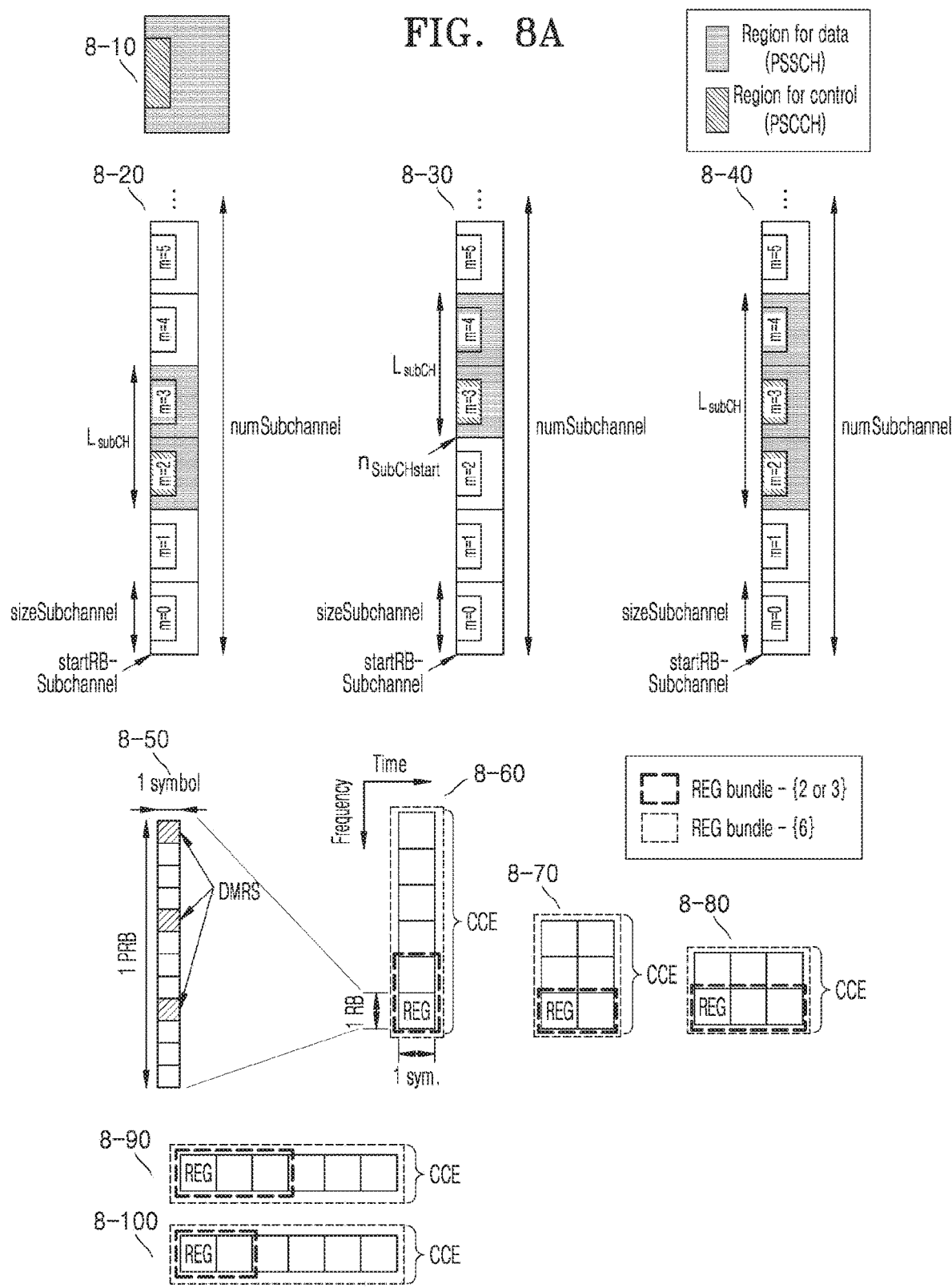
FIG. 8A is a diagram showing that resource allocation of a PSSCH is performed in units of subchannels, according to an embodiment.

FIG. 8A is a diagram showing that resource allocation of the PSSCH is performed in units of subchannels, according to an embodiment.

In the disclosure, a method in which the PSCCH is transmitted by being always included in a subchannel in the NR SL may be considered. Here, a method of transmitting the PSCCH within a subchannel according to a configured size of the subchannel may be determined. Also, a method of repeatedly transmitting the PSCCH in a PSSCH region according to a size of a subchannel may be considered. In particular, the method of transmitting the PSCCH within a subchannel is shown in cases 8-20 and 8-30 of FIG. 8A. Referring to the cases 8-20 and 8-30 of FIG. 8A, a UE may be configured with startRB-Subchannel, sizeSubchannel, and numSubchannel as frequency configuration information regarding a resource pool. In the disclosure, a PSCCH resource m may be transmitted by being included in an m$^{th}$ subchannel based on startRB-Subchannel. As in Example 1 described above, transmission time points of initial transmission and retransmission and frequency allocation location information may be included in SCI, as reservation information regarding PSSCH resource allocation. Regarding a look-ahead reservation method indicating resource allocation by allowing up to 2 retransmissions, when SCI is transmitted via a PSCCH resource m from a slot to assigned as a resource pool, a slot and subchannel corresponding to the PSSCH transmission may be determined as follows.

When a time gap (SF$_{gap}$) between initial transmission and retransmission is 0 (when retransmission is not performed), time and frequency allocation locations for PSSCH are as follows (case 8-20): sub-channel(s) m, m+1, . . . , m+LsubCH−1 in slot t$_n$.

When a time gap (SF$_{gap}$) between initial transmission and retransmission is not 0 (corresponding to initial transmission), time and frequency allocation locations for PSSCH are as follows: sub-channel(s) m, m+1, . . . , m+L$_{subCH}$−1 in slot t$_n$ (case 8-20); sub-channel(s) n$_{subCHstart}$, n$_{subCHstart}$+1, . . . , n$_{subCHstart}$+L$_{subCH}$−1 in slot t$_{n+SFgap}$ (case 8-30).

When a time gap (SF$_{gap}$) between initial transmission and retransmission is not 0 (corresponding to retransmission), time and frequency allocation locations for PSSCH are as follows: sub-channel(s) n$_{subCHstart}$, n$_{subCHstart}$+1, . . . , n$_{subCHstart}$+L$_{subCH}$−1 in slot t$_{n-SFgap}$; sub-channel(s) m, m+1, . . . , m+L$_{subCH}$−1 in slot t$_n$.

L$_{subCH}$ indicates a length of subchannel assigned to the PSSCH, and n$_{subCHstart}$ indicates a start location of the subchannel assigned to the PSSCH and is included in SCI. On the other hand, regarding a chain reservation method indicating resource allocation for current transmission and next retransmission, when SCI is transmitted via a PSCCH resource m from a slot t$_n$ assigned as a resource pool, a slot and subchannel corresponding to PSSCH transmission may be determined as follows.

When a time gap (SF$_{gap}$) between current transmission and next retransmission is 0 (when retransmission is not performed), time and frequency allocation locations for PSSCH are as follows (case 8-20): sub-channel(s) m, m+1, . . . , m+L$_{subCH}$−1 in slot t$_n$.

When a time gap (SF$_{gap}$) between current transmission and next retransmission is not 0 (corresponding to current transmission), time and frequency allocation locations for the PSSCH are as follows: sub-channel(s) m, m+1, . . . , m+L$_{subCH}$−1 in slot t$_n$ (case 8-20); sub-channel(s) n$_{subCHstart}$, n$_{subCHstart}$+1, . . . , n$_{subCHstart}$+L$_{subCH}$−1 in slot t$_{n+SFgap}$ (case 8-30).

When a time gap (SF$_{gap}$) between current transmission and next retransmission is not 0 (corresponding to retransmission), time and frequency allocation locations for the PSSCH are as follows: sub-channel(s) n$_{subCHstart}$, n$_{subCHstart}$+1, . . . , n$_{subCHstart}$+L$_{subCH}$−1 in slot t$_{n-SFgap}$; sub-channel(s) m, m+1, . . . , m+L$_{subCH}$−1 in slot t$_n$.

Here, L$_{subCH}$ indicates a length of subchannel assigned to the PSSCH, and n$_{subCHstart}$ indicates a start location of the subchannel assigned to the PSSCH and may be included in SCI. Different bit field interpretation depending on the look-ahead reservation method or chain reservation method may be a specific example of differentiating a reservation method according to the maximum number of retransmissions and differentiating the bit field interpretation while signaling SCI, as described with reference to Example 1.

Referring to the cases 8-20 and 8-30 of FIG. 8A, the PSCCH is transmitted from a subchannel corresponding to a lowest subchannel index from among subchannels assigned to the PSSCH. The disclosure provides a method of configuring PSCCH repetition. When PSCCH repetition is not supported, it is assumed that the PSCCH is transmitted from the subchannel corresponding to the lowest subchannel index from among the subchannels assigned to the PSSCH, as shown in the cases 8-20 and 8-30 of FIG. 8A. On the other hand, when PSCCH repetition is supported, the PSSCH may be repeated in consecutive subchannels depending on the configured number of PSCCH repetitions. The PSCCH repetition may be configured when PSSCH is transmitted to one or more consecutive subchannels, and the configurable maximum number of PSCCH repetitions may be the number of subchannels to which the PSSCH is assigned. When the PSCCH repetition is supported, the number of PSCCH repetitions may be configured in SCI and signaled. Also, when the number (length) of PSCCH repetitions is configured as R, the PSCCH may be repeatedly transmitted to same time and frequency locations from R consecutive subchannels from the subchannel corresponding to the lowest subchannel index from among the subchannels assigned to the PSSCH. Here, R may be configured to be an integer, such as 1, 2, 3, or 4. When R=1, the PSCCH is not repeated but is transmitted from only one subchannel. On the other hand, the maximum number (length) of PSCCH repetitions may be configured based on resource pool information. Here, the actually applied number of PSCCH repetitions may vary according to a channel status. Thus, the UE may assume that the maximum length of PSCCH repetitions is R and attempt to detect the PSCCH from R consecutive subchannels from the subchannel corresponding the lowest subchannel index from among the subchannels assigned to the PSSCH. Referring to a case 8-40 of FIG. 8A, PSCCH repetition is supported and R (i.e., the length of PSCCH repetitions) is configured to be 2. Repetition of the PSCCH is considered when the PSCCH is always included in a subchannel but a size of the subchannel is small, and thus a region of a frequency resource through which the PSCCH is transmittable is limited and reliability of transmission of the PSCCH is not guaranteed. In addition, by considering the repetition of the PSCCH, a case in which the PSCCH is used for radio link monitoring (RLM) in SL may be considered. When the PSCCH is transmitted only to a partial region of a frequency, the accuracy of measuring RLM from the PSCCH may not be guaranteed. In particular, a transmission UE may transmit a PSCCH DMRS via the PSCCH and a reception UE, upon receiving the PSCCH DMRS, may monitor a link status. Also, as similar in Uu, the reception UE may report a monitoring result of the link status to a higher layer via an indicator in an in-sync (IC) or OCC form. Accordingly, when a PSCCH DMRS is used for SL RLM, a method of enforcing the number of PSCCH repetitions to be at least X may be considered. Accordingly, the accuracy of SL RLM may be guaranteed. As such, the repetition of PSCCH is differentiated from a transmission structure of the NR PDCCH.

Next, using of a structure of the NR PDCCH as a structure of the PSCCH in NR SL may be considered. As shown in a case 8-50 of FIG. 8A, a base unit of a time and frequency resource configuring the NR PDCCH may be a resource element group (REG), wherein REG may be defined as 1 OFDM symbol in a time axis and 1 PRB in a frequency axis, i.e., 12 subcarriers. REG may include a region where the DMRS that is a reference signal for decoding REG is mapped. As shown in the case 8-50 of FIG. 8A, 3 DMRSs may be transmitted in 1 REG. A base station may configure an allocation unit of the NR PDCCH by concatenating REG. In NR Uu, a base unit to which PDCCH is assigned is referred to as control channel element (CCE) and 1 CCE may include a plurality of REG bundles. Here, the REG bundle includes a plurality of REGs and is a smallest unit where the PDCCH is interleaved. FIG. 8A shows structures 8-60 through 8-80 of CCE supported in NR Uu. In particular, the structures 8-60 through 8-80 of CCE may correspond to cases in which PDCCH symbol lengths are respectively 1, 2, and 3. When the structure 8-60 or 8-70 is used in the NR PDCCH, available REG bundles may be 2 or 6, and when the structure 8-80 is used, available REG bundles may be 3 or 6. The structures 8-60 through 8-80 of CCE supported in NR Uu may be used for the NR SL PSCCH. In other words, the structures 8-60 through 8-80 may be the structures of CCE when the PSCCH symbol lengths are respectively 1, 2, and 3. Also, an increased PSCCH symbol length may be considered to support an expanded coverage in NR SL. Structures 8-90 and 8-100 of CCE may be used when the PSCCH symbol length is 6. The structure 8-90 may be used when an REG bundle is 3 or 6, and the structure 8-100 may be used when an REG bundle is 2 or 6. The structure 8-90 or 8-100 of CCE may be used when a case in which the PSCCH symbol length is 6 in NR SL is supported. Accordingly, when a PSCCH region of SL is configured, the PSCCH region may include a plurality of CCEs and may be mapped and transmitted via one or a plurality of CCEs according to an aggregation level (AL). The CCEs in the PSCCH region may be distinguished by numbers, and at this time, the numbers of CCEs may be assigned based on a logical mapping method. In the NR PDCCH, AL may be used to implement link adaptation of a DL control channel, but in the NR PSCCH, AL may not be used for link adaptation but may be configured in UE via resource pool configuration. Also, in the NR PDCCH, because the UE needs to detect a signal while not knowing information about DL control channel, a search space indicating a group of CCEs may be defined for blind decoding. Here, the search space is a group of DL control channel candidates including CCEs on which the UE needs to perform decoding on a given AL, and the UE may include a plurality of search spaces because there are several ALs forming one group with a plurality of CCEs according to AL. Also, in the NR PDCCH, a search space set may be defined as a group of search spaces on all configured ALs. However, in the NR PSCCH, such a search space and a search space set may not be defined. As shown in the cases 8-20 and 8-30 of FIG. 8A, the NR PSCCH may be basically transmitted at agreed time and frequency locations within a subchannel. In particular, a time location regarding the PSCCH within a subchannel may be transmitted from a first OFDM symbol to X symbol of a slot according to a configured or fixed PSCCH length X. Also, a frequency location regarding the PSCCH within a subchannel may be configured to be mapped from the lowest or highest PRB index of the subchannel or at the center of the subchannel, based on a configured CCE structure and AL. Accordingly, the following information may be configured in a resource pool for PSCCH transmission of SL (such configuration information may be transmitted via SIB): resource pool configuration information on time regarding the PSSCH (the PSCCH may be transmitted from a set (group) $(t_0, t_1, \ldots, t_i, \ldots, tT_{max})$ of slots belonging to a PSSCH resource pool); resource pool configuration information on frequency regarding the PSSCH (subchannel configuration information): startRB-Subchannel, sizeSubchannel, numSubchannel; the PSCCH information configured in subchannel (PSCCH length X (When X=1, the structure 8-60 of CCE may be used, when X=2, the structure 8-70 of CCE may be used, when X=3, the structure 8-80 of CCE may be used, when X=6, the structure 8-90 or 8-100 of CCE may be used, and a structure of CCE available according to a configured size of subchannel (sizeSubchannel) may be limited (e.g., the structure 8-60 of CCE is not available when the size of subchannel is smaller than 6 RBs)), AL L (When L=1, aggregation is not performed, when L>1, a structure of CCE may be continuously aggregated on frequency. The number of aggregatable CCEs may be limited depending on the configured size of subchannel (sizeSubchannel). When the size of subchannel is 10 RBs and X=1, and thus the structure 8-60 of CCE is used, only L=1 is possible)).

As described above, when the size of subchannel (sizeSubchannel) is configured via frequency configuration information regarding a resource pool in SIB, an available structure of CCE or the number of aggregatable CCEs may be limited depending on the size of subchannel.

According to a method of transmitting the PSCCH in NR SL described above, the UE may monitor the PSCCH region located within each subchannel from information configured on the resource pool. Also, the UE may verify resource allocation information of the PSSCH by decoding SCI transmitted to the PSCCH. Also, the UE may determine the resource allocation information of the PSSCH by reflecting PSCCH repetition information when the PSCCH repetition information is included in SCI. In particular, the PSSCH may be decoded by verifying a subchannel including the PSCCH and a subchannel not including the PSCCH in the PSSCH region. A PSCCH structure and a PSCCH monitoring method in NR SL disclosed in the above embodiments of the disclosure are an example for a UE to perform SCI decoding while performing sensing, and is not limited thereto.

Example 2-1

In Example 2-1 of the disclosure, a structure of the PSCCH will be described in more detail. A structure of control channel disclosed herein considers the use in SL, but is not limited thereto. In a communication system between a base station and a UE, a control channel of a long symbol length provided in Example 2-1 may be used to support coverage expansion. Generally, a base unit to which the PSCCH is assigned in SL may be a CCE and the PSCCH may be transmitted by being mapped to one or a plurality of CCEs depending on AL. The CCEs in a PSCCH region may be distinguished by numbers, and at this time, the numbers of CCEs may be assigned based on a logical mapping method. One CCE may include a plurality of REG bundles. Here, the REG bundle includes a plurality of REGs and CCE-to-REG mapping may be interleaved to be a smallest unit where PSCCH is interleaved. Here, the CCE-to-REG mapping may be interleaved or may not be interleaved, and corresponding information may be configured as resource pool information in SL. A corresponding structure of a CCE may be used depending on a supported PDCCH symbol length. Generally, a CCE configured of L(N) REGs may be provided for a symbol length N. REG may be defined as 1 OFDM symbol in a time axis and 1 PRB in a frequency axis, i.e., 12 subcarriers. A REG may include a region where the DMRS that is a reference signal for decoding REG is mapped.

Figure 8B:
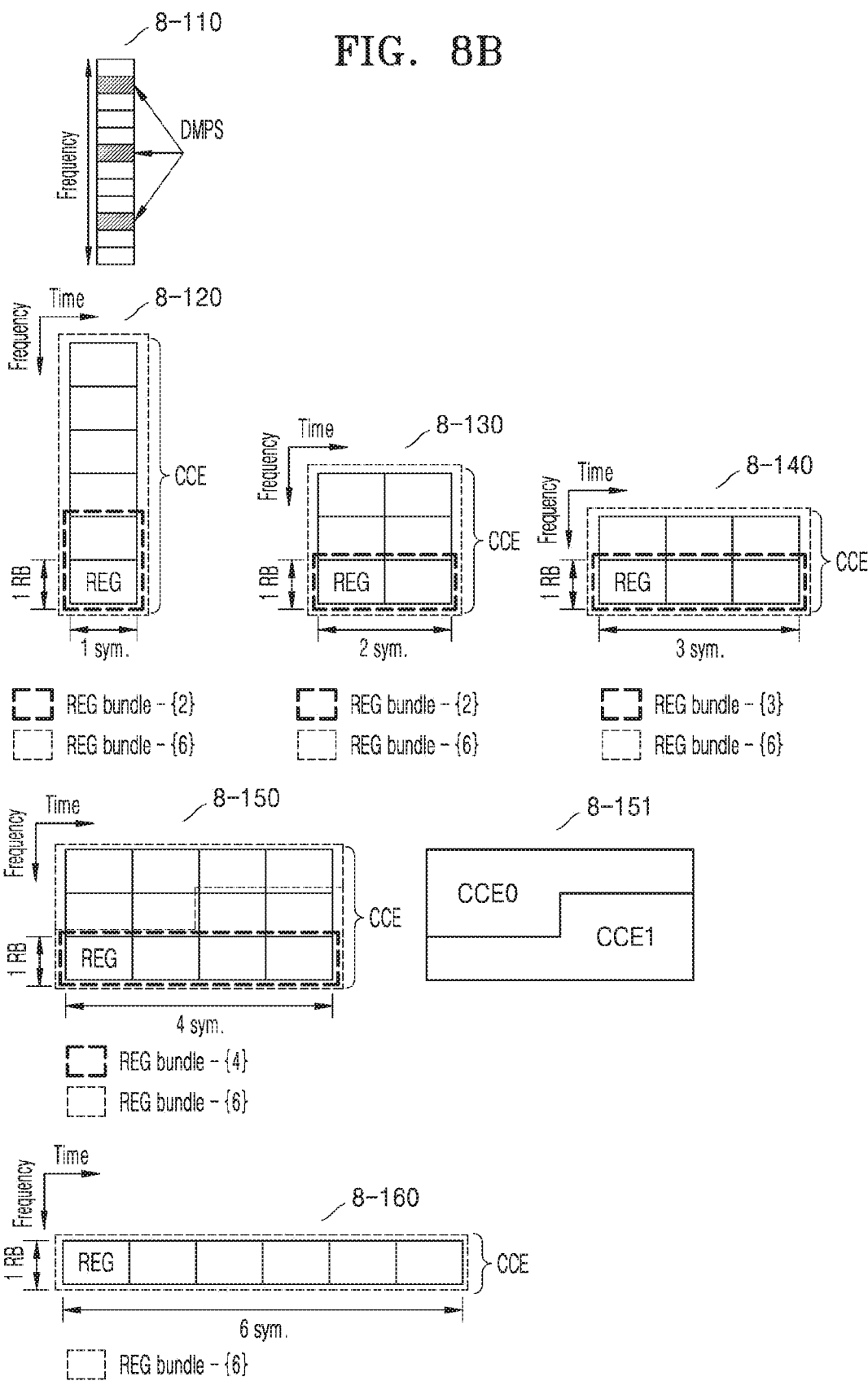
FIG. 8B is a diagram showing a transmission location of a demodulation reference signal (DMRS), according to an embodiment.

FIG. 8B is a diagram showing a transmission location of a DMRS, according to an embodiment.

In particular, an example 8-110 of FIG. 8B shows a location at which 3 DMRSs are transmitted in 1 REG. Then, examples 8-120 through 8-150 of FIG. 8B show corresponding structures of a CCE when PSCCH symbol lengths are respectively 1, 2, 3, 4, and 6. In particular, referring to the example 8-120 of FIG. 8B, an example of the structure of a CCE when the PSCCH symbol length is 1 is shown and 6 REGs configure 1 CCE. Also, L={2, 6} is shown as an available REG bundle size. Here, a DMRS pattern regarding the PSCCH symbol length of 1 may be a pattern in the example 8-110.

Referring to the example 8-130 of FIG. 8B, an example of the structure of a CCE when the PSCCH symbol length is 2 is shown and 6 REGs configure 1 CCE. Also, L={2, 6} is shown as an available REG bundle size. Here, a DMRS pattern regarding the PSCCH symbol length of 2 may be assumed that the pattern in the example 8-110 is repeated for each symbol.

Referring to the example 8-140 of FIG. 8B, an example of the structure of a CCE when the PSCCH symbol length is 3 is shown and 6 REGs configure 1 CCE. Also, L={3, 6} is shown as an available REG bundle size. Here, a DMRS pattern regarding the PSCCH symbol length of 3 may be assumed that the pattern in the example 8-110 is repeated for each symbol.

Referring to the example 8-150 of FIG. 8B, an example of the structure of a CCE when the PSCCH symbol length is 4 is shown and 6 REGs configure 1 CCE. Also, L={4, 6} is shown as an available REG bundle size. When the PDCCH symbol length is 4, 2 CCEs may be always transmitted in a bundled structure as in an example 8-151 of FIG. 8B. Accordingly, AL>1 may be supported. Here, a DMRS pattern when the PSCCH symbol length is 4 may be assumed that the pattern in the example 8-110 is repeated for each symbol, or may be assumed that the DMRS is transmitted only at first and fourth symbols and not transmitted at second and third symbols. The latter method may be a method for reducing DMRS overhead.

Referring to the example 8-160 of FIG. 8B, an example of the structure of a CCE when the PSCCH symbol length is 6 is shown and 6 REGs configure 1 CCE. Also, L=6 is shown as an available REG bundle size. Here, a DMRS pattern when the PSCCH symbol length is 6 may be assumed that the pattern in the example 8-110 is repeated for each symbol, or may be assumed that the DMRS is transmitted only at first, third, and sixth symbols and not transmitted at second, fourth, and fifth symbols. The latter method may be a method for reducing DMRS overhead.

CCE-to-REG mapping for corresponding structures of CCEs when the PSCCH symbol lengths are 1, 2, 3, 4, and 6 will be described respectively via the examples 8-120 through 8-160 of FIG. 8B. In particular, when the number of RBs of control resource set (CORESET) where the PSCCH is transmittable is $N_{RB}^{CORESET}$ and the number of symbols is $N_{symb}^{CORESET}$.

REG bundle i may be defined by $\{iL, iL+1, \ldots, iL+L 1\}$ REGs. Here, L denotes a size of REG bundle and $i=0, 1, \ldots, N_{REG}^{CORESET}/L-1$, and $N_{REG}^{CORESET}=N_{RB}^{CORESET}N_{symb}^{CORESET}$.

CCE j may be defined as REG bundles of $\{f(6j/L), f(6j/L+1), \ldots, f(6j/L+6/L-1)\}$. Here, $f(\cdot)$ denotes an interleaver.

When the CCE-to-REG mapping is not interleaved, L=6 and f=x.

On the other hand, when the CCE-to-REG mapping is interleaved, f(x) may be defined as in Equation (1) regarding the PSSCH symbol length and REG bundle size L described above:

$$f(x)=(rC+c+n_{shift}) \bmod(N_{REG}^{CORESET}/L)$$

$$x=cR+r$$

$$r=0,1,\ldots,R-1$$

$$c=0,1,\ldots,C-1$$

$$C=N_{REG}^{CORESET}/(LR) \quad (1)$$

In Equation (1), R denotes an interleaver size. $n_{shift}$ a parameter used to randomize interleaving. The parameter may be configured as resource pool information. In particular, information configured in a resource pool may include the following: PSCCH control region information (indicates a configuration of the number ($N_{RB}^{CORESET}$) RBs and the number ($N_{symb}^{CORESET}$) of symbols of a control region where the PSCCH is transmitted and a configuration range may be limited depending on a structure of the PSCCH and a multiplexing method of the PSCCH and the PSCCH (according to a method of Example 2, the number of RBs of the control region where PSCCH is transmitted may be configured to be the size of subchannel or smaller)); REG bundle size (an available REG bundle size may be determined depending on the structure of the PSCCH. The structures of the CCE when the number of symbols of the control region are 1, 2, 3, 4, and 6 are shown in the examples 8-120 through 8-160 of FIG. 8B, and examples of available REG bundle sizes are disclosed. However, the available REG bundle sizes are not limited to those provided in the disclosure); whether to interleave CCE-to-REG mapping (it may be configured to perform or not to perform interleaving. When interleaving is performed, Equation (1) is used. However, the disclosure is not limited by Equation (1)); interleaver size R (R∈{2, 3, 6} may be configured. However, a value configurable as R in the disclosure is not limited thereto); and $n_{shift}$ (a value among $n_{shift}$∈{0, 1, . . . , 274} may be selected. Also, a corresponding value may be limited to a range of a largest value of the number of RBs configurable according to subcarrier spacing (SCS) and bandwidth (BW). However, in the disclosure, a value configurable by $n_{shift}$ is not limited thereto).

Also, the parameter information described above may be pre-configured as resource pool information when a UE is unable to receive system information from a base station as in OOC. Here, the pre-configured resource pool-related information may be information pre-stored and configured in the UE or information that is configured when the UE accessed the base station previously. On the other hand, the parameter information may be a pre-agreed value. Hereinafter, an example of information about the pre-agreed value will be described. The following values may be used as a pre-configured value of the resource pool information: PSCCH control region information (values defined in TS 38.213 clause 13 may be used as configuration values of the number ($N_{RB}^{CORESET}$) of RBs and the number ($N_{symb}^{CORESET}$) of symbols of the control region where PSCCH is transmitted); REG bundle size may be assumed as 6; whether to interleave CCE-to-REG mapping (it may be assumed that Interleaving is performed); interleaver size R may be assumed as 2; and $n_{shift}$ may be assumed as SL synchronization identification (ID) (SL synchronization ID may denote ID used during synchronization in SL).

In the above embodiments of the disclosure, it has been described that configuration information regarding the PSCCH may be configured in a resource pool. Also, the configuration information regarding the PSCCH may be information configured in a corresponding SL bandwidth part (BWP). When a plurality of SL BWPs are configured, the UE may transmit the PSCCH as the corresponding information is configured only in an active SL BWP. In other words, the UE may not transmit the PSCCH in the BWP other than the active SL BWP. The PSCCH structure disclosed in the above embodiments of the disclosure is an example for the UE to perform SCI decoding while performing sensing, and is not limited thereto.

Example 2-2

In Example 2-2 of the disclosure, a method different from the method of multiplexing the PSCCH and the PSSCH of Example 2 is described. In Example 2, the AL is fixed depending on a size of subchannel via resource pool configuration, but the AL may be used to implement link adaptation of the SL control channel. Accordingly, in Example 2 as well, a maximum value of AL is configured in resource pool configuration, and an operation of adapting an AL value actually used according to a channel status may be considered. However, when the AL is not fixed, a UE may have to perform blind decoding on actually used AL. Also, in Example 2, because the PSCCH is included in a subchannel, it may be difficult to freely configure the size of the AL when the size of a subchannel configured in a resource pool is small.

Figure 8C:
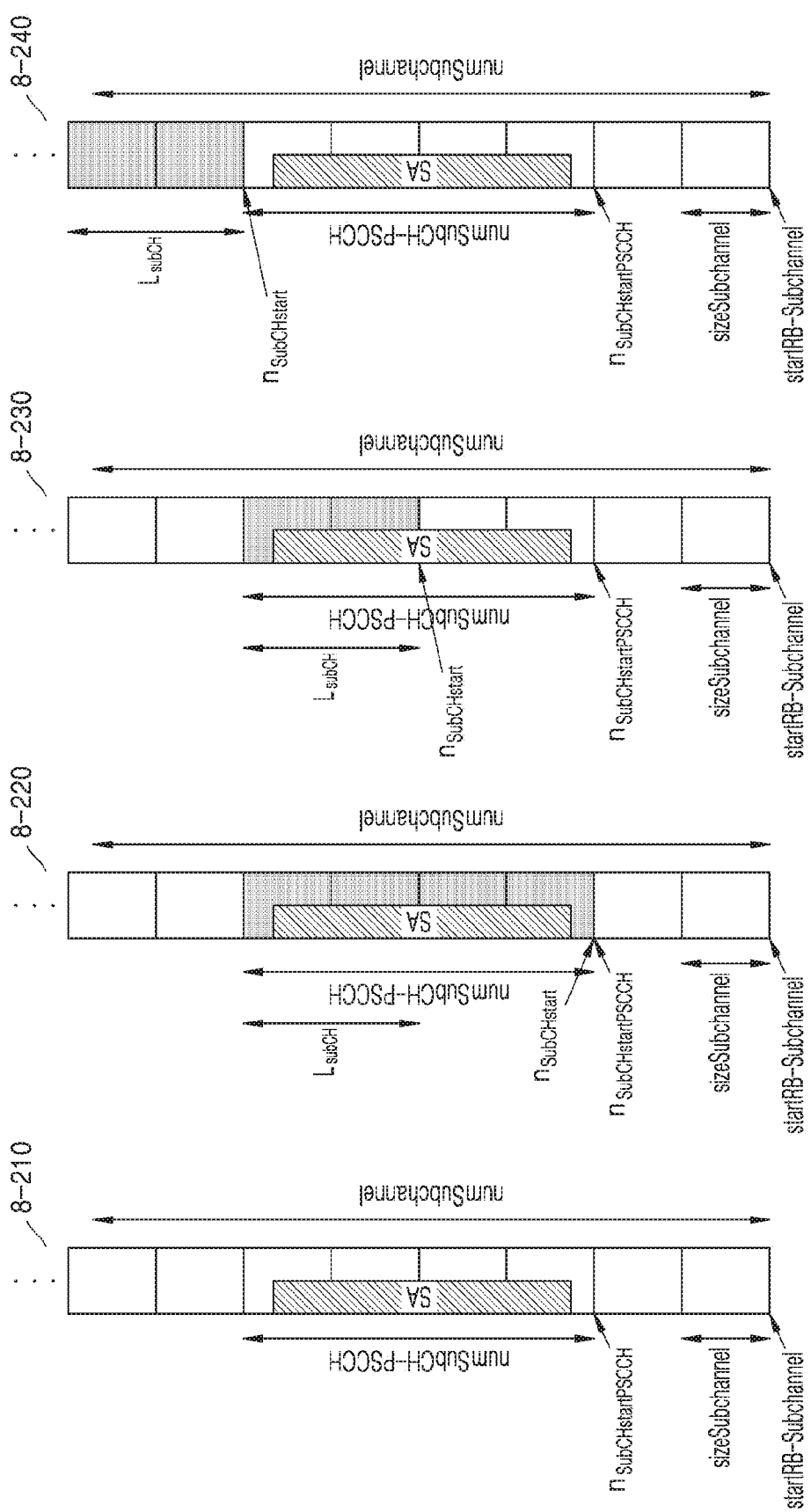
FIG. 8C is a diagram showing a region where a physical sidelink control channel (PSCCH) is transmitted, according to an embodiment.

FIG. 8C is a diagram showing a region where the PSCCH is transmitted, according to an embodiment.

However, an embodiment of the disclosure is not limited to a case where the PSCCH is included in a subchannel, but a method of determining a region where the PSCCH is transmitted within a resource pool configuration region is provided as shown in FIG. 8C. In particular, a case 8-210 of FIG. 8C shows startRB-Subchannel, sizeSubchannel, and numSubchannel, which are resource pool configuration information on frequency, and shows a method of configuring a frequency domain where the PSCCH is transmitted within a corresponding resource pool region. Referring to the case 8-210, a frequency location where the CORESET where the PSCCH is transmittable is transmitted may be determined when a subchannel location ($n_{subCHstartPSCCH}$) where transmission of the PSCCH starts and the number (numSubCH-PSCCH) of subchannels where the PSCCH is transmitted are configured in the resource pool region. Also, cases 8-220 through 8-240 of FIG. 8C show different examples regarding a region of the PSCCH determining resource allocation regarding the PSCCH and indicated by the PSCCH. In particular, referring to the case 8-220, a region of the PSCCH on a frequency location may include the PSCCH. Referring to the case 8-230, a region of the PSCCH on a frequency location may include only a part of the PSCCH. Referring to the case 8-240, a region of the PSCCH on a frequency location may not include the PSCCH. On the other hand, in multiplexing structures of the PSCCH and the PSSCH provided in Example 2, the PSCCH is always included in a PSSCH frequency domain.

Moreover, unlike Example 2, in a method of multiplexing the PSCCH and the PSSCH of FIG. 8C, because a location where the PSCCH is transmitted is not fixed, a search space indicating a group of CCEs may be defined for blind decoding. Here, the search space is a group of SL control channel candidates including CCEs on which the UE needs to perform decoding on a given AL, and the UE may include a plurality of search spaces because there are several ALs forming one group with a plurality of CCEs according to the AL. Also, in the PSCCH, a search space set may be defined as a group of search spaces on all configured ALs. In particular, a search space of a control region p in the PSCCH of SL and AL L in a search space set s may be represented as Equation (2) below. Here, the control region p and the search space set s may be configured as resource pool information.

$$L \cdot \left\{ \left( Y_{p,n_{s,f}^{\mu}} + \left\lfloor \frac{m_{s,n_{Cl}} \cdot N_{CCE,p}}{L \cdot M_{p,s,max}^{(L)}} \right\rfloor + n_{Cl} \right) \mathrm{mod} \lfloor N_{CCE,p}/L \rfloor \right\} + i \qquad (2)$$

In Equation (2), L is AL, (a corresponding value may be configured as resource pool information), $n_{Cl}$ is the Carrier index (when cross carrier scheduling is used, a corresponding value may be configured as resource pool information. When cross carrier scheduling is not used, the corresponding value may be configured to be 0), $N_{CCE,p}$ is a total number of CCEs present in the control region p (in a case (see the example 8-151 of FIG. 8B) where a structure in which 2 CCEs are always aggregated when a PSCCH symbol length is 4 as in the example 8-150 of FIG. 8B, a corresponding value may be defined to be the total number of units in which 2 CCEs present in the control region p are bundled instead of the total number of CCEs. In other words, in such a case, CCE shifting of a search space occurs in the units in which 2 CCEs are bundled), $n_{s,f}^{\mu}$ is the slot index, $M_{p,s,max}^{(L)}$ is the number of PSCCH candidate groups of AL L (a corresponding value may be configured as resource pool information), $m_{s_nCl} = 0, \ldots, M_{p,s,max}^{(L)} - 1$ is the PSCCH candidate group index of AL L, and $i = 0, \ldots, L-1$. One of the following methods may be used for a value of $Y_{\_}(p, n_{s,f}^{\mu})$: (1), as in Equation (3).

$Y_{p,n_{s,f}}^{\mu} = (A_p \cdot Y_{p,n_{s,f}^{\mu}-1}) \mathrm{mod}\ D,\ Y_{p,-1} = n_{RNTI} \neq 0,$
$A_0 = 39827$ (for $p$ mod 3=0), $A_1 = 39829$ (for $p$ mod 3=1), $A_2 = 39839$ (for $p$ mod 3=2),
$D = 65537$ \qquad (3)

where $n_{RNTI}$ in Mode 1, SL-V-RNTI may be used as a UE identifier regarding a dynamic grant method and SL-SPS-V-RNTI may be used as a UE identifier regarding a configured grant method (in this case, the value of $Y_{\_}(p, n_{s,f}^{\mu})$ may vary according to identify of a UE (ID configured to the UE by C-RNTI or a base station) and a time index. Meanwhile, in Mode2, the value of $Y_{\_}(p, n_{s,f}^{\mu})$ may be 0. Also, when pre-configured resource pool information is used, the value of $Y_{\_}(p, n_{s,f}^{\mu})$ may be assumed to be 0); and (2): The value of $Y_{\_}(p, n_{s,f}^{\mu})$ may be always 1 regardless of Mode 1 or Mode 2.

The parameter information described above may be pre-configured as resource pool information when a UE is unable to receive system information from a base station as in OOC. Here, the pre-configured resource pool-related information may be information pre-stored and configured in the UE or information that is configured when the UE accessed the base station previously.

Also, because the method of multiplexing the PSCCH and the PSSCH may have different starting time points for the PSCCH unlike the multiplexing structures of the PSCCH and the PSSCH provided in Example 2, signaling indicating a starting time point for the PSSCH may need to be additionally considered. In the multiplexing structures of the PSCCH and the PSSCH provided in Example 2, because a location and region of the PSCCH are fixed, a region regarding the PSSCH may also be fixed. However, as described above through the cases 8-220 through 8-240 of FIG. 8C, because a location and region regarding PSCCH may not be stationary, information about a starting location of the PSSCH may need to be indicated via SCI. Also, as in Example 1, transmission time points of initial transmission and retransmission and frequency allocation location information may be included in the SCI, as reservation information regarding PSSCH resource allocation. However, in this case as well, unlike Example 2, because it is unable to assume that a starting location of the PSSCH regarding current transmission is a subchannel to which the PSCCH is assigned, additional overhead may occur while signaling the starting location of the PSSCH to which a resource is assigned for all transmissions including initial transmission and retransmission. In particular, regarding a look-ahead reservation method indicating resource allocation regarding up to 2 retransmissions, when SCI is transmitted via the PSCCH from a slot $t_n$ assigned as a resource pool, a slot and subchannel corresponding to PSSCH transmission may be determined as follows.

When a time gap ($SF_{gap}$) between initial transmission and retransmission is 0 (when retransmission is not performed), time and frequency allocation locations for PSSCH are as follows (case 8-20 of FIG. 8A): sub-channel(s) $n_{subCHstart}$, $n_{subCHstart}+1, \ldots, n_{subCHstart}+L_{subCH}-1$ in slot $t_n$.

When a time gap ($SF_{gap}$) between initial transmission and retransmission is not 0 (corresponding to initial transmission), time and frequency allocation locations for PSSCH are as follows: sub-channel(s) $n_{subCHstart}$, $n_{subCHstart}+1, \ldots, n_{subCHstart}+L_{subCH}-1$ in slot $t_n$ (case 8-20 of FIG. 8A) and sub-channel(s) $n_{subCHstart(RE)}$, $n_{subCHstart(RE)}+1, \ldots, n_{subCHstart(RE)}+L_{subCH}-1$ in slot $t_{n+SFgap}$ (case 8-30 of FIG. 8A).

When a time gap ($SF_{gap}$) between initial transmission and retransmission is not 0 (corresponding to retransmission), time and frequency allocation locations for PSSCH are as follows: sub-channel(s) $n_{subCHstart}$, $n_{subCHstart}+1, \ldots, n_{subCHstart}+L_{subCH}-1$ in slot $t_{n-SFgap}$, and sub-channel(s) $n_{subCHstart(RE)}$, $n_{subCHstart(RE)}+1, \ldots, n_{subCHstart(RE)}+L_{subCH}-1$ in slot $t_n$.

$L_{subCH}$ indicates a length of a subchannel assigned to the PSSCH, and $n_{subCHstart}$ and $n_{subCHstart(RE)}$ indicate starting locations of subchannels assigned to the PSSCH during initial transmission and retransmission and may be included in SCI. On the other hand, regarding a chain reservation method indicating resource allocation for current transmission and next retransmission, when SCI is transmitted via the PSCCH from a slot $t_n$ assigned as a resource pool, a slot and subchannel corresponding to the PSSCH transmission may be determined as follows.

When a time gap ($SF_{gap}$) between current transmission and next retransmission is 0 (when retransmission is not performed), time and frequency allocation locations for the PSSCH are as follows (case 8-20): sub-channel(s) $n_{subCHstart}$, $n_{subCHstart}+1, \ldots, n_{subCHstart}+L_{subCH}-1$ in slot $t_n$.

When a time gap ($SF_{gap}$) between current transmission and next retransmission is not 0 (corresponding to current transmission), time and frequency allocation locations for the PSSCH are as follows: sub-channel(s) $n_{subCHstart}$, $n_{subCHstart}+1, \ldots, n_{subCHstart}+L_{subCH}-1$ in slot $t_n$ (case 8-20 of FIG. 8A) and sub-channel(s) $n_{subCHstart}(RE)$, $n_{subCHstart}(RE)+1, \ldots, n_{subCHstart(RE)}+L_{subCH}-1$ in slot $t_{n+SFgap}$ (case 8-30 of FIG. 8A).

When a time gap ($SF_{gap}$) between current transmission and next retransmission is not 0 (corresponding to retransmission), time and frequency allocation locations for the PSSCH are as follows: sub-channel(s) $n_{subCHstart}$, $n_{subCHstart}+1, \ldots, n_{subCHstart}+L_{subCH}-1$ in slot $t_{n-SFgap}$ and sub-channel(s) $n_{subCHstart(RE)}$, $n_{subCHstart(RE)}+1, \ldots, n_{subCHstart(RE)}+L_{subCH}-1$ in slot $t_n$.

$L_{subCH}$ indicates a length of a subchannel assigned to the PSSCH, and $n_{subCHstart}$ and $n_{subCHstart(RE)}$ indicate starting locations of subchannels assigned to the PSSCH during initial transmission and retransmission and may be included in SCI. Different bit field interpretation depending on the look-ahead reservation method or chain reservation method may be a specific example of differentiating a reservation method according to the maximum number of retransmissions and differentiating the bit field interpretation while signaling SCI, as described with reference to Example 1.

According to a method of transmitting a PSCCH in the NR SL described above, the UE may monitor the PSCCH region from information configured on the resource pool. Also, the UE may verify resource allocation information of the PSSCH by decoding SCI transmitted to the PSCCH. A PSCCH structure and a PSCCH monitoring method in the NR SL disclosed in the above embodiments of the disclosure are an example for a UE to perform SCI decoding while performing sensing, and is not limited thereto.

Example 3

In Example 3 of the disclosure, a detailed operation of a UE performing sensing and selecting a transmission resource in Mode 2 is described. First, the sensing may be defined as an operation in which a transmission UE performs SCI decoding on another UE and an operation in which the transmission UE performs SL measurement. The operation of performing SCI decoding on the other UE may include an operation of obtaining SCI of the other UE after successfully decoding SCI. The SL measurement is for determining whether the other UE occupies time and frequency resources to be transmitted by the transmission UE, and in this regard, the following measurement methods may be considered in SL.

PSCCH reference signal received power (RSRP): Average received power (in[W]) regarding the DMRS included in the PSCCH may be measured.

PSSCH RSRP: Average received power (in[W]) regarding the DMRS included in the PSSCH may be measured.

SL received signal strength indicator (RSSI): Average received power (in[W]) may be measured. A region of measuring received power may be variously defined. The region may be defined by average received power of an OFDM symbol where the PSSCH is transmitted. Also, the region may be defined by average received power of a specific OFDM symbol region where the PSSCH is transmitted. Also, the region may be defined by average received power of an OFDM symbol in a specific region of a slot instead of a PSSCH transmission region. Also, the region may be average received power in a time duration smaller than an OFDM symbol. Accordingly, an SL RSSI may be an average received power in a time/frequency domain defined according to the purpose of use.

The UE may measure the PSCCH RSRP by monitoring a PSCCH region. The UE may perform SCI decoding and determine PSSCH information connected thereto based on SCI, thereby measuring the PSSCH RSRP or the SL RSSI. The PSCCH RSRP or the PSSCH RSRP may be referred to as SL RSRP. The transmission resource selection may be defined as an operation of determining a resource for an SL transmission by using a sensing result. Also, a process of reselecting a transmission resource may be performed depending on a status of the SL.

In the disclosure, a sensing window A and a sensing window B are defined to effectively perform sensing in a situation where periodic and aperiodic traffics co-exist.

Figure 9:
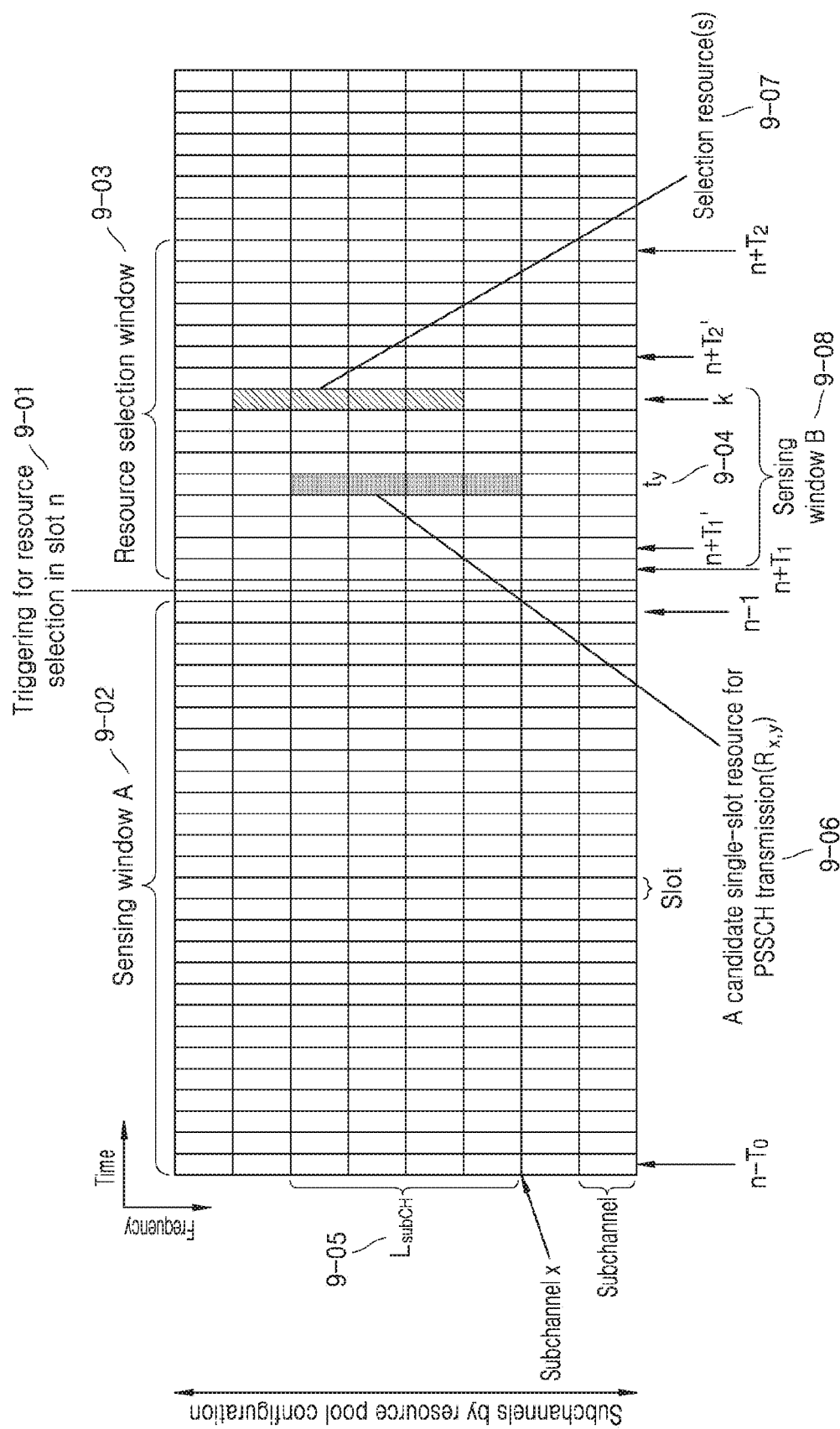
FIG. 9 is a diagram showing configuration of a sensing window for Mode 2 operation of sidelink, according to an embodiment.

FIG. 9 is a diagram showing configuration of a sensing window for Mode 2 operation of SL, according to an embodiment.

Referring to FIG. 9, a section where sensing is performed is divided into a sensing window A 9-02 and a sensing window B 9-08, but it does not mean that the sensing window A 9-02 and the sensing window B 9-08 are always divided. Only one of the sensing window A 9-02 and the sensing window B 9-08 may be configured or both the sensing window A 9-02 and the sensing window B 9-08 may be configured. When one of the sensing window A 9-02 and the sensing window B 9-08 are configured, the sensing window A 9-02 or the sensing window B 9-08 may be referred to as a sensing window. When both the sensing window A 9-02 and the sensing window B 9-08 are configured, the sensing window A 9-02 and the sensing window B 9-08 may be referred to as one sensing window. A UE may perform sensing during a configured sensing window section when data to be transmitted is generated, and select a transmission resource based on a result of the sensing.

As shown in FIG. 9, when triggering of selecting the transmission resource is occurred in a slot n (operation 9-01), the sensing window A 9-02 may be defined as follows.

Sensing window A 9-02 may be defined as a slot period of [n−T0, n−1]. Here, T0 may be a fixed value or a configurable value. When T0 is determined to be a fixed value, T0=1000*2P with respect to periodic traffic. On the other hand, a fixed value of T0=100*2$^\mu$ may be configured for aperiodic traffic. As such, a fixed value of T0 may change depending on a considered traffic property or may be fixed to be a same value for periodic and aperiodic traffics. Here, $\mu$ denotes an index corresponding to numerology and may be configured to be a following value depending on SCS: SCS=15 kHz, $\mu$=0; SCS=30 kHz, $\mu$=1; SCS=60 kHz, $\mu$=2; or SCS=120 kHz, $\mu$=3. When T0 is determined to be configurable, configuration thereof may be indicated via SL SIB or UE-specific higher signaling. When the configuration is indicated via SL SIB, a corresponding value i in resource pool information among system information may be configured. Information allocating a resource pool may include many parameters, and a value corresponding to T0 may be included in the parameters. When T0 is configured in the resource pool information, a uniform T0 is always used in the corresponding resource pool. When T0 is configured, the UE monitors slots $t_{n'-T0}, t_{n'-T0+1}, \ldots, t_{n'-1}$ excluding a slot where SL transmission occurs. Here, when the slot n is included in a set of slots $t_0, t_1, \ldots, t_i, \ldots tT_{max}$ belonging to a PSSCH resource pool, $t_{n'}=n$, and when not, the slot $t_{n'}$ is a first slot after the slot n belonging to the set of slots $t_0, t_1, \ldots, t_i, \ldots, tT_{max}$ belonging to the PSSCH resource pool.

SCI decoding and SL measurement may be performed on another UE in the sensing window A 9-02. Here, the sensing may be performed in units of slots. After successfully decoding SCI in the sensing window A 9-02, resource allocation information regarding the other UE and quality of service (QoS) information regarding a packet may be obtained from the obtained SCI. The resource allocation information may be transmission time points of initial transmission and retransmission, and frequency allocation location information. In NR SL, PC5 5G QoS indicator (PQI) is defined for QoS, and the PQI may include a default priority level, a packet delay budget, a packet error rate, a default maximum date burst volume, and a default averaging window. Thus, values defined in PQI may be included in SCI. Priority information may be information included in SCI for QoS. Also, when distance information is included in SCI, location information regarding the other UE may be obtained from the received SCI. A transmission-reception (TX-RX) distance may be calculated from location information of a reception UE and location information of a transmission UE. The distance information included in SCI may be zone ID. After SCI is successfully decoded in the sensing window A 9-02, the PSSCH RSRP may be measured from the obtained SCI. As another method, the PSCCH RSRP for the PSCCH including SCI may be measured. The PSSCH RSRP and the PSCCH RSRP may be used as metric for determining whether to exclude a resource that is determined to be occupied by the other UE and thus not effectively used in a resource selection window. Here, the excluding of the resource may be determined based on whether the PSSCH RSRP and the PSCCH RSRP exceed a (pre-)configured threshold value. When the PSSCH RSRP and PSCCH RSRP exceed the threshold value, a corresponding resource may be excluded from a resource candidate. Here, the (pre-)configured threshold value may be a value determined according to priority and channel busy ratio (CBR) value of the UE. The SL RSSI may be measured in the sensing window A 9-02. Here, the SL RSSI may be observed via valid OFDM symbol locations in a slot where the PSSCH is transmittable and configures the subchannel. The SL RSSI may be used to order and sort resource candidates where resource allocation is possible in a resource selection window 9-03.

When resource allocation information of the other UE is determined via SCI decoding in the sensing window A 9-02 and it is determined that it is not effective to allocate a transmission resource to a resource to be used by the other UE by using SL measurement result, such as SL RSRP or SL RSSI, the corresponding resource may be excluded from the resource selection window 9-03.

As shown in FIG. 9, when triggering of selecting the transmission resource is occurred in the slot n (operation 9-01), the resource selection window 9-03 may be defined as follows.

The resource selection window 9-03 may be defined as a slot period of [n+T1, n+T2]. Here, T1 and T2 may be a fixed value or a configurable value. Alternatively, T1 and T2 may be determined to be within a fixed range and the UE may configure a suitable value within the fixed range considering implementation. When T1 and T2 are determined to be within the fixed value and the UE configures the suitable value within the fixed range considering implementation, UE implementation may be configured with ranges of $0 \leq T1 \leq 4*2^{\mu}$ and $20*2^{\mu} \leq T2 \leq 100*2^{\mu}$. Here, $\mu$ is an index corresponding to numerology. A section of the resource selection window 9-03 may be configured considering the maximum number of retransmissions. Compared to a case where the maximum number of retransmissions is 2, when the maximum number of retransmissions is 4, the section of the resource selection window 9-03 may need to be selected to be longer for corresponding resource selection.

In the resource selection window 9-03, one resource candidate for PSSCH transmission may be defined to be Rx,y 9-06. A resource pool on time and frequency used for transmission and reception of SL has been described with reference to FIG. 3. The Rx,y 9-06 indicates one resource pool configured of x+j consecutive subchannels in a subchannel region configured as a resource pool with respect to a slot ty 9-04 belonging to the resource pool. Here, j=0, . . . , LsubCH−1 and LsubCH 9-05 is a subchannel length for resource allocation and may be selected within a resource allocation range provided via system information. The number of all resource candidates in the resource selection window 9-03 may be determined to be M. A resource candidate determined that allocating a PSSCH transmission resource is not effective in SA by using a sensing result may be excluded to leave X ($\leq$M) among resource candidates where resource allocation is possible.

A final transmission resource 9-07 may be selected in the resource selection window 9-03 by using results of sensing performed in the sensing window A 9-02 and the sensing window B 9-08. Here, the final transmission resource 9-07 may be selected considering only initial transmission or considering both initial transmission and retransmission.

Then, as shown in FIG. 9, when triggering of selecting the transmission resource is occurred in the slot n (operation 9-01), the sensing window B 9-08 may be defined as follows.

The sensing window B 9-08 may be defined as a slot period of [n+T1', n+T2']. Here, T1' and T2' may be a fixed value or a configurable value. Alternatively, T1' and T2' may be determined to be within a fixed range and the UE may configure a suitable value within the fixed range considering implementation. When k indicates a slot finally selected by a resource, the sensing window B 9-08 may stop at the slot k. Thus, the final sensing window B 9-08 is [n+T1', k]. T1' and T2' may be configured to be the same values as or different values from T1 and T2 of the resource selection window 9-03, respectively. When T1'=0, sensing is performed from the triggering slot n of selecting the transmission resource. Regarding the configured values of T1' and T2', the sensing window B 9-08 may be configured to be one or more slots.

The sensing in the sensing window B 9-08 may be performed by one or a combination of methods described below, and details thereof will be described with reference to Example 4. An SL measurement such as listen before talk (LBT) may be performed in the sensing window B 9-08. LBT may determine whether a current resource is idle (not occupied by the other UE) or busy (occupied by the other UE) via energy detection. Here, LBT is only an example and another method that is an SL measurement method may be used. Thus, the term LBT is not separately used in embodiments of the disclosure below. As such, the sensing in the sensing window B 9-08 may be interpreted as an operation of additionally sensing aperiodic traffic that is not predictable in the sensing window A 9-02. In particular, methods may be distinguished as below depending on configuration of time units and locations where energy detection is performed in the sensing window B 9-08. In a first method, the energy detection is performed in units of slots. In a second method, the energy detection is performed in units of symbols. In a third method, the energy detection is performed in units of time smaller than symbols. In the sensing window B 9-08 as well, similarly to the sensing operation defined in the sensing window A 9-02, a resource determined to be occupied by the other UE in the resource selection window 9-03 and thus not effectively used via SCI decoding and SL measurement performed on the other UE may be additionally excluded.

As described above, the sensing window A 9-02 and the sensing window B 9-08 may be distinguished based on time points when triggering of selecting a transmission resource is provided. In particular, based on the triggering slot n of selecting the transmission resource, a sensing section configured before may be the sensing window A 9-02 and a sensing section configured after may be the sensing window B 9-08. The sensing window A 9-02 may be used for long-term sensing and the sensing window B 9-08 may be used for short-term sensing. Here, the sensing window A 9-02 and the sensing window B 9-08 may be referred to by other terms. Also, one of the sensing window A 9-02 and the sensing window B 9-08 may be used or both the sensing window A 9-02 and the sensing window B 9-08 may be used. Also, a method of using a sensing window may be configurable. A base station may configure the method. In particular, the base station may be connected to a resource pool to pre-configure using of a sensing window for each resource pool. Methods of using only the sensing window A 9-02, only using the sensing window B 9-08, or using both the sensing window A 9-02 and the sensing window B 9-08 may be configured. When corresponding information is configured in the resource pool, UEs in the corresponding resource pool may operate by using the same configuration of sensing windows. Information related to configuration of sensing window may be indicated via SL SIB or UE-specific higher signaling. When the information related to configuration of sensing window is indicated via SL SIB, a corresponding value may be configured in resource pool information among corresponding system information. When the information related to configuration of sensing window is indicated via higher layer, a configured sensing window may be indicated via Uu-RRC or PC5-RRC.

Implementation of sensing and an operation of selecting a transmission resource of Mode 2 in SL may be performed via various methods. When the sensing window A 9-02 and the sensing window B 9-08 are simultaneously configured, the UE may always perform sensing regarding the sensing window A 9-02 and when triggering of selecting a transmission resource occurs in the slot n, select a final transmission resource by performing sensing regarding the sensing window B 9-08. However, because an operation of always performing sensing regarding the sensing window A 9-02 is able to immediately use a sensing result of the sensing window A 9-02 at any time, latency of selecting a transmission resource may be reduced but UE energy consumption may be increased. Thus, as another method, when traffic to be transmitted occurs, the UE may immediately perform sensing regarding the sensing window A 9-02, and the perform sensing regarding the sensing window B 9-08 after triggering of selecting a transmission resource occurs in the slot n to select a final transmission resource. In this case, energy consumption of the UE may be reduced by performing sensing when only necessary, but latency of selecting a transmission resource may be increased.

Example 4

In Example 4 of the disclosure, various methods of performing sensing in the sensing window B 9-08 will be described in detail. As described with reference to Example 3, the sensing window A 9-02 and the sensing window B 9-08 may be distinguished based on time points when the triggering of selecting a transmission resource is provided, and a method of using only one of the sensing window A 9-02 and the sensing window B 9-08 may be considered or a method of using both the sensing window A 9-02 and the sensing window B 9-08 may be considered. In Example 3, it has been described that energy detection may be performed to additionally sense aperiodic traffic not predicted in the sensing window B 9-08 and the sensing window A 9-02, and there may be three methods depending on time units and location configuration where energy detection is performed. When only the sensing window B 9-08 is configured and used, periodic and aperiodic traffics may be simultaneously sensed. It may be determined whether a current resource is idle (not occupied by the other UE) or busy (occupied by the other UE) via energy detection. In particular, when an energy detection result exceeds a (pre-) configured threshold value, the current resource is busy and when the energy detection result does not exceed the (pre-) configured threshold value, the current resource is idle. In addition, in the sensing window B 9-08 as well, similarly to the sensing operation defined in the sensing window A 9-02, a resource determined to be occupied by the other UE in the resource selection window 9-03 and thus not effectively used by performing SCI decoding and SL measurement on the other UE may be additionally excluded. On the other hand, in the sensing window B 9-08, similarly to the sensing operation defined in the sensing window A 9-02, SCI decoding and SL measurement may be performed on the other UE to select a resource and a resource determined to be occupied by the other UE in the resource selection window 9-03 and thus not effectively used may be additionally excluded. Accordingly, when operating together with the sensing window A 9-02, the sensing window A 9-02 and the sensing window B 9-08 may not need to be distinguished. An operation in the sensing window A 9-02 may be referred to as an operation continued even after a time point when triggering of selecting a transmission resource is provided. However, in the sensing window B 9-08, SCI decoding and SL measurement are not performed regarding a resource candidate excluded as a sensing result in the sensing window A 9-02, and SL measurement in a resource candidate in the sensing window B 9-08 is performed in units of one slot. Accordingly, this may correspond to a case where an energy detection section X is fixed to 1 in Method 1 among the three methods of performing energy detection below. Hereinafter, three methods according to time units and location configuration where energy detection is performed will be described in detail. Example 3 described above provides a method of using a sensing window may be operated to be configurable. In this regard, one of various sensing methods in a sensing window B described below may be selected and operated, but one or more of the various sensing methods in the sensing window B may be operated to be configurable. A base station may configure the sensing method. In particular, the base station may be connected to a resource pool to pre-configure the sensing method in the sensing window B for each resource pool. When corresponding information is configured in the resource pool, UEs in the corresponding resource pool may operate by using the same sensing method in the sensing window B. Information related to configuration of a sensing method in the sensing window B may be indicated via SL SIB or UE-specific higher signaling. When the information related to configuration of the sensing method in the sensing window B is indicated via SL SIB, a corresponding value may be configured in the resource pool information among the system information. When the information related to configuration of the sensing method is indicated via higher layer, a configured sensing method in the sensing window B may be indicated via Uu-RRC or PC5-RRC.

Figure 10A:
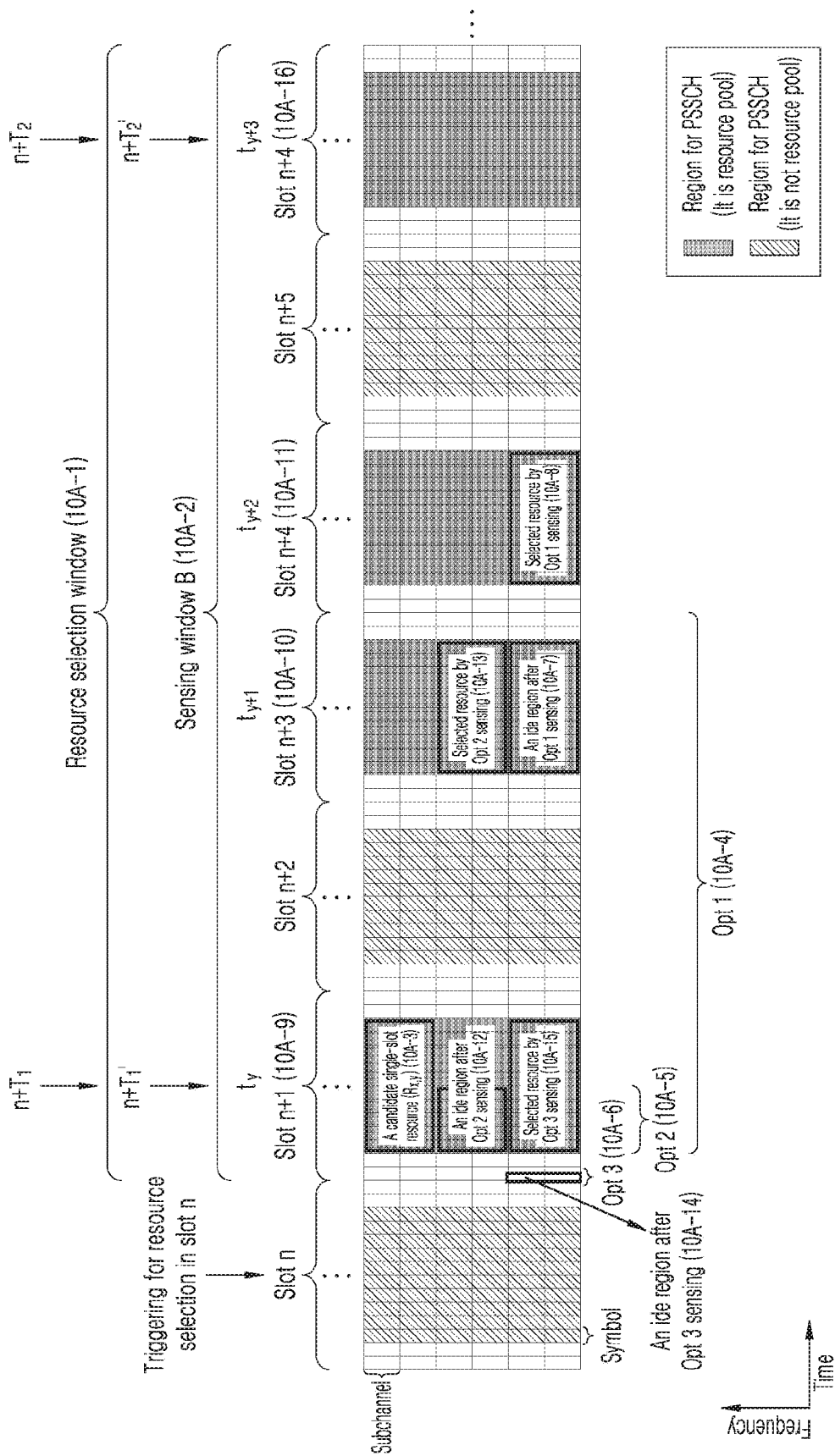
FIG. 10A is a diagram of a method of performing energy detection, according to an embodiment.

FIG. 10A is a diagram of a method of performing energy detection, according to an embodiment.

In Method 1, the energy detection is performed in units of slots. In Method 1, a slot period for the energy detection may be determined within [0 X]. Here, when '0' is configured, the energy detection is not performed and at this time, it may be determined that sensing is not performed. When X=1, the energy detection is performed in units of one slot. Here, X does not denote the number of physical slots, but denotes the number of slots belonging to a resource pool. A value of X may be one fixed value or may be configurable. When the value of X is configurable, the value of X may be configured by being connected to the resource pool. When the value of X is configured in the resource pool, UEs in the same resource pool performs the energy detection in the same X slot period. Alternatively, the UEs in the resource pool may be supported to select the value of X. Here, the UEs may randomly select the value of X within a configurable maximum value, or the value of X may be selected by connecting to a priority value regarding packet transmission of the UE.

In particular, transmission may be performed faster by configuring high priority to have a shorter value of X. A method of enabling the UEs to select different values of X may reduce a probability of occurrence of packet collision. In Method 1, the UE may perform the energy detection in a slot period of X and perform resource transmission in a next slot belonging to the resource pool when a current resource is determined to be idle.

Hereinafter, Method 1 will be described in detail with reference to FIG. 10A. First, a case of performing sensing by only using a sensing window B 10A-2 is considered. When only the sensing window B 10A-2 is used without the sensing window A 9-02, the sensing may be performed without a resource excluded from a resource selection window 10A-1 via sensing in a sensing window A. Referring to FIG. 10A, when Method 1 is used, a slot period 10A-4 for energy detection may be configured. In FIG. 10A, a section [n+T1, n+T2]=[n+1, n+6] of the resource selection window 10A-1 and a section [n+T1', n+T2']=[n+1, n+6] of the sensing window B 10A-2 are identically configured. In FIG. 10A, the slot period 10A-4 for the energy detection is configured as X=2. As described above, because X does not denote the number of physical slots but denotes the number of slots belonging to a resource pool, slots 10A-0 and 10A-10 of FIG. 10A are a slot period where the energy detection is performed according to X=2. As described above in Example 3, Rx,y 10A-3 indicates one resource candidate configured of x+j consecutive subchannels in a subchannel region configured as the resource pool with respect to a slot ty belonging to the resource pool. Here, j=0, . . . , $L_{subCH}$−1 and Rx,y 10A-3 is an example for a case where $L_{subCH}$=2. $L_{subCH}$ is a subchannel length for resource allocation and may be selected within a resource allocation range provided as system information. In FIG. 10A, because X=2, the number of all resource candidates in the slots 10A-9 and 10A-10 belonging to a first slot period for the energy detection may be determined to be N. A UE may perform the energy detection on N resource candidates to determine a resource candidate suitable for transmission. Here, the UE may measure the SL RSSI for each resource candidate for the energy detection and determine whether a corresponding value exceeds a (pre-)configured threshold value. Here, values of the SL RSSI regarding all resource candidates may be sequentially ordered. In Method 1, the SL RSSI may be defined as average received power measured in a frequency domain of a corresponding resource candidate with respect to all OFDM symbols in a PSSCH region within a slot belonging to the resource pool. Also, the (pre-)configured threshold value may be a value determined according to priority and a CBR value of the UE. When the slot period X is greater than 1, there may be a method of determining an idle resource via one shot or a method of determining an idle resource via a contention manner. Referring to FIG. 10A, the method of determining an idle resource via one shot may be a method of selecting a resource determined to be most idle from among all resource candidates in the slot period X for the energy detection. When an idle resource 10A-7 is selected, a transmission resource 10A-8 of a same frequency domain as the idle resource 10A-7 may be selected in a next slot belonging to the resource pool. On the other hand, according to the method of determining an idle resource via a contention manner, referring to FIG. 10A, a corresponding time/frequency domain is determined to be idle only when a resource determined to be most idle in each of the slots 10A-9 and 10A-10 belonging to the first slot period for the energy detection by X=2 is a resource of a same frequency domain, and the same frequency domain may be selected as a transmission resource in a next slot belonging to the resource pool. When X=1, only the method of determining an idle slot via one shot may be used. When the transmission resource 10A-8 is selected, the sensing window B 10A-2 is stopped in a slot 10A-11. When all resources in a slot period where energy detection is performed are determined to be busy, a method of performing back-off in the resource selection window 10A-1 may be considered. Back-off may be defined as an operation by which the UE selects a resource to be transmitted again by determining again an idle resource via sensing during the slot period X for the energy detection. When back-off is performed the value of X may be the same as a previous value. When the UE randomly selected the value of X, the value of X may be randomly selected again during back-off. The UE may continue to perform sensing and when an idle transmission resource is not found during a last slot period for the energy detection before the resource selection window 10A-1 ends, the UE may select a resource candidate having the lowest SL RSSI from among all resource candidates in the last slot period for the energy detection as a result of the energy detection to select the same frequency domain of the next slot belonging to the resource pool as a transmission resource. In FIG. 10A, when all resources in the slot period 10A-4 for the energy detection are determined to be busy, the energy detection may be performed in the next slot 10A-11 belonging to the resource pool. As in FIG. 10A, the last slot period for the energy detection before the resource selection window 10A-1 ends may not maintain a same size as a previous slot period for the energy detection depending on a configured section of the resource selection window 10A-1, the slot period X for the energy detection, and a slot configured as the resource pool. As shown in FIG. 10A, when all resources in the slot period 10A-4 for the energy detection are determined to be busy, the next slot 10A-11 belonging to the resource pool becomes the last slot period for the energy detection before the resource selection window 10A-1 ends, and thus when all resource candidates of the slot 10A-11 are busy, the resource candidate having the lowest SL RSSI is selected to select the same frequency domain of the next slot belonging to the resource pool as the transmission resource.

In Method 2, the energy detection is performed in units of symbols. In Method 2, a symbol section for the energy detection may be determined within a PSSCH symbol region [0 Y] of a slot belonging to a resource pool. Here, when '0' is configured, the energy detection is not performed and at this time, it may be determined that sensing is not performed. When Y=4, the energy detection is performed in a slot period from a first symbol to a fourth symbol in a PSSCH region of a slot. Accordingly, a maximum value configurable as Y may be determined by the number of OFDM symbols occupied by the PSSCH. Here, a value of Y may be one fixed value or may be configurable. A case in which the value of Y is fixed to the maximum value of the number of OFDM symbols occupied by the PSSCH is the same as a case in which the value of slot period X for the energy detection is fixed to 1 in Method 1. When the value of Y is configurable, the value of Y may be configured by being connected to the resource pool. When the value of Y is configured in the resource pool, UEs in the same resource pool performs the energy detection in the same Y symbol section. Alternatively, the UEs in the resource pool may be supported to select the value of Y. Here, the UEs may randomly select the value of Y within a configurable maximum value, or the value of Y may be selected by connecting to a priority value regarding packet transmission of the UE. In particular, transmission may be performed faster by configuring high priority to have a shorter value of Y. A method of enabling the UEs to select different values of Y may reduce a probability of occurrence of packet collision. In Method 2, the UE may perform the energy detection in a symbol section of Y and perform resource transmission in a PSSCH symbol section remaining in a current slot or in a next slot belonging to the resource pool when a current resource is determined to be idle. When the resource transmission is performed in the remaining PSSCH symbol section of the current slot, the resource transmission may be supported only when PSSCH transmission is allowed to start at any location in the PSSCH region.

In Method 3, the energy detection is performed in units of time smaller than symbols. In Method 3, a section for the energy detection may be determined within [0 Z]. Here, when '0' is configured, the energy detection is not performed and at this time, it may be determined that sensing is not performed. Z is a time duration configured for the energy detection. The energy detection may be performed in units of short time, such as 16 μsec or 4 μsec. An OFDM symbol length T according to SCS may be as follows: SCS=15 kHz, T=66.67 μsec; SCS=30 kHz, T=33.33 μsec; SCS=60 kHz, T=16.67 μsec; and SCS=120 kHz, T=8.33 μsec.

Accordingly, an energy detection section of 16 μsec is included in units of time smaller than symbols excluding when SCS=120 kHz, and an energy detection section of 4 μsec is included in units of time smaller than symbols throughout all SCSs. Method 3 will be described in more detail with reference to FIG. 10A. First, a case of performing sensing by only using the sensing window B 10A-2 is considered. When only the sensing window B 10A-2 is used without a sensing window, the sensing may be performed without a resource excluded from the resource selection window 10A-1 via sensing in the sensing window A. Referring to FIG. 10A, when Method 3 is used, a time duration Z 10A-6 for energy detection may be configured. In FIG. 10A, the section [n+T1, n+T2]=[n+1, n+6] of the resource selection window 10A-1 and the section [n+T1', n+T2']=[n+1, n+6] of the sensing window B 10A-2 are identically configured. An example of a section for the energy detection in FIG. 10A is shown in the time duration Z 10A-6. The time duration Z 10A-6 shows that a partial region in a first symbol of the section 10A-9 may be used as an energy detection section. However, the energy detection section is not limited to a region corresponding to a start location of a slot such as the time duration Z 10A-6, and various examples of a time domain using Method 3 will be described with reference to FIG. 10B. As described above in Example 3, the Rx,y 10A-3 may indicate one resource candidate configured of x+j consecutive subchannels in a subchannel region configured as the resource pool with respect to a slot ty belonging to the resource pool. Here, j=0, . . . , $L_{subCH}$−1 and Rx,y 10A-3 is an example for a case where $L_{subCH}$=2. $L_{subCH}$ is a subchannel length for resource allocation and may be selected within a resource allocation range delivered as system information. Referring to FIG. 10A, the number of all resource candidates in the slot 10A-9 to which the time duration Z 10A-6 configured as the energy detection section belongs may be determined to be N. The UE may perform the energy detection on N resource candidates to determine a resource candidate suitable for transmission. Here, the UE may measure the SL RSSI for each resource candidate for the energy detection and determine whether a corresponding value exceeds a (pre-)configured threshold value. Here, values of the SL RSSI regarding all resource candidates may be sequentially ordered. In Method 3, the SL RSSI may be defined as average received power measured in a first certain time duration of a specific region in a slot and in a frequency domain of a corresponding resource candidate. Here, the energy detection section may be performed in units of time smaller than symbols. When the energy detection is performed in units of time smaller than symbols as in Method 3, the energy detection may also be performed in a time domain. The energy detection regarding Method 1, Method 2, or Method 3 may be performed in all of time and frequency domains, and is not limited to the energy detection in a specific domain of the disclosure. Also, the (pre-) configured threshold value may be a value determined according to priority and a CBR value of the UE. Referring to FIG. 10A, when an idle resource 10A-14 is selected as a result of the energy detection measured in the time duration Z 10A-6, a transmission resource 10A-15 in a same frequency domain as the idle resource 10A-14 may be selected in the slot 10A-9. As such, in Method 3, a transmission resource may be immediately selected from a slot where the energy detection is performed. In Method 2 as well, when the symbol length for the energy detection is fixed and configured in a specific region instead of a region where the PSSCH is transmitted, it may be possible to immediately select the transmission resource in a slot where the energy detection is performed. When the transmission resource 10A-15 is selected, the sensing window B 10A-2 may be stopped in the slot 10A-9. When all resources in the time duration Z where energy detection is performed are determined to be busy, the method of performing back-off in the resource selection window 10A-1 may be considered. Back-off may be defined as an operation by which the UE selects a resource to be transmitted again by determining an idle resource again via sensing during the energy detection section of the length Z at an agreed specific location of a next slot belonging to the resource pool. When back-off is performed the value of Z may be the same as a previous value. When the UE randomly selected the value of Z, the value of Z may be randomly selected again during back-off. Hereinafter, it will be described that the value of Z may be differently selected via configuration of an offset value with reference to FIG. 10B. The UE may continue to perform sensing and when an idle transmission resource is not found during a last energy detection section before the resource selection window 10A-1 ends, the UE may select a resource candidate having the lowest SL RSSI from among all resource candidates in a slot to which the last energy detection section belongs as a result of the energy detection to select the same frequency domain of the corresponding slot as a transmission resource. When Method 3 is used, a slot 10A-16 of FIG. 10A is a slot with the last energy detection section before the resource selection window 10A-1 ends. When all resources in the slot are determined to be busy as the result of the energy detection, the resource candidate having the lowest SL RSSI may be selected to select the same frequency domain of the corresponding slot as the transmission resource.

Next, there is a method in which the energy detection is performed in a specific region in a slot. Method 3 described above may be used as such a method. Also, such a method may be used when a region where the energy detection is performed is applied in a fixed symbol length in a specific region in a slot other than a PSSCH region in Method 2.

Figure 10B:
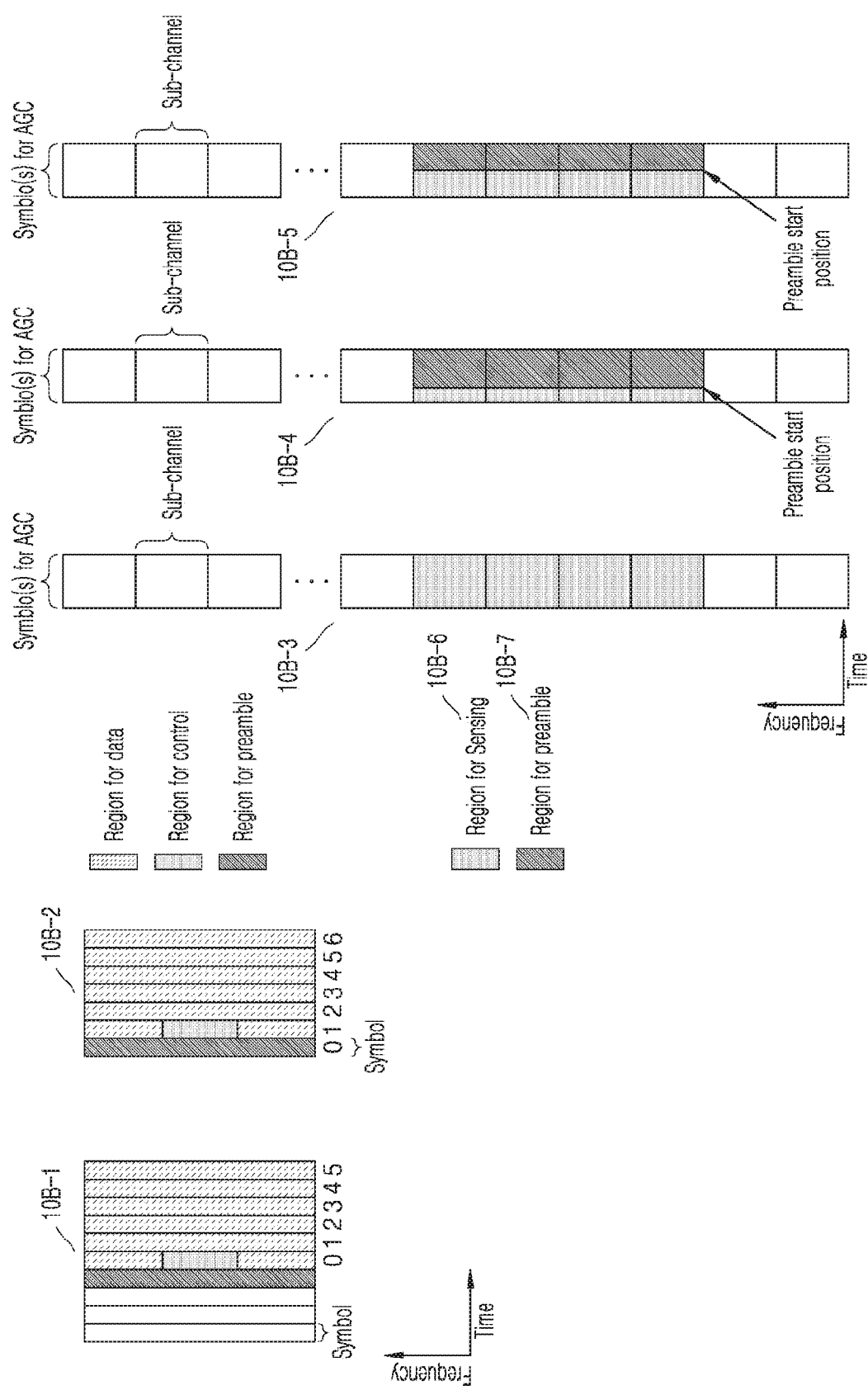
FIG. 10B is a diagram of a method of performing energy detection in a specific region within a slot, according to an embodiment.

FIG. 10B is a diagram of a method of performing energy detection in a specific region within a slot, according to an embodiment.

Referring to FIG. 10B, a last symbol 10B-1 of a previous slot of a slot attempting transmission and a front symbol 10B-2 of the slot attempting transmission are illustrated. A last symbol region of a slit in SL may be used as a region for a guard period (GP) and automatic gain control (AGC). Also, a first symbol region of the slot may be used as a symbol region for AGC. In the last symbol 10B-1 and the front symbol 10B-2, a corresponding region is illustrated as one OFDM symbol, but the disclosure is not limited thereto. In NR SL, two or more symbol regions may be used for AGC. In the disclosure, an AGC region may be used to perform sensing in a sensing window B. As in the last symbol 10B-1, when an AGC region is located in a last region of the slot, a UE may transmit a preamble from an AGC region of the previous slot transmitting data or as in the front symbol 10B-2, when an AGC region is located in a first region of the lost, the UE may transmit a preamble from an AGC region of a current slot transmitting data. Here, the UE may determine whether a slot attempting transmission by performing energy detection on the transmitted preamble in the AGC region is idle or busy. In particular, when an energy detection result exceeds a (pre-)configured threshold value, the current resource is determined to be busy and when the energy detection result does not exceed the (pre-)configured threshold value, the current resource is determined to be idle. Various methods of performing sensing in an AGC region will be described via cases 10B-3 through 10B-5. In the cases 10B-3 through 10B-5, an AGC region may be configured of one or more symbols. Also, according to the cases 10B-3 through 10B-5, the UE may perform energy detection in slot and frequency resource locations to perform sensing in a sensing window. In the cases 10B-3 through 10B-5, a region indicated as a region 10B-6 for sensing may indicate a portion in an AGC section connected to a slot to which a resource candidate corresponding to the Rx,y 10A-3 belongs in FIG. 10A. A case where AGC is transmitted in a first region of a slot may correspond to a portion corresponding to the time duration Z 10A-6 of FIG. 10A. First, in a method of the case 10B-3, all regions configured as the AGC region may be used as a sensing section. The UE that performs sensing may not transmit the preamble in the AGC region, but may perform only the energy detection. However, in the method of the case 10B-3, when one or more UEs transmit the preamble in a corresponding section, all UEs performing sensing may be determine that a corresponding slot is busy. Thus, methods of the cases 10B-4 and 10B-5 may be used. The methods of the cases 10B-4 and 10B-5 are methods of supporting a starting location where an AGC preamble 10B-7 is transmitted to be differently configured for each UE. Compared with the case 10B-4, the starting location where the preamble 10B-7 is transmitted may be further back in the case 10B-5. The UE may perform the energy detection in a previous time duration of a starting location where a preamble is transmitted. When the methods of the cases 10B-4 and 10B-5 are used, an offset value regarding the starting location where the preamble is transmitted may be indicated to the UE. Candidate values configurable as the offset value may be pre-configured via a higher layer such as RRC, and the UE may randomly select one of the configured offset candidate values. On the other hand, a method of selecting an offset value by connecting to a priority value regarding packet transmission of a UE may be considered. In particular, transmission may be performed faster by configuring high priority to have a shorter offset value. As an example of an available method, when a plurality of candidate values are configured from a low value to a high value for an offset value, selectable candidate values may be limited depending on priority. When the priority is high, low offset candidate values may be randomly selected and when the priority is low, high offset candidate values may be randomly selected. An additional offset value may be configured according to priority, and the additional offset value may be added to the offset value regarding the starting location where the preamble is transmitted. Here, the additional offset value may also be determined to be a pre-configured fixed value according to priority and may be adjusted not to exceed a configured preamble transmission section.

In FIGS. 10A and 10B, sensing is performed using only a sensing window B. When only a sensing window B is used without a sensing window, sensing may be performed without a resource excluded from a resource selection window via sensing in the sensing window A. However, sensing and an operation of selecting a final transmission resource may vary when the sensing window A and the sensing window B are simultaneously used and when the sensing window B performs SCI decoding and SL measurement to additionally exclude a resource determined to be not effective by being occupied by another UE in a resource selection window. Hereinafter, sensing performed in such a case will be described with reference to FIGS. 10C and 10D.

Figure 10C:
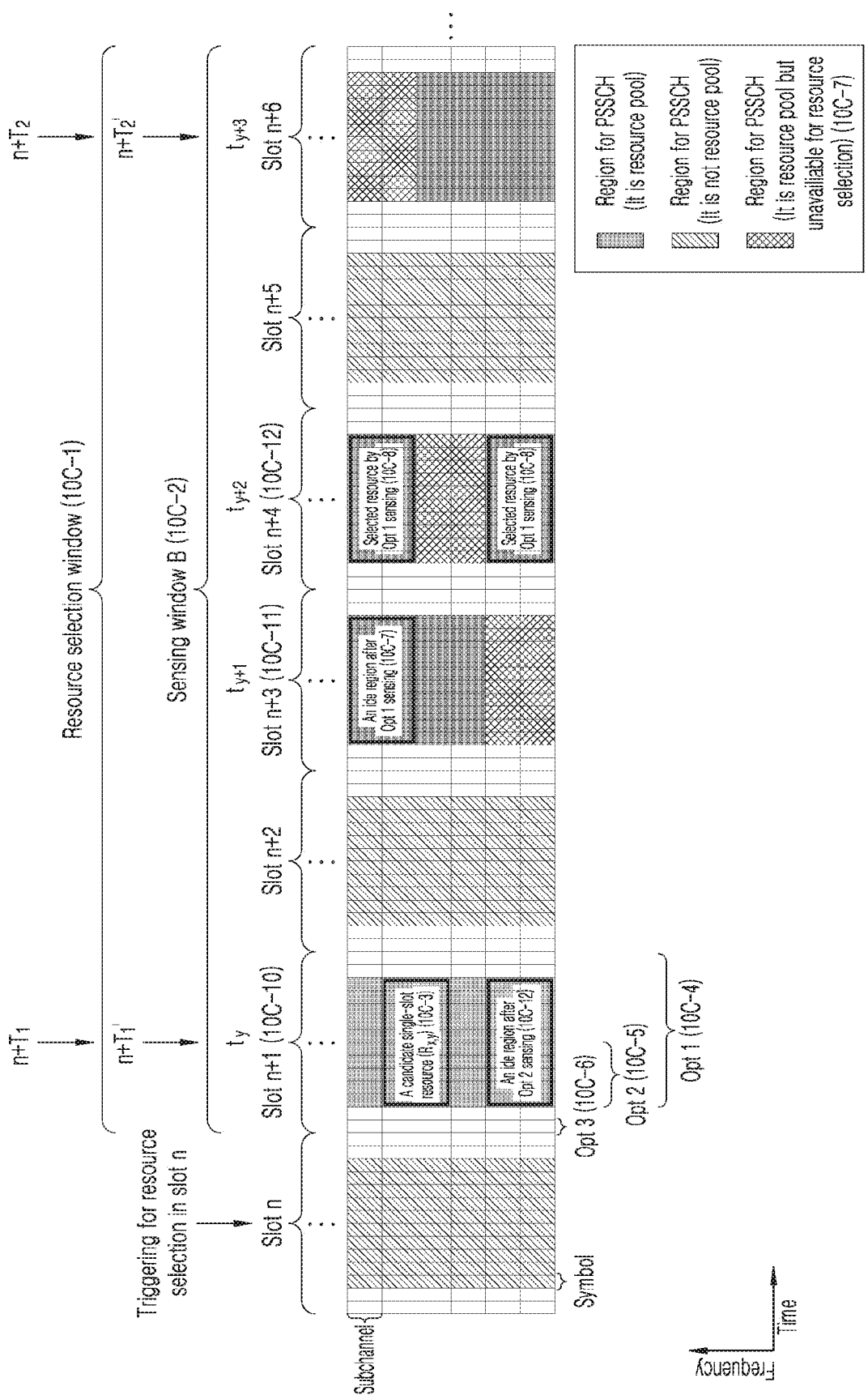
FIG. 10C is a diagram showing a case in which resource candidates remaining in a resource selection window as a result of a sensing window A are all used for a sensing window B, according to an embodiment.

FIG. 10C is a diagram showing a case in which resource candidates remaining in a resource selection window as a result of a sensing window A are all used for a sensing window B, according to an embodiment. On the other hand, FIG. 10D illustrates a case where a resource candidate selectable in a sensing window B is limited when a method of reporting resource candidates remaining in a resource selection window as a result of a sensing window A to a higher layer of a UE and selecting a transmission resource candidate in the higher layer of the UE.

Referring to FIG. 10C, resource candidates remaining in a resource selection window 10C-1 as a result of sensing in a sensing window A may all be used in a sensing window B 10C-2. A case 10C-7 may indicate a resource excluded as a result of sensing in the sensing window A. Here, an operation of down-selecting a resource candidate remaining in the resource selection window 10C-1 again in a higher layer of a UE or selecting a final transmission resource may be excluded. FIG. 10C may be identically considered in the case 10C-7 where SCI decoding and SL measurement are performed in the sensing window B 10C-2 to additionally exclude a resource determined to be not effective by being occupied by another UE in the resource selection window 10C-1. A UE may perform SCI decoding in the sensing window B 10C-2 and determine whether the other UE reserved a resource in the resource selection window 10C-1 to exclude the resource from resource candidates in the resource selection window 10C-1 according to an SL measurement result. In FIG. 10C, a resource region unavailable for resource selection in the resource selection window 10C-1 because an operation of excluding a resource is performed is illustrated via the case 10C-7. Thus, when sensing and resource selection is performed in the sensing window B 10C-2, the sensing is not performed in a resource region unavailable for resource selection as in the case 10C-7 and the resource region is unable to be selected as a transmission resource. In this case as well, as shown in FIG. 10C, Methods 1 through 3 described above as in cases 10C-4 through 10C-6 may all be used as a method of configuring a section for energy detection in the sensing window B 10C-2. In FIG. 10C, a section [n+T1, n+T2]=[n+1, n+6] of the resource selection window 10C-1 and a section [n+T1', n+T2']=[n+1, n+6] of the sensing window B 10C-2 are identically configured. Unlike FIG. 10A, when Method 1 is used in FIG. 10C, a slot period for energy detection is configured to be X=1 (case 10C-4). As described above, X does not denote the number of physical slots, but denotes the number of slots belonging to a resource pool. Here, when X is fixed to 1 and an operation of additionally excluding a resource determined to be not effective by being occupied by another UE in the resource selection window 10C-1 via SCI decoding and SL measurement in a sensing window B together with a sensing window A, the sensing window A and the sensing window B may not be distinguished and an operation in the sensing window A may continue even after a time point when triggering of selecting a transmission resource is provided. A resource candidate not available in the case 10C-7 may be a resource excluded as a result of sensing in the sensing window A or sensing window B. As described above in Example 3, Rx,y 10C-3 indicates one resource candidate configured of x+j consecutive subchannels in a subchannel region configured as the resource pool with respect to a slot ty belonging to the resource pool. Here, j=0, . . . , $L_{subCH}-1$ and Rx,y 10C-3 is an example for a case where $L_{subCH}=2$. $L_{subCH}$ is a subchannel length for resource allocation and may be selected within a resource allocation range delivered as system information. In FIG. 10C, because X=1, the number of all resource candidates in the a slot 10C-10 belonging to a first slot period for the energy detection may be determined to be N. A UE may perform the energy detection on N resource candidates to determine a resource candidate suitable for transmission. Here, the UE may measure the SL RSSI for each resource candidate for the energy detection and determine whether a corresponding value exceeds a (pre-)configured threshold value. Here, values of the SL RSSI regarding all resource candidates may be sequentially ordered. In Method 1 described above, when X=1, only the method of determining an idle slot via one shot may be used. Referring to FIG. 10C, in a slot period X=1 for energy detection via one shot, a resource determined to be most idle among all resource candidates may be selected. When an idle resource is selected accordingly (case 10C-8), transmission may be attempted in a next slot 10C-11 belonging to a resource pool. However, as shown in the case 10C-7, the same frequency domain as the case 10C-8 of the next slot 10C-11 belonging to the resource pool may be a resource region unavailable for resource selection. In this case, two methods may be considered. A first method is a method of attempting transmission in a next slot 10C-12 belonging to the resource pool (case 10C-9). In the slot 10C-12, because a frequency domain same as the case 10C-8 is an available region for resource selection, the frequency domain may be selected as a transmission resource (case 10C-9). A second method is a method of, when an idle resource is selected in the slot 10C-10 (case 10C-8), searching for an idle resource again by performing energy detection in another region of the next slot 10C-11 in a case where the frequency domain same as the case 10C-8 of the next slot 10C-11 belonging to the resource pool is not available for resource selection as in the case 10C-7. When the idle resource is selected again in the next slot 10C-11 by using the second method, the next slot 10C-12 belonging to the resource pool may attempt transmission. In the slot 10C-12, because a frequency domain same as a case 10C-13 is an available region for resource selection, the frequency domain may be selected as a transmission resource (case 10C-14). In the above two methods, a sensing window B may be stopped when a transmission resource is finally selected. When all resources in a slot period where energy detection is performed are determined to be busy, a method of performing back-off in the resource selection window 10C-1 may be considered. A detailed method of performing back-off has been described above with reference to Methods 1 through 3 regarding energy detection. FIG. 10C is described based on Method 1, but may be applied to Method 2 and Method 3 as well.

Figure 10D:
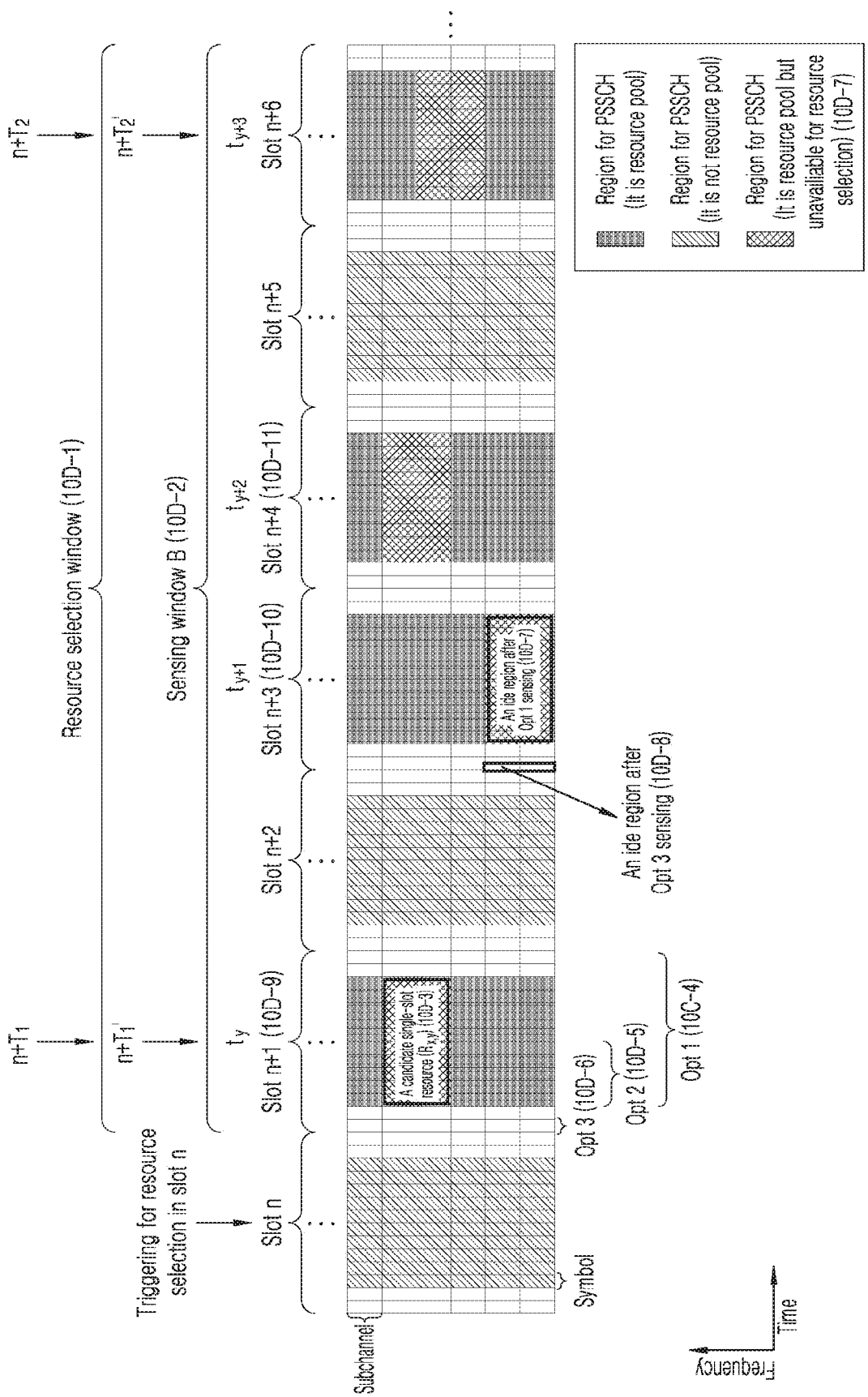
FIG. 10D is a diagram showing a case in which resource candidates remaining in a resource selection window as a sensing result of a sensing window A are reported to a higher layer of a UE and sensing is performed in a sensing window B, according to an embodiment.

FIG. 10D is a diagram showing a case in which resource candidates remaining in a resource selection window as a sensing result of a sensing window A are reported to a higher layer of a UE and sensing is performed in a sensing window B, according to an embodiment.

Unlike FIG. 10C, referring to FIG. 10D, a case where resource candidates remaining in a resource selection window 10D-1 as a sensing result in a sensing window A are reported to a higher layer of a UE and sensing is performed in a sensing window B 10D-2 after the higher layer of the UE selects a resource candidate is illustrated. As such, FIG. 10D illustrates a case where the number X of resource candidates remaining in the resource selection window 10D-1 as the sensing result in the sensing window A is reported to the higher layer of the UE and a resource is selected among Y (1≤Y<X) resource candidates via sensing in the sensing window B 10D-2 as the Y resource candidates are down-selected (case 10D-7). Thus, when sensing and resource selection is performed in the sensing window B 10D-2, the sensing is performed only in a resource region available for resource selection as in the case 10C-7 and the resource region is selected. Thus, it may be difficult to perform sensing and select a resource according to an energy detection method. FIG. 10D shows an example of using Method 1 for energy detection described above (case 10D-4). When Method 1 is used in FIG. 10D, a slot period for energy detection is configured to be X=1 (case 10D-4). As described above, X does not denote the number of physical slots, but denotes the number of slots belonging to a resource pool. As described above, n FIG. 10D, because X=1, the number of all resource candidates in the a slot 10D-9 belonging to a first slot period for the energy detection may be determined to be N. A UE may perform the energy detection on N resource candidates to determine a resource candidate suitable for transmission. Here, when all resources are determined to be busy via energy detection in the slot 10D-9 and an idle resource is selected (case 10D-7) by performing energy detection on a next slot 10D-10 corresponding to a resource pool, a next slot 10D-11 belonging to the resource pool may attempt transmission. In FIG. 10D, there may be no transmission resource selectable in a slot after the case 10D-7. In other words, Method 1 may cause a problem in sensing and resource selection of FIG. 10D. However, as described above with reference to FIG. 10B, the problem of Method 1 may be somewhat resolved when a method of configuring an energy detection section in a specific region such as an AGC region is applied. To configure the energy detection section in the specific region such as AGC region, a fixed symbol length may be configured and used as the energy detection section as in Method 2 within a symbol region occupied by the AGC region or a length smaller than a symbol length may be configured and used as the energy detection section as in Method 3 within a symbol region occupied by an AGC region, as described with reference to FIG. 10B. In a case where Method 3 is used in FIG. 10D (case 10D-6) and a section Z configured as the energy detection section is configured in a partial section of a first symbol of a slot that is not a PSSCH region as in the slot 10D-10, when an idle resource region is selected from among resource candidates in the slot 10D-10 by performing energy detection on a corresponding region (case 10D-8), it may be possible to select and immediately transmit a resource corresponding to a same frequency domain as the case 10D-8 from the slot 10D-10 as a transmission resource. However, as shown in FIG. 10D, when a method of reporting the resource candidates remaining in the resource selection window 10D-1 as a result of the sensing window A to the higher layer of the UE and selecting, by the higher layer of the UE, a transmission resource candidate is used, resource candidates selectable by the sensing window B 10D-2 may be limited and thus sensing and resource selection may be limited.

Example 5

Example 5 of the disclosure provides a method and apparatus for selecting a transmission resource considering ACK/NACK feedback timing and a respective available retransmission time point when HARQ feedback-based retransmission is performed.

Figure 11:
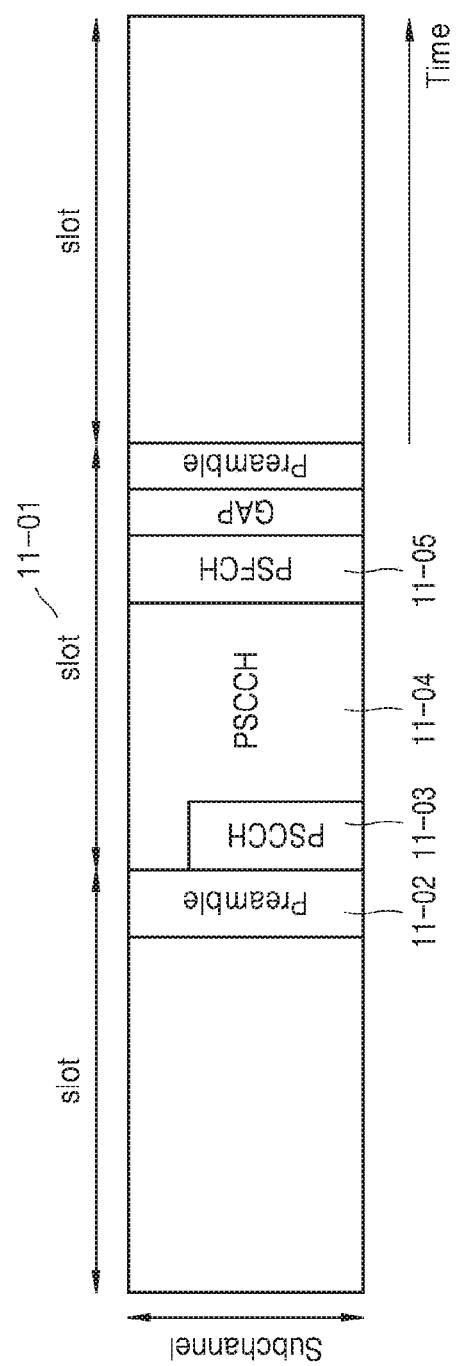
FIG. 11 is a diagram of a mapping structure of physical channels mapped to one slot in sidelink, according to an embodiment.

FIG. 11 is a diagram of a mapping structure of physical channels mapped to one slot in SL, according to an embodiment.

Referring to FIG. 11, a preamble signal 11-02 may be transmitted from one or more symbols before a transmission UE transmits a corresponding slot 11-01. The preamble signal 11-02 may be used for a reception UE to correctly perform AGC for adjusting strength of amplification when amplifying power of a reception signal. Also, transmission of the preamble signal 11-02 may be determined depending whether the transmission UE transmits a previous slot of the corresponding slot 11-01. In other words, transmission of the preamble signal 11-02 may be omitted when the transmission UE transmits a signal to the same UE in the previous slot of the corresponding slot 11-01. PSCCH 11-03 including control information in initial symbols of a slot is transmitted, and PSSCH 11-04 may be transmitted scheduled by the control information of PSCCH 11-03. A part of SCI that is control information may be mapped and transmitted to PSSCH 11-04. Also, FIG. 11 illustrates that a physical SL feedback channel (PSFCH) 11-05 that is a physical channel transmitting feedback information is located at a last portion of the corresponding slot 11-01. A gap of certain time may be secured between PSSCH 11-04 and PSFCH 11-05 for a UE that transmits or receives PSSCH 11-04 to prepare to receive or transmit PSFCH 11-05. A gap of certain time may be secured after transmission/reception of PSFCH 11-05.

A UE may be pre-configured with a location of a slot for transmitting PSFCH 11-05. Being pre-configured may denote that the location of the slot is pre-determined while the UE is prepared, received when a system related to SL is accessed, received from a base station when the base station is accessed, or received from another UE.

Figure 12:
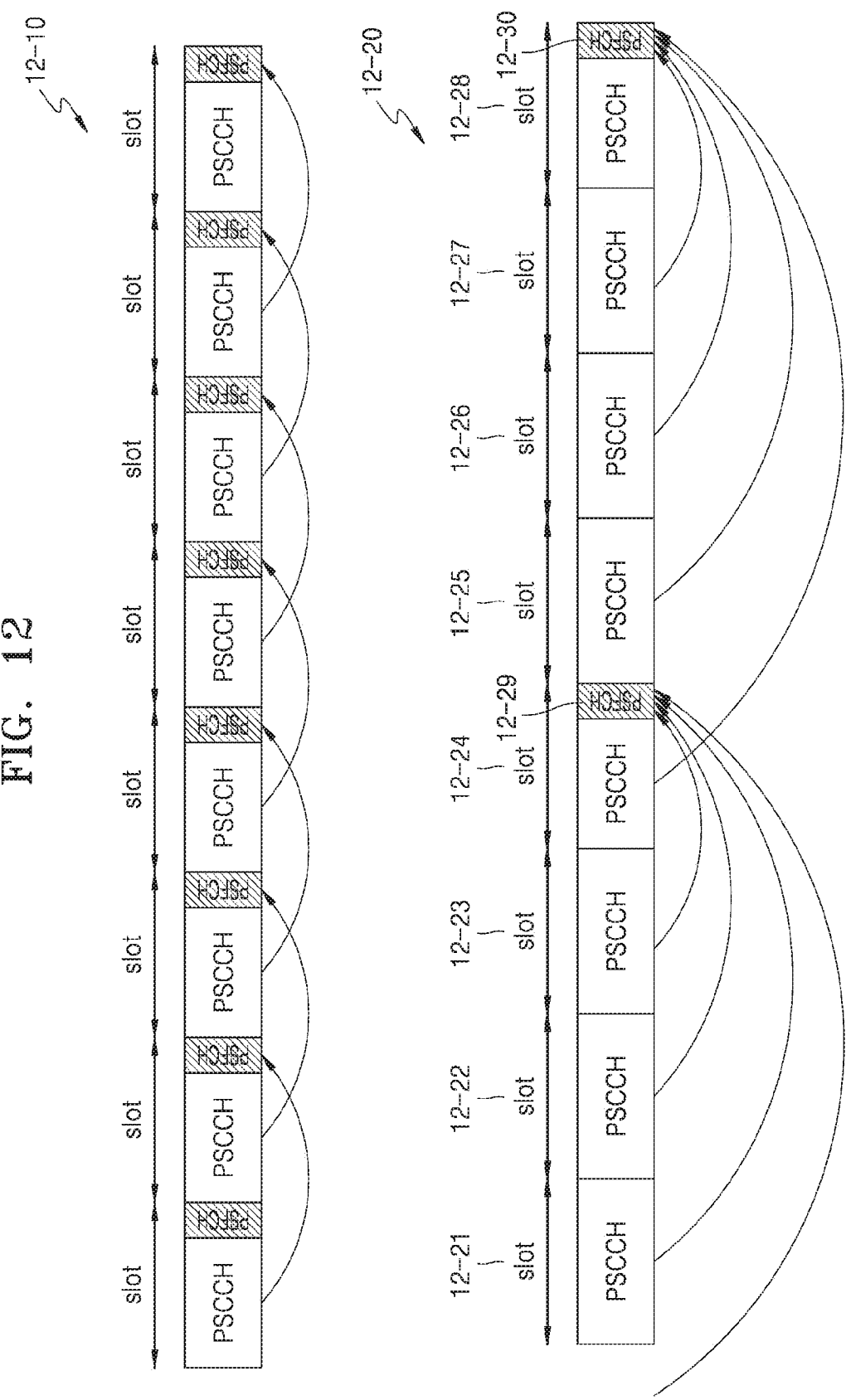
FIG. 12 is a diagram showing that a resource for transmitting and receiving a PSFCH is configured, according to an embodiment.

FIG. 12 is a diagram showing that a resource for transmitting and receiving a PSFCH is configured, according to an embodiment of the disclosure.

In particular, referring to a case 12-10 of FIG. 12, an example where a resource capable of transmitting and receiving a PSFCH is configured for each slot is shown. When a period of a resource capable of transmitting and receiving a PSFCH is configurable by a parameter such as periodicity_PSFCH_resource, a slot 12-01 may be periodicity_PSFCH_resource=1 slot. Alternatively, a period may be configured in units of milliseconds (msec), and a resource may be configured every slot belonging to a resource pool according to SCS. A case 12-20 shows an example where a resource is configured every 4 slots to transmit and receive a PSFCH. Referring to FIG. 12, only a last slot 12-24 among four slots 12-21 through 12-24 may be configured to transmit and receive PSFCH 12-29. Similarly, only a last slot 12-28 among four slots 12-25 through 12-28 may be configured to transmit and receive PSFCH 12-30. A slot may be determined in a resource pool. Referring to FIG. 12, a slot index may be configured in a slot determined in a resource pool. In other words, although the four slots 12-21 through 12-24 are not actual physically consecutive slots, but may be slots appear to be consecutive among slots belonging to a resource pool (or slot pool) used by a transceiver. An arrow shown in FIG. 12 may indicate a slot of a PSFCH where HARQ feedback information of a PSSCH is transmitted. HARQ feedback information of a PSSCH transmitted from the slots 12-21 through 12-23 may be transmitted and received by being included in a PSFCH that may be transmitted from the slot 12-24. Similarly, HARQ feedback information of a PSSCH transmitted from the slots 12-25 through 12-27 may be transmitted and received by being included in a PSFCH that may be transmitted from the slot 12-28. The HARQ feedback information of a PSSCH transmitted from the slot 12-24 is unable to be transmitted from the same slot 12-24 because time may be insufficient for a UE to finish decoding of a PSSCH transmitted from the slot 12-24 and then transmit a PSFCH from the slot 12-24. In other words, the minimum processing time required to process a PSSCH and prepare a PSFCH may not be small enough. Accordingly, when a PSSCH is received from a slot n and a resource capable of transmitting a PSFCH is configured or provided in a slot n+x, the UE that received the PSSCH may use x that is a smallest integer among integers greater than and equal to K to map and transmit HARQ-ACK feedback information of a PSSCH to a PSFCH of the slot n+x. K may be a value pre-configured by a transmission UE or a value configured in a resource pool where a corresponding PSSCH or PSFCH is transmitted, and each UE may pre-exchange capability with the transmission UE for configuration. K may be a value determined according to at least one of SCS, UE capability, a configuration value with the transmission UE, or configuration of the resource pool.

When N=1 and K=2, i.e., when a PSFCH transmission resource is configured every slot in the resource pool and HARQ feedback of a PSSCH is transmittable after at least 2 slots after PSSCH is transmitted, slots where a PSFCH that is capable of transmitting HARQ feedback is transmittable may be determined as Table 5 below.

TABLE 5

| | N = 1, K = 2 | | | | | | | | | | | | | | | |
|---|---|---|---|---|---|---|---|---|---|---|---|---|---|---|---|---|
| | Logical slot index | | | | | | | | | | | | | | | |
| | 1 | 2 | 3 | 4 | 5 | 6 | 7 | | 8 | 9 | 10 | 11 | 12 | 13 | | |
| Physical slot index | n−2 | n−1 | n | n+1 | n+2 | n+3 | n+4 | n+5 | n+6 | n+7 | n+8 | n+9 | n+10 | n+11 | n+12 | n+13 | n+14 | n+15 | n+16 |

TABLE 5-continued

| | N = 1, K = 2 | | | | | | | | | | | | |
|---|---|---|---|---|---|---|---|---|---|---|---|---|---|
| | Logical slot index | | | | | | | | | | | | |
| | 1 | 2 | 3 | 4 | 5 | 6 | 7 | 8 | 9 | 10 | 11 | 12 | 13 |
| Possibility to transmit PSSCH | ○ | ○ | ○ | X | ○ | ○ | ○ | X X X ○ X X | ○ | ○ | ○ | ○ | ○ | ○ |
| Possibility to transmit PSFCH | ○ | ○ | ○ | X | ○ | ○ | ○ | X X X ○ X X | ○ | ○ | ○ | ○ | ○ | ○ |

When N=2 and K=2, i.e., when a PSFCH transmission resource is configured every two slots in the resource pool and HARQ feedback of a PSSCH is transmittable after at least 2 slots after a PSSCH is transmitted, slots where a PSFCH that is capable of transmitting HARQ feedback is transmittable may be determined as Table 6 below.

TABLE 6

| | N = 2, K = 2 | | | | | | | | | | | | |
|---|---|---|---|---|---|---|---|---|---|---|---|---|---|
| | Logical slot index | | | | | | | | | | | | |
| | 1 | 2 | 3 | 4 | 5 | 6 | 7 | 8 | 9 | 10 | 11 | 12 | 13 |
| Physical slot index | n−2 | n−1 | n | n+1 | n+2 | n+3 | n+4 n+5 n+6 n+7 n+8 n+9 n+10 | n+11 | n+12 | n+13 | n+14 | n+15 | n+16 |
| Possibility to transmit PSSCH | ○ | ○ | ○ | X | ○ | ○ | ○ X X X ○ X X | ○ | ○ | ○ | ○ | ○ | ○ |
| Possibility to transmit PSFCH | ○ | X | ○ | X | X | ○ | X X X X ○ X X | X | ○ | X | ○ | X | ○ |

When N=4 and K=2, i.e., when a PSFCH transmission resource is configured every four slots in the resource pool and HARQ feedback of a PSSCH is transmittable after at least 2 slots after PSSCH is transmitted, slots where a PSFCH that is capable of transmitting HARQ feedback is transmittable may be determined as Table 7 below.

TABLE 7

| | N = 4, K = 2 | | | | | | | | | | | | |
|---|---|---|---|---|---|---|---|---|---|---|---|---|---|
| | Logical slot index | | | | | | | | | | | | |
| | 1 | 2 | 3 | 4 | 5 | 6 | 7 | 8 | 9 | 10 | 11 | 12 | 13 |
| Physical slot index | n−2 | n−1 | n | n+1 | n+2 | n+3 | n+4 n+5 n+6 n+7 n+8 n+9 n+10 | n+11 | n+12 | n+13 | n+14 | n+15 | n+16 |
| Possibility to transmit PSSCH | ○ | ○ | ○ | X | ○ | ○ | ○ X X X ○ X X | ○ | ○ | ○ | ○ | ○ | ○ |
| Possibility to transmit PSFCH | X | X | ○ | X | X | X | X X X X ○ X X | X | X | X | ○ | X | X |

When N=4 and K=1, i.e., when a PSFCH transmission resource is configured every four slots in the resource pool and HARQ feedback of a PSSCH is transmittable from a next slot after a PSSCH is transmitted, slots where a PSFCH that is capable of transmitting HARQ feedback is transmittable may be determined as Table 8 below.

TABLE 8

N = 4, K = 1

| | | | | | | Logical slot index | | | | | | |
|---|---|---|---|---|---|---|---|---|---|---|---|---|
| 1 | 2 | 3 | 4 | 5 | 6 | 7 | 8 | 9 | 10 | 11 | 12 | 13 |

| Physical slot index | n−2 | n−1 | n | n+1 | n+2 | n+3 | n+4 | n+5 | n+6 | n+7 | n+8 | n+9 | n+10 | n+11 | n+12 | n+13 | n+14 | n+15 | n+16 |
|---|---|---|---|---|---|---|---|---|---|---|---|---|---|---|---|---|---|---|---|
| Possibility to transmit PSSCH | O | O | O | X | O | O | O | X | X | X | O | X | X | O | O | O | O | O | O |
| Possibility to transmit PSFCH | X | O | X | X | X | X | O | X | X | X | X | X | X | X | X | O | X | X | X |

According to Tables 5 through 8, a slot capable of transmitting a PSFCH may vary depending on a configuration value of a period N of a resource capable of transmitting and receiving a PSFCH and a configuration value of an offset value K between a slot that received the PSSCH and a slot that transmits the PSFCH. Accordingly, a transmission resource may be selected in consideration of the following parameters when HARQ feedback-based retransmission is performed: period N of resource capable of transmitting and receiving a PSFCH and offset value K between slot that received the PSSCH and slot that transmits the PSFCH.

A location of a slot capable of receiving HARQ ACK/NACK feedback regarding a PSSCH with respect to a slot where the PSSCH is transmitted may be determined according to the parameter. When additional preparation time for PSSCH retransmission including time for receiving and decoding HARQ ACK/NACK is required by a transmission UE, a following parameter may be additionally considered to select and use a transmission resource regarding initial transmission and retransmission: preparation time for PSSCH retransmission (including time for receiving and decoding HARQ ACK/NACK).

The parameter regarding a case where the preparation time for PSSCH retransmission is not required may not be considered as the parameter for selection of a transmission resource when HARQ feedback-based retransmission is performed. The parameter to be considered for selection of a transmission resource when HARQ feedback-based retransmission is performed may be applied to resource selection criterion for both a case (Mode 1) where a base station allocates a transmission resource in SL and a case (Mode 2) where a UE directly allocates SL transmission resource via sensing. In Mode 1, the base station may select a resource regarding HARQ feedback-based retransmission by applying the disclosed parameter and signal, to a transmission UE, transmission time point information as resource allocation reservation information via DCI. In Mode 2, the UE may apply the parameter when directly selecting a resource regarding HARQ feedback-based retransmission via sensing, and signal, to another UE, transmission time point information as resource allocation reservation information via SCI. Hereinafter, a method, performed by a UE, of selecting a transmission resource based on parameters N and K in Mode 2 will be described in detail.

Example 6

A method and apparatus for selecting a transmission resource based on parameters N and K when a UE performs HARQ feedback-based retransmission in Mode 2 as provided in Example 5 will be described with reference to Example 6 of the disclosure. In addition, a method of selecting a transmission resource when blind retransmission is performed will also be described. As described above with reference to Examples 3 and 4, the method of selecting a transmission resource may vary depending on whether one of a sensing window A and a sensing window B is used or whether both a sensing window A and a sensing window B are used. A case where resource selection of Mode 2 is performed only regarding one MAC PDU and a case where the resource selection of Mode 2 is performed regarding a plurality of MAC PDUs via reservation interval configuration will be separately described. Here, MAC PDU may be a unit corresponding to one TB in a physical layer. First, the method of selecting a transmission resource may be used when sensing is performed by only using a sensing window A in Mode 2 and transmission resource selection is performed via the sensing. Also, disclosed is a case where a method of reporting a sensing result of the sensing window A to a higher layer of a UE and finally selecting a transmission resource by the higher layer of the UE. A method of finally selecting the transmission resource by a physical layer without the sensing result of the sensing window A being reported to the higher layer of the UE may also be considered. However, when the method of reporting the sensing result of the sensing window A to the higher layer of the UE and finally selecting the transmission resource by the higher layer of the UE is used, a collision between UEs may be prevented by randomizing resource selection.

A following method of selecting a resource may be used when resource selection is performed regarding one MAC PDU.

Step 1: A resource candidate determined to be not effective to be allocated as a PSSCH transmission resource by using a sensing result of a sensing window A (refer to sensing in a sensing window A in Example 3) from among the number M of resource candidates capable of resource allocation based on resource pool information configured with a resource selection window (see the definition of a resource selection window in Example 3) is excluded to leave X (M)) resource candidates capable of resource allocation. When the method of selecting a resource by the UE is configured to be random resource selection, a procedure of excluding a resource candidate may be omitted. In this case, X=M.

Step 2: A resource candidate list including X resources may be reported to a higher layer of the UE.

Step 2-1: The higher layer of the UE may randomly select a transmission resource regarding one transmission opportunity from among X candidates.

When retransmission is configured (when the configured number of retransmissions is not 0), the number of transmission opportunities additionally selected may be one or more depending on the configured maximum number of retransmissions.

When retransmission is configured to be blind retransmission, the following step may be performed.

Step 2-2: A transmission resource regarding another transmission opportunity may be randomly selected from among resource candidates remaining after one transmission opportunity is selected at step 2-1 from among X candidates reported to the higher layer of the UE. Step 2-2 may be repeated to additionally select a transmission opportunity depending on the configured maximum number of retransmissions.

When HARQ-based retransmission is configured as the retransmission, the following step may be performed.

Step 2-2: A transmission resource regarding another transmission opportunity may be selected considering parameters N, K, and the like related to retransmission and HARQ ACK/NACK feedback provided in Example 5. Step 2-2 may be repeated to select an additional transmission opportunity depending on the configured maximum number of retransmissions. In this regard, various Alternatives (1) through (4) below may be considered. However, the disclosure is not limited to Alternatives (1) through (4).

Alternative (1) Another transmission opportunity may be selected based on the transmission opportunity selected at step 2-1 from among resource candidates remaining after one transmission opportunity is selected at step 2-1 from among X candidates reported to the higher layer of the UE. In particular, the other transmission opportunity may be randomly selected from among remaining available resource candidates after a time gap considering the parameters N, K, and the like related to retransmission and HARQ ACK/NACK feedback in Example 5. Alternative (1) will be described in detail below with reference to FIG. 13.

Figure 13:
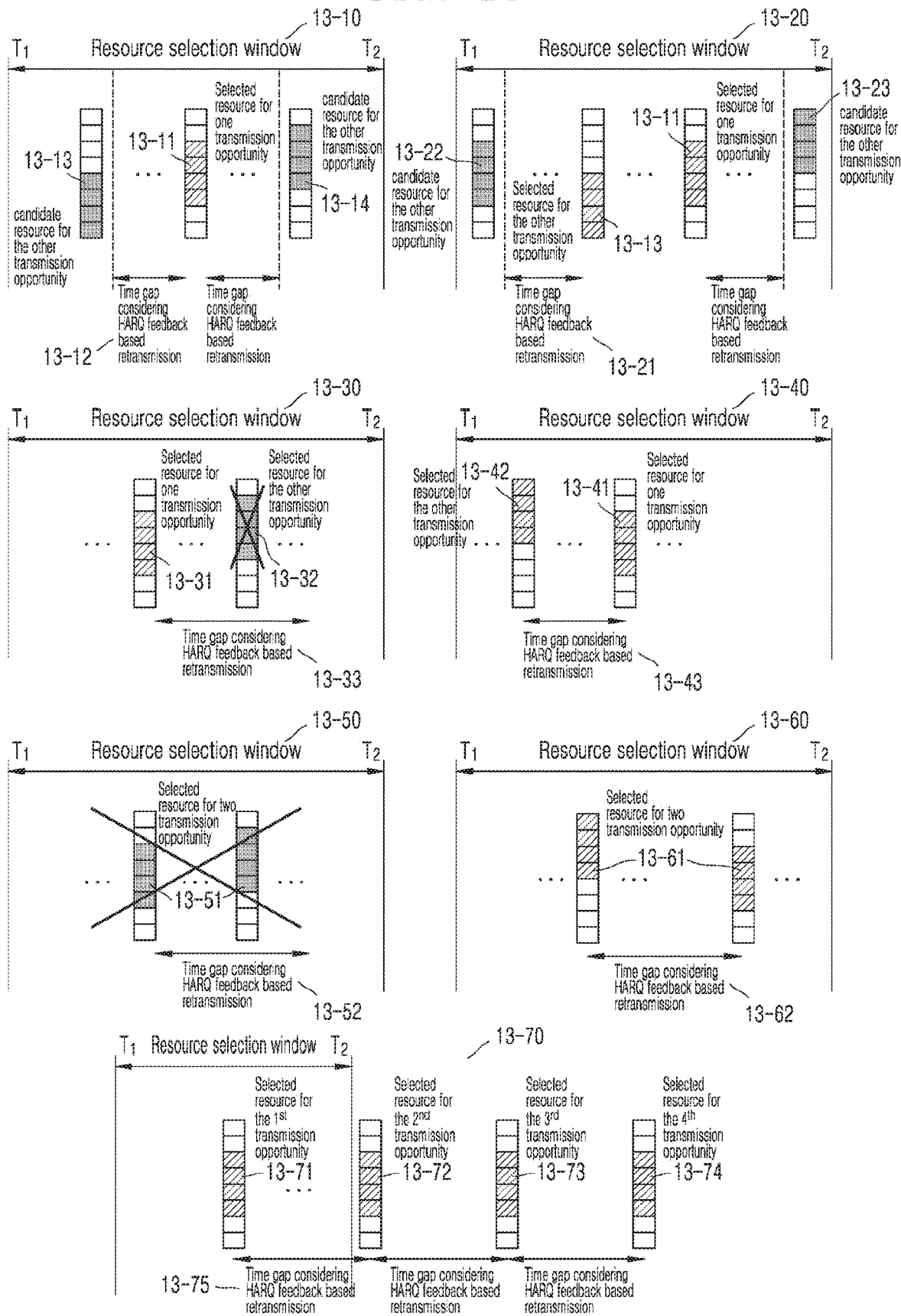
FIG. 13 is a diagram showing a resource selection method, according to an embodiment.

FIG. 13 is a diagram showing a resource selection method, according to an embodiment.

A case 13-10 of FIG. 13 shows an example in which the other transmission opportunity is randomly selected from among available resource candidates 13-13 and 13-14 remaining in a region after a time gap 13-12 considering the parameters N, K and the like related to retransmission and the HARQ ACK/NACK feedback after one transmission opportunity 13-11 is selected at step 2-1 according to Alternative (1). A case 13-20 shows an example in which an additional transmission opportunity is to be selected when it is assumed that the resource candidate 13-13 is selected from among the resource candidates 13-13 and 13-14 in the case 13-10. In the case 13-20, it is assumed that a time gap between the transmission opportunity and the resource candidate 13-13 does not guarantee selection of another transmission opportunity. Thus, as shown in the case 13-20, the additional transmission opportunity may be randomly selected from among available resource candidates 13-22 and 13-23 remaining in a region after a time gap 13-21 considering the parameters N, K, and the like related to retransmission and the HARQ ACK/NACK feedback, based on the transmission opportunity 13-11 and the resource candidate 13-13.

Alternative (2) Another transmission opportunity may be randomly selected from among resource candidates remaining after one transmission opportunity is selected at step 2-1 from among X candidates reported to the higher layer of the UE. When a time gap considering the parameters N, K, and the like related to retransmission and the HARQ ACK/NACK feedback provided in Example 5 is not guaranteed by an additionally selected transmission opportunity based on a transmission opportunity pre-selected at step 2-1, another transmission opportunity may be selected again until the time gap is guaranteed. Alternative (2) will be described in detail below with reference to FIG. 13.

A case 13-30 shows an example in which another transmission opportunity 13-32 is selected from among resource candidates remaining after one transmission opportunity 13-31 is selected at step 2-1 in Alterative (2). However, a transmission opportunity may need to be selected again at step 2-2 when the other transmission opportunity 13-32 does not guarantee a transmission opportunity per-selected in the case 13-10 at step 2-1 and a time gap 13-33 considering the parameters N, K, and the like related to retransmission and the HARQ ACK/NACK feedback, as in the case 13-30. An example of re-selecting a transmission opportunity at step 2-2 is shown in a case 13-40. In the case 13-40, another transmission opportunity 13-42 randomly selected from among resource candidates remaining after selecting one transmission opportunity 13-41 at step 2-1 may be considered during HARQ NACK/NACK feedback and retransmission. Also, in the case 13-40, a time gap 13-43 considering the parameters N, K, and the like related to retransmission and HARQ ACK/NACK feedback and the transmission opportunity 13-42 are satisfied. As such, in Alternative (2), a reselection process may be repeated until a condition regarding another transmission opportunity is satisfied.

Alternative (3) A step of selecting one transmission opportunity may be omitted at step 2-1 and the higher layer of the UE may simultaneously and randomly select the maximum number of transmission opportunities configured for initial transmission and retransmission from among X candidates. When the time gap considering the parameters N, K, and the like related to retransmission and HARQ ACK/NACK feedback provided in Example 5 is not guaranteed between the selected transmission opportunities, all of the transmission opportunities may be selected again until the time gap is guaranteed. Alternative (3) will be described in detail below with reference to FIG. 13.

Cases 13-50 and 13-60 show an example in which a step of selecting one transmission opportunity is omitted at step 2-1 and the higher layer of the UE simultaneously and randomly selects the transmission opportunities configured for initial transmission and retransmission from among X candidates according to Alternative (3). In the case 13-50, a time gap of transmission opportunities 13-51 selected for initial transmission and one retransmission does not satisfy a time gap 13-52 considering the parameters N, K, and the like related to retransmission and HARQ ACK/NACK feedback. In this case, the retransmission opportunities 13-51 selected for initial transmission and one retransmission need to be reselected. In the case 13-60, a time gap of transmission opportunities 13-61 selected for initial transmission and one retransmission satisfies a time gap 13-62 considering the parameters N, K, and the like related to retransmission and HARQ ACK/NACK feedback. As such, in Alternative (3), a reselection process may be repeated until a condition regarding all transmission opportunities is satisfied.

Alternative (4) Another transmission opportunity selected for retransmission may not be selected from among resource candidates remaining after selecting one transmission opportunity at step 2-1 from among X candidates reported to the higher layer of the UE, but may be selected after the time gap considering the parameters N, K, and the like related to retransmission and HARQ ACK/NACK feedback provided in Example 5, based on the one transmission opportunity selected at step 2-1. Here, the other transmission opportunity may be selected from the same frequency resource as the transmission opportunity selected at step 2-1. In Alternative (4), a section of a resource selection window may be selected considering only one transmission opportunity at step 2-1. Alternative (4) will be described in detail below with reference to FIG. 13.

A case 13-70 shows an example in which, when four retransmission resources are to be selected, different opportunities 13-72 through 13-74 are sequentially selected after a time gap 13-75 considering the parameters N, K, and the like related to retransmission and HARQ ACK/NACK feedback, based on one transmission opportunity 13-71 selected at step 2-1, according to Alternative (4). The different transmission opportunities 13-72 through 13-74 in the case 13-70 may be selected from the same frequency resource as the transmission opportunity 13-71 selected at step 2-1.

Step 2-3: A transmission opportunity located first in time from among transmission properties selected at step 2-2 is used for initial transmission and transmission opportunities thereafter may be transmission resources for sequential retransmission.

Step 3: The selected transmission opportunities may be a selected SL grant.

When retransmission is not configured (when the configured number of retransmissions is 0), Step 3 below may be performed.

The following steps may be performed when the selected SL grant is available via step 3.

Step 4: A UE may determine time and frequency locations where a PSCCH and a PSSCH are transmitted by using the selected SL grant.

Step 5: The selected SL grant may be configured to the SL grant.

When retransmission of a resource selected window is configured but there is no resource available to select a transmission opportunity in the resource selection window while selecting a transmission opportunity for HARQ-based retransmission by using one of Alternatives (1) through (4) described above despite that the resource selection window is configured considering retransmission, the following two methods may be considered.

A first method is a method of canceling reservation of some resources regarding HARQ-based retransmission when there is no resource available to select a transmission opportunity in the resource selection window. In a case where transmission opportunities are selected considering up to 4 retransmissions, when two transmission opportunities are selected but selecting of remaining two transmission opportunities in the resource selection window is impossible, transmission resources may be reserved for two retransmissions and remaining retransmissions may be canceled. Also, information thereon may be directly or indirectly signaled via SCI.

A second method is a method of selecting a transmission opportunity outside T2 exceeding a resource selection window [n+T1, n+T2] when there is no resource available to select a transmission opportunity within the resource selection window [n+T1, n+T2]. When such a method is used, step 2-3 may be first applied regarding a transmission opportunity selected in a resource selection window, and a next transmission opportunity may be randomly selected at a time point considering a time gap considering the parameters N, K, and the like related to retransmission and HARQ ACK/NACK feedback provided in Example 5, based on a transmission opportunity located last in the resource selection window in time.

As described above, when retransmission is configured as HARQ-based retransmission, a method of selecting a transmission resource regarding another transmission opportunity considering the parameters N, K, and the like related to retransmission and HARQ ACK/NACK feedback in Example 5 may be used. Also, in this case, Alternatives (1) through (4) described above may be considered. When retransmission is configured as HARQ-based retransmission, a method of selecting a transmission resource via another method without applying the method provided at step 2-2 may be applied. According to the method of selecting a transmission resource via a method other than the method provided at step 2-2, a transmission resource may be selected via step 2-2 below as in a case where blind retransmission is configured even when retransmission is configured as HARQ-based retransmission (same as step 2-2 when blind retransmission is configured).

Step 2-2: A transmission resource regarding another transmission opportunity may be randomly selected from among resource candidates remaining after one transmission opportunity is selected at step 2-1 from among X candidates reported to the higher layer of the UE. Step 2-2 may be repeated to additionally select a transmission opportunity depending on the configured maximum number of retransmissions.

In other words, a method of selecting a transmission resource is the same for a case where retransmission is configured as blind retransmission and a case where retransmission is configured as HARQ-based retransmission. Here, when HARQ-based retransmission is configured, a reception UE is unable to transmit HARQ ACK/NACK feedback when a transmission resource is selected without considering a time gap to be considered for HARQ ACK/NACK feedback and retransmission. Also, a transmission UE does not expect to receive HARQ ACK/NACK feedback from the reception UE. As described above with reference to Examples 2 and 3, the transmission UE may select a transmission resource and transmit resource reservation information to the reception UE via SCI. Upon receiving the resource reservation information, the transmission UE may determine whether a time gap is guaranteed based on transmission time point information of initial transmission and retransmission included in an SCI field. Accordingly, the transmission UE is able to receive HARQ ACK/NACK feedback from the reception UE only when the selected transmission resource satisfies a time gap to be considered for HARQ ACK/NACK feedback and retransmission. When such a method is used, Alternatives (1) through (4) of selecting a transmission resource considering HARQ ACK/NACK feedback and retransmission in a resource selection window is not required to be considered, but when a transmission resource is selected such that the time gap to be considered for HARQ ACK/NACK feedback and retransmission is not satisfied, it may be impossible for the transmission UE to receive HARQ ACK/NACK feedback from the reception UE.

The following method of selecting a resource may be used when resource selection is performed regarding a plurality of MAC PDUs.

When retransmission is configured (when the configured number of retransmissions is not 0), a set of transmission opportunities regarding a plurality of MAC PDUs may be selected according to the number of reservations configured at an interval indicated by each reservation interval, based on a transmission opportunity (a resource regarding retransmission) different from one transmission opportunity (a resource regarding initial transmission) selected when the method of selecting a resource regarding one MAC PDU is applied. Sets may be distinguished depending on initial transmission and the configured number of retransmissions. The sets may be selected SL grant. Also, in this case, steps 4 and 5 described above may be performed.

When retransmission is not configured (when the configured number of retransmissions is 0), transmission opportunities regarding a plurality of MAC PDUs may be selected and one set regarding the transmission opportunities may be configured according to the number of reservations configured at an interval indicated by each reservation interval, based on one transmission opportunity (a resource regarding initial transmission) selected when the method of selecting a resource regarding one MAC PDU is applied. The set may be selected SL grant. Also, in this case, steps 4 and 5 described above may be performed.

Example 6-1

A method of determining resource selection by additionally performing SCI decoding and sensing before a final resource is selected even after triggering regarding resource selection occurs in a slot n, based on the method provided in Example 6 above will be described in Example 6-1 of the disclosure. As described above, even after the triggering regarding resource selection occurred in the slot n, i.e., even in a sensing window B, a resource determined to be not effectively used by being occupied another UE in a resource selection window via SCI decoding and SL measurement regarding the other UE may be additionally excluded similarly to sensing defined in a sensing window A.

Figure 10E:
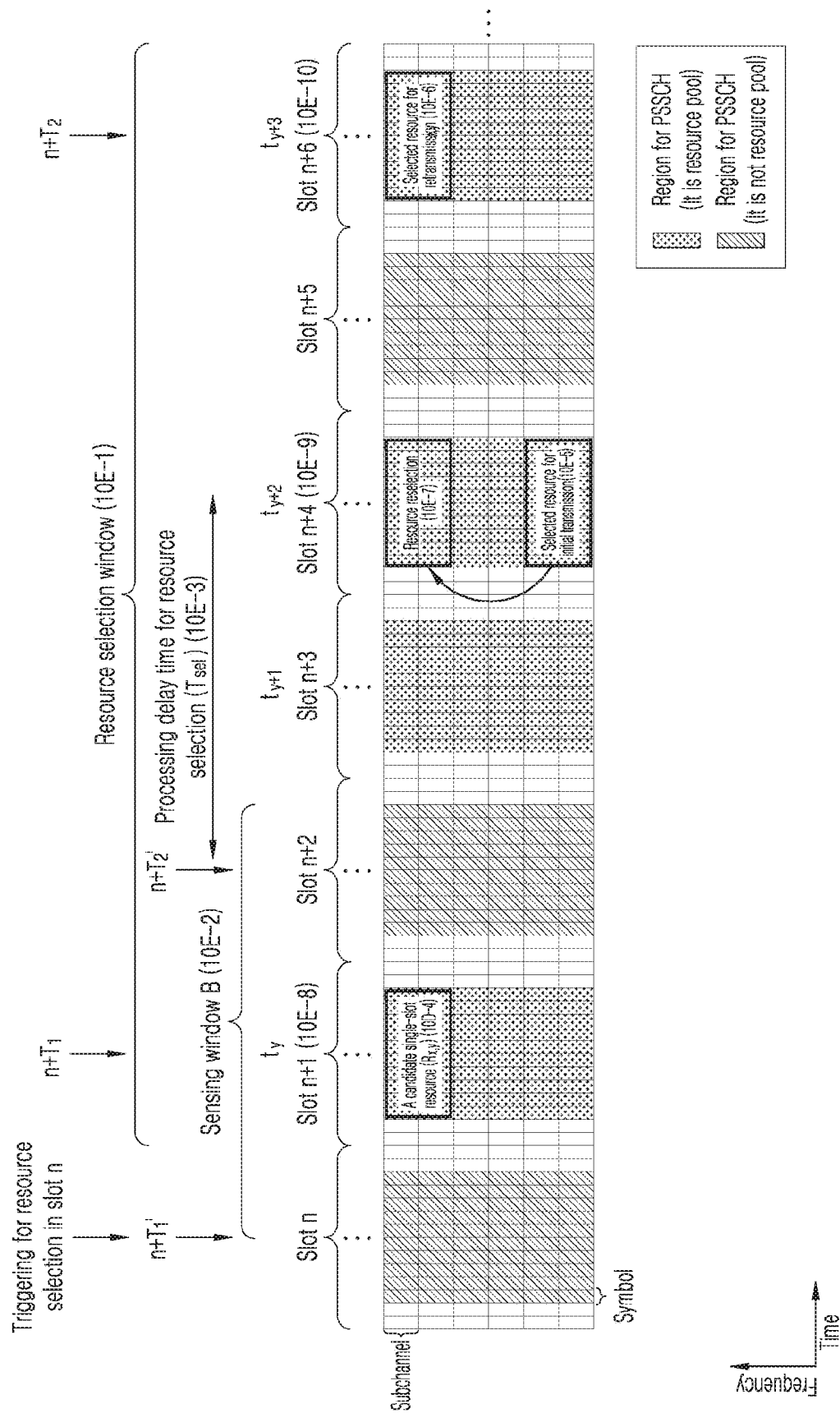
FIG. 10E is a diagram of a final resource selection method according to an embodiment.

FIG. 10E is a diagram of a final resource selection method, according to an embodiment.

In particular, related operations will be described in detail with reference to FIG. 10E. Referring to FIG. 10E, a section [n+T1, n+T2]=[n+1, n+6] of a resource selection window 10E-1 may be configured and a section [n+T1', n+T2']=[n, n+2] of a sensing window B 10E-2 may be configured. In the resource selection window 10E-1, T1 and T2 may be determined in units of slots. UE implementation may be determined under the following conditions:

$T_1 \leq 4$ and $T_{2min}(prio_{TX}) \leq T_2 \leq T_{2max}(prio_{TX})$. if $T_{2min}(prio_{TX})$ and $T_{2max}(prio_{TX})$ are provided by higher layers for $prio_{TX}$, otherwise $20 \leq T_2 \leq 100$. UE selection of $T_2$ shall fulfil the latency requirement.

Also, T1' and T2' in the sensing window B 10E-2 may be determined in units of slots. Here, T1' and T2' may be configurable values. In general, when this is applied, T1' in a section of the sensing window B 10E-2 may be configured as a slot n where triggering regarding resource selection occurred for continuous connection from a sensing window A. Also, in the section of the sensing window B 10E-2, T2' may be determined according to a time Tsel 10E-3 required for reselection after excluding a resource according to a time point when a resource for initial transmission is selected. Here, Tsel 10E-3 may be determined in units of slots. As described with reference to Example 6, when a resource for initial transmission is selected via a result of the sensing window A, a section between a time point for the initial transmission and Tsel 10E-3 may be used as the sensing window B 10E-2. In particular, as in Tsel 10E-3 of FIG. 10E, an initial transmission resource 10E-5 may be selected in a slot n+4 10E-9 and a value of Tsel 10E-3 may be determined to be 2 slots. Accordingly, the section of the sensing window B 10E-2 may be configured to be [n+T1', n+T2']=[n, n+2]. Here, Tsel 10E-3 may generally indicate a processing time required not only to determine the section of the sensing window B 10E-2, but also to select a resource after a sensing window ends. Accordingly, Tsel 10E-3 may be used to determine a start time point T1 of the resource selection window 10E-1. Also, Tsel 10E-3 may be applied to all start time points T1 of a resource selection window of FIGS. 10A, 10C, 10D, and 10E.

Hereinafter, an operation of modifying a resource selection result excluding a resource selected in the resource selection window 10E-1 when required according to a sensing result of the sensing window B 10E-2 will be described. First in FIG. 10E, as described above in Example 3, the Rx,y 10E-4 may indicate one resource candidate configured of x+j consecutive subchannels in a subchannel region configured as the resource pool with respect to a slot ty belonging to the resource pool. Here, j=0, . . . , $L_{subCH}$−1 and Rx,y 10E-4 is an example for a case where $L_{subCH}$=2. $L_{subCH}$ is a subchannel length for resource allocation and may be selected within a resource allocation range delivered as system information. In FIG. 10E, it is assumed that the initial transmission resource 10E-5 and a retransmission resource 10E-6 are selected via the sensing result of the sensing window A according to the resource selection method provided in Example 6. However, in Example 6-1, additional sensing may be performed in the section [n+T1', n+T2']=[n, n+2] of the sensing window B 10E-2. When it is determined that another UE occupied an already selected transmission resource and that is not suitable to perform transmission on the transmission resource as a result of performing SCI decoding and SL measurement in the section of the sensing window B 10E-2, an operation of selecting a resource again by excluding the selected transmission resource may be required. In FIG. 10E, the following cases may be considered as a result of sensing of the sensing window B 10E-2.

Case 1: It is determined that transmission of the initial transmission resource 10E-5 is not suitable.

Case 2: It is determined that transmission of the retransmission resource 10E-6 is not suitable.

Case 3: It is determined that transmission of both the initial transmission resource 10E-5 and the retransmission resource 10E-6 is not suitable.

Case 4: It is determined that transmission of both the initial transmission resource 10E-5 and the retransmission resource 10E-6 is suitable.

Because it is determined that transmission of both the initial transmission resource 10E-5 and the retransmission resource 10E-6 is suitable in Case 4, Case 4 may be excluded from consideration. In FIG. 10E, maximum 2 pieces of resource allocation information are indicated as SCI in consideration of one initial transmission and one retransmission, but an embodiment of the disclosure is not limited thereto. A case where four pieces of resource allocation information is indicated as SCI may be included a range of an embodiment of the disclosure. Also, in FIG. 10E, initial transmission resource 10E-5 and the retransmission resource 10E-6 are both selected, but when only a resource for initial transmission is selected, there may be only cases where transmission of the initial transmission resource 10E-5 is determined to be suitable or is determined to be not suitable as in Case 1. Also, various methods may be considered in selecting a resource again by excluding a selected resource regarding Cases 1 through 3. First, the following methods may be considered regarding Case 1.

Method 1-1: The initial transmission resource 10E-5 that is already selected is excluded, the retransmission resource 10E-6 is replaced as an initial transmission resource, and a retransmission resource is not selected. In Method 1-1, a higher layer of a UE may be configured to select a retransmission resource, but there may be no retransmission resource. In this case, a transmission UE may indicate a time gap ($SF_{gap}$) between initial transmission and retransmission to be 0 via SCI to notify a reception UE that there is only initial transmission.

Method 1-2: An initial transmission resource is selected again from among remaining resource candidates. An initial transmission resource may be reselected via Method 1-2 when only a resource for initial transmission is selected during a resource selection process. An initial transmission resource and a retransmission resource may be determined again according to a location of a transmission resource reselected via Method 1-2 in time via Method 1-2 when an initial transmission resource and a retransmission resource are selected during a resource selection process. When a reselected transmission resource is located before a retransmission resource that is already selected, only an initial transmission resource may be reselected, but when the reselected transmission resource is located behind the retransmission resource that is already selected, a resource located before in time may be selected as an initial transmission resource and a resource located behind in time may be selected as a retransmission resource. When Method 1-2 is used in a case where an initial transmission resource and a retransmission resource are selected in a resource selection process, it may be difficult to guarantee a time gap between the initial transmission resource and the retransmission resource regarding, in particular, a HARQ feedback-based retransmission method. Accordingly, Method 1-2 may be excluded for the HARQ feedback-based retransmission method.

Method 1-3: An initial transmission resource and retransmission resource are both selected again from among remaining resource candidates. A resource reselected before in time is an initial transmission resource and a resource reselected after in time is a retransmission resource. In HARQ feedback-based retransmission, a resource may be selected again while maintaining a time gap between the initial transmission resource and the retransmission resource via Method 1-3.

On the other hand, the following methods may be considered regarding Case 2.

Method 2-1: Only the initial transmission resource 10E-5 may be used and a retransmission transmission resource may be excluded and not selected again. In Method 2-1, a higher layer of a UE may be configured to select a retransmission resource, but there may be no retransmission resource. In this case, a transmission UE may indicate a time gap ($SF_{gap}$) between initial transmission and retransmission to be 0 via SCI to notify a reception UE that there is only initial transmission.

Method 2-2: Only a retransmission resource is selected again from among remaining resource candidates. An initial transmission resource and a retransmission resource may be selected again depending on a location of a transmission resource reselected via Method 2-2 in time. When a reselected transmission resource is located behind an initial transmission resource that is already selected, only a retransmission resource may be reselected, but when the reselected transmission resource is located before the initial transmission resource that is already selected, a resource located before in time may be selected as an initial transmission resource and a resource located behind in time may be selected as a retransmission resource. It is difficult to guarantee a time gap between initial transmission resource and a retransmission resource when Method 2-2 is used, in particular, regarding HARQ feedback-based retransmission.

Accordingly, Method 2-2 may be excluded for the HARQ feedback-based retransmission method.

Method 2-3: An initial transmission resource and retransmission resource are both selected again from among remaining resource candidates. A resource reselected before in time is an initial transmission resource and a resource reselected after in time is a retransmission resource. In HARQ feedback-based retransmission, a resource may be selected again while maintaining a time gap between the initial transmission resource and the retransmission resource via Method 2-3.

The following methods may be considered regarding Case 3.

Method 3-3: An initial transmission resource and retransmission resource are both selected again from among remaining resource candidates. A resource reselected before in time is an initial transmission resource and a resource reselected after in time is a retransmission resource. In HARQ feedback-based retransmission, a resource may be selected again while maintaining a time gap between the initial transmission resource and the retransmission resource via Method 3-3.

Methods provided in Example 2 may be used to select a resource in Example 6-1, and thus details thereof will not be provided. A method to be used from among the above-described methods may be configured via resource pool information or higher layer information. Also, one method appropriate for each case may be used from among the above-described methods. When one of the above-described methods is to be determined, a method (Method 1-2) of reselecting an initial resource from among remaining resource candidates when the initial resource is to be reselected, and a method (Method 1-3, 2-3, or 3-3) of reselecting both an initial transmission resource and a retransmission resource when one or both of the initial transmission resource and the retransmission resource are to be reselected may be used. Also, as pointed out in Methods 1-2, 2-2, and 3-2, when one of an initial transmission resource and a retransmission resource is reselected in case of HARQ feedback-based retransmission, it may be difficult to maintain a time gap between the initial transmission resource and the retransmission resource, and thus a resource selection result may be modified excluding a resource selected in a resource selection window when required, via a sensing result of a sensing window B. An operation of modifying a resource selection result excluding a resource selected in a resource selection window may be applied only to blind retransmission and a method of using only a sensing window A may be considered as in Example 6 when HARQ feedback-based retransmission is used.

Example 6-2

In Example 6-1, a resource selection method when sensing is continuously performed before and after a triggering time point n (a method of reselecting a resource by modifying a selected resource) has been described. In FIGS. 10A through 10E, an initial transmission resource and one retransmission resource are reserved and transmitted, but an embodiment of the disclosure is not limited thereto. In particular, Nmax resources may be reserved for one TB. A value of Nmax may be configured in a resource pool. When the value of Nmax is configured to be 3, three resources may be reserved including initial transmission. Accordingly, when the value of Nmax is increased, sensing is continuously performed after the triggering time point n, and thus a resource selection operation of Mode 2 may become very complicated when a method of reselecting a resource by modifying an already selected resource is used. When the already reselected resource is reselected, the following cases may be considered.

Case 1: Reselecting of a resource required to be reselected is allowed from among all resources.

Case 2: Reselecting of a resource is allowed only when reselection is required for initial transmission from among all resources.

When Case 1 is considered, the resource selection operation of Mode 2 may become very complicated as described above. In other words, complexity of maximum resource selection operation may be doubled. Also, because HARQ ACK/NACK needs to be received in case of HARQ feedback-based retransmission, a time gap needs to be guaranteed between selected resources as disclosed herein. When Case 1 is used, for example, when Nmax=3, three resources are reserved including initial transmission after the triggering time point n, it is determined that only a second resource is to be reselected via additional sensing, and the second resource is reselected, another transmission resource may also need to be selected again when the resource does not guarantee a time gap between initial transmission and last retransmission. In particular, when a reselection triggering time point is before initial transmission, all three resources may need to be selected again to guarantee a time gap despite that only a second resource needs to be reselected. On the other hand, Case 2 is a method of limiting reselecting of a resource only to initial transmission. An increase in complexity of resource selection occurred in Case 1 may be prevented via Case 2. Also, when initial transmission is most important and the initial transmission was successful in case of HARQ feedback-based retransmission, Case 2 may be effective because a retransmission resource may be released. As for another method, a method of allowing Case 1 may be considered only when blind retransmission is used. In particular, a retransmission resource selection method may be configured depending on HARQ feedback-based retransmission and blind retransmission. A corresponding method may be configured in resource pool information. When a configured retransmission resource selection method is HARQ feedback-based retransmission, Case 2 may be used, and when the configured retransmission resource selection method is blind retransmission, Case 1 or 2 may be used. Here, a method of always supporting Case 1 may be considered for blind retransmission or a method of supporting configuration of whether to use Case 1 or Case 2 may be considered for blind retransmission method. In the latter, it may be configured in resource pool information whether Case 1 or Case 2 is supported together with whether the retransmission resource selection method is blind retransmission.

Example 6-3

In the above embodiment of the disclosure, a resource selection method when sensing is continuously performed before and after a triggering time point n (a method of reselecting a resource by modifying a selected resource) has been described.

Figure 17:
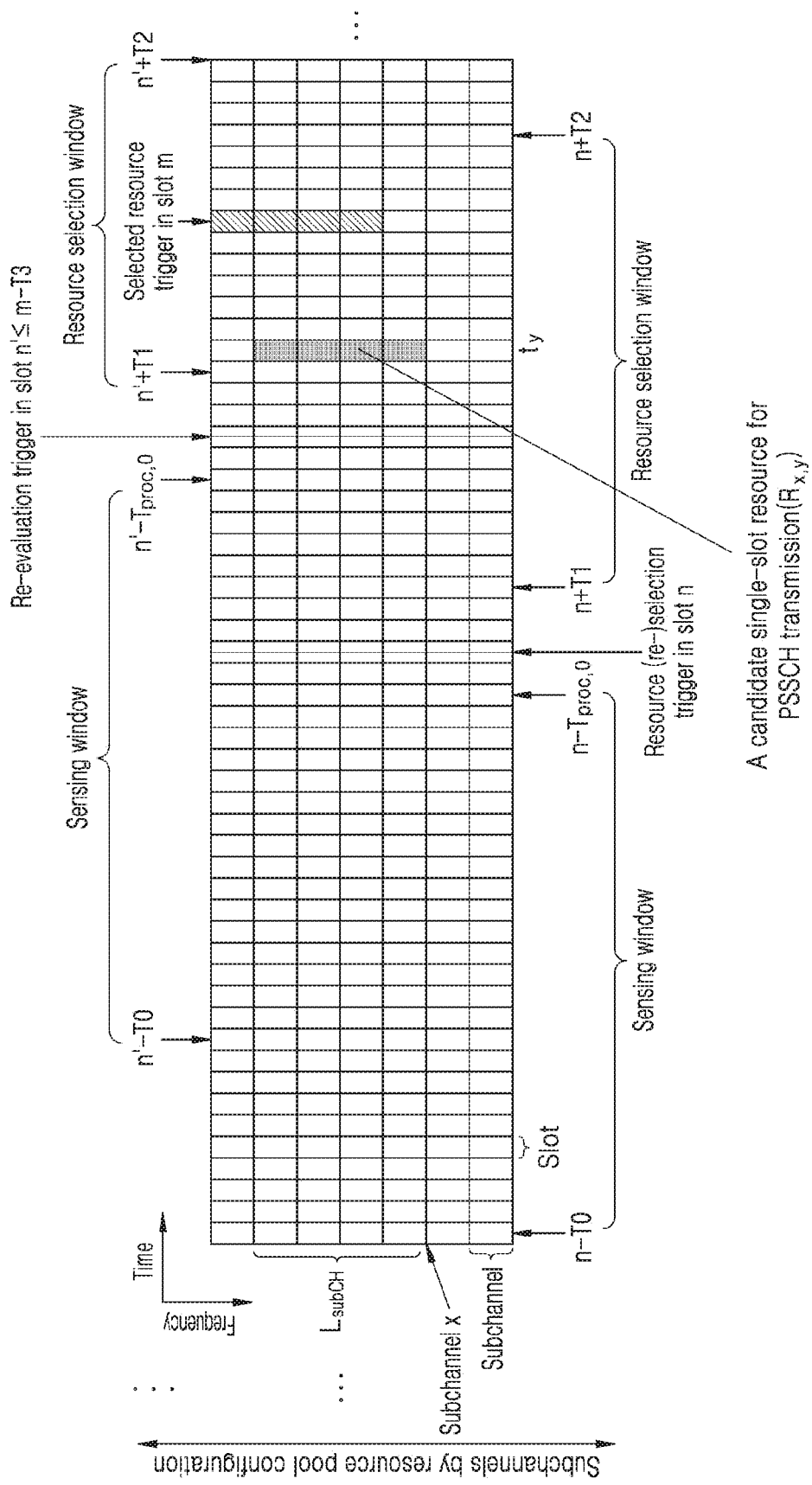
FIG. 17 is a diagram of a resource selection and resource reselection method according to an embodiment.

FIG. 17 is a diagram of a resource selection and resource reselection method, according to an embodiment. In particular, FIG. 17 illustrates a case in which triggering for resource selection is performed at a time point n and triggering for reselection (re-evaluation) is performed in n' (n'>n) by continuously performing sensing before and after the triggering time point n. According to FIG. 17, a sensing window may be defined as [n−T0, n−Tproc,0] when the triggering for resource selection is performed at the time point n. Here, T0 is a (pre-)configured value and corresponding information may be configured in a resource pool. Also, Tproc,0 may be defined as a time required to process a sensing result and required Tproc,0 may vary depending on a configured value of T0. In particular, long Tproc,0 may be required when a long value of T0 is configured. Alternatively, short Tproc,0 may be required when a short value of T0 is configured. Thus, a value of Tproc,0 may be fixed to one value, but a different value adjusted by the configured value of T0 may be (pre-)configured. Next, a resource selection window may be determined to be [n+T1, n+T2] when the triggering for resource selection is performed at the time point n. Here, T1 may be selected via UE implementation regarding T1≤Tproc,1. Tproc,1 is a maximum reference value considering processing time required to select a resource, and because the processing time may vary depending on UE implementation, T1 may be selected to be a value equal to or lower than Tproc,1 according to UE implementation. Also, when T2 is configured to select Nmax resources for one TB, Nmax resources may include initial transmission and retransmission resources. Here, a UE selects T2 within a range satisfying T2≤Packet delay budget (PDP). Next, when triggering for reselection (re-evaluation) occurs in n' (n'>n) by continuously performing sensing after triggering, triggering for reselection needs to be performed before m-T3 when at least an already selected resource is in a slot m, referring to FIG. 17. Here, T3 may be processing time required for reselection. Thus, as described above, a method of configuring T3=Tproc,1 may be considered in the case of FIG. 17. As described above, because Tproc,1 is the maximum reference value considering the processing time required to select a resource, when triggering for reselection is performed before a corresponding value, it may be possible to change a selected resource to another resource. In this case, not only a time for dropping a pre-selected resource may be considered in determining the value of Tproc,1, but also a time required to process a case where a previous resource and a new resource overlap each other may be considered. As another method, a method of configuring T3=T0 may be considered. Here, T0, i.e., the processing time for selecting a resource, is used as T3 according to UE implementation. As shown in FIG. 17, the sensing window when the triggering for reselection (re-evaluation) occurs in n' (n'>n) is [n'−T0, n'−Tproc,0], and a corresponding resource selection window may be determined to be [n'+T1, n'+T2]. Here, T0 and Tproc,0 may be same values as those used when the triggering for resource selection is performed at the time point n. However, a UE may select values of T1 and T2 to be the same as or different from those used when the triggering for resource selection is performed at the time point n according to implementation.

Figure 18:
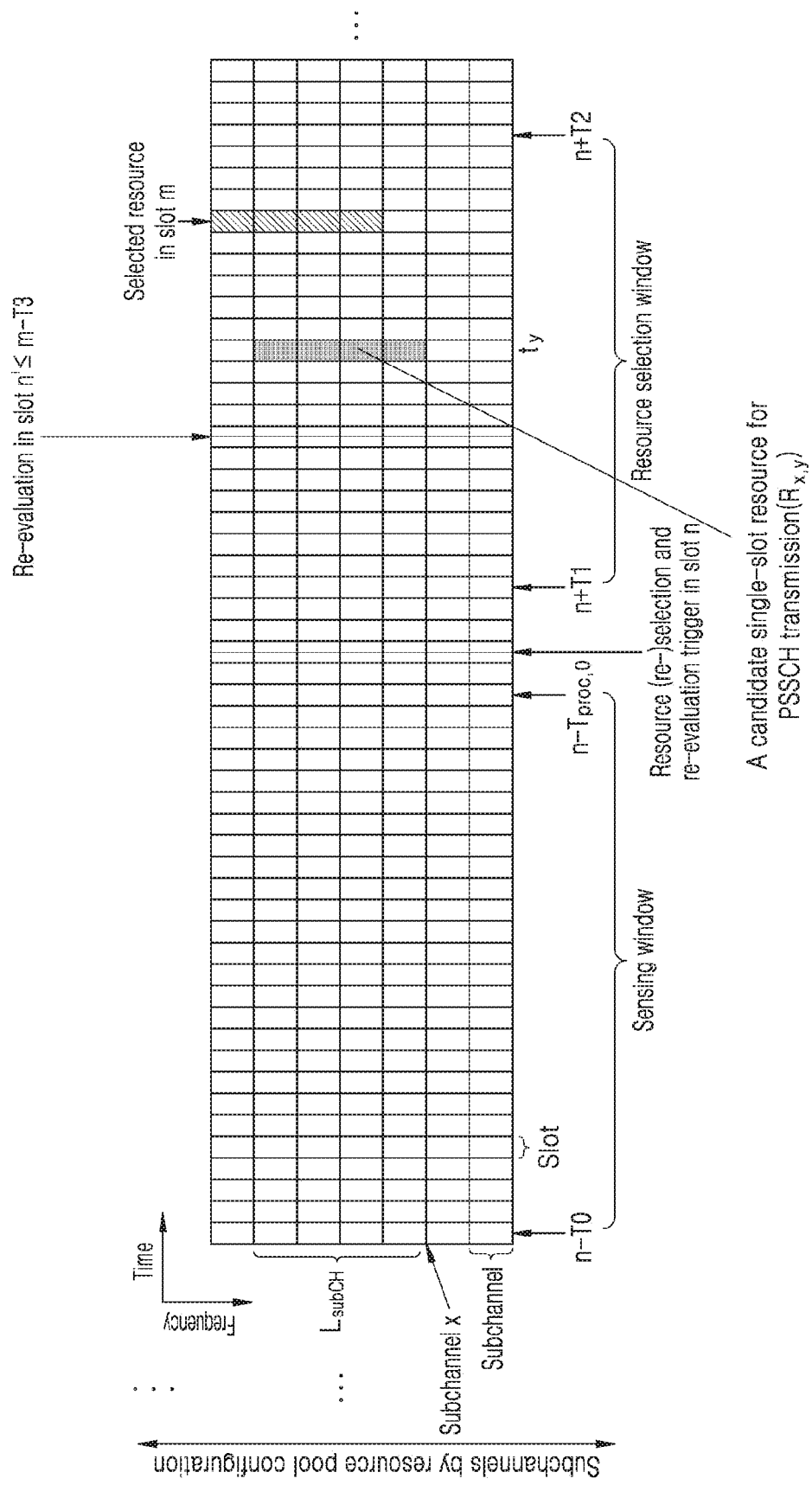
FIG. 18 is a diagram of a case in which triggering time points of a resource selection and resource reselection method are different, according to an embodiment.

FIG. 18 is a diagram of a case in which triggering time points of a resource selection and resource reselection method are different, according to an embodiment.

In particular, FIG. 18 illustrates a case where triggering for resource selection and triggering reselection (re-evaluation) are simultaneously performed at the time point n, unlike FIG. 17. According to FIG. 18, when resource selection and reselection are simultaneously triggered at the time point n, a sensing window may be defined as [n−T0, n−Tproc,0]. Here, T0 is a (pre-)configured value and corresponding information may be configured in a resource pool. Also, Tproc,0 may be defined as a time required to process a sensing result and required Tproc,0 may vary depending on a configured value of T0. In particular, long Tproc,0 may be required when a long value of T0 is configured. Alternatively, short Tproc,0 may be required when a short value of T0 is configured. Thus, a value of Tproc,0 may be fixed to one value, but a different value adjusted by the configured value of T0 may be (pre-)configured. Next, a resource selection window may be determined to be [n+T1, n+T2] when the triggering for resource selection and triggering for reselection are simultaneously performed at the time point n. Here, T1 may be selected via UE implementation regarding T1≤Tproc,1. Tproc,1 is a maximum reference value considering processing time required to select a resource, and because the processing time may vary depending on UE implementation, T1 may be selected to be a value equal to or lower than Tproc,1 according to UE implementation. Also, when T2 is configured to select Nmax resources for one TB, Nmax resources may include initial transmission and retransmission resources. Here, a UE selects T2 within a range satisfying T2≤Packet delay budget (PDP). Next, the UE may reselect an already selected resource when reselection (re-evaluation) needs to be performed by continuously performing sensing after triggering at the time point n. However, such reselection needs to be performed before m-T3 when at least the already selected resource is in a slot m (indicated by shading in FIG. 18), referring to FIG. 18. Here, T3 may be processing time required for reselection. Thus, as described above, a method of configuring T3=Tproc,0+Tproc,1 may be considered in the case of FIG. 18. As described above, because Tproc,0 is the time required to process a sensing result and Tproc,1 is the maximum reference value considering the processing time required to select a resource, when the triggering for reselection is performed before T3 with a corresponding value, it may be possible to change the selected resource to another resource. In this case, not only a time for dropping a pre-selected resource may be considered in determining the value of Tproc,1, but also a time required to process a case where a previous resource and a new resource overlap each other may be considered. As another method, a method of configuring T3=T0+Tproc,0 may be considered. Here, T0, i.e., the processing time for selecting a resource, is used as the resource selection processing time according to UE implementation.

Example 6-4

It has been described that Nmax resources may be reserved for one TB. The number of actually reservable resources for Nmax may be (pre-)configured in resource pool information. When Nmax is 3, the number of actually reservable resources for one TB may be configured to be 3 or 2. When the number is configured to be 3, an initial transmission resource and two retransmission resources may be reserved, and when the number is configured to be 2, initial transmission resource and one retransmission resource may be reserved. Information about a resource finally selected via sensing and resource selection may be signaled via SCI. Here, information about the number of bits of Equation (4) below may be included in an SCI field indicating frequency resource location information considering a case where the number of actually reservable resources for one TB is 3.

$$\left\lceil \log_2\left( \begin{matrix} N_{Subchannel}^{SL} + 1 \\ 2 \end{matrix} \right) \right\rceil + \lceil \log_2 N_{Subchannel}^{SL} \rceil \quad (4)$$

In Equation (4), $N_{Subchannel}^{SL}$ indicates the number of subchannels. Information about $N_{Subchannel}^{SL}$ may be (pre-)configured as resource pool information. Also, in Equation (4), $$\begin{pmatrix} n \\ k \end{pmatrix}$$

is an equation indicating a combination, and is used as a method for finding a start point and an end point for $N_{Subchannel}^{SL}$. Equation (4) is suggested under assumptions that lengths of subchannels allocated on frequency for three resources regarding one TB are all same, that a start location for initial transmission is a location of a subchannel where PSCCH where SCI is transmitted starts, and that frequency start locations may be differently configured for three resources regarding one TB.

Equation (4) above may be represented as Equation (5) below.

$$\lceil \log_2(N_{Subchannel}^{SL}(N_{Subchannel}^{SL}+1)/2) \rceil + \lceil \log_2 N_{Subchannel}^{SL} \rceil \quad (5)$$

Example 7

According to Example 7 of the disclosure, a method of selecting a transmission resource when sensing is performed by only using a sensing window B in Mode 2 and transmission resource selection is performed via the sensing is proposed.

The following method of selecting a resource may be used when resource selection is performed regarding one MAC PDU.

Step 1: Energy detection (see sensing in a sensing window B in Example 4) may be performed regarding a section configured in a sensing window B to select a PSSCH transmission resource from among M resource candidates capable of resource allocation, based on resource pool information configured in a resource selection window (see the definition of a resource selection window in Example 3). Then, an idle resource may be searched for from among N resource candidates in a region of the energy detection. Here, an operation of excluding a resource determined to be not effective by being occupied by another UE in the resource selection window, by performing SCI decoding and SL measurement in the sensing window B, may be included. When the method of selecting a resource by the UE is configured to be random resource selection, a procedure of sensing and excluding a resource candidate may be omitted. In this case, X=M, an operation of a following embodiment of the disclosure is not performed, and a procedure excluding step 1 in Example 6 may be performed.

When retransmission is configured (when the configured number of retransmissions is not 0), the number of transmission opportunities additionally selected may be one or more depending on the configured maximum number of retransmissions.

When retransmission is configured to be blind retransmission, step 2 below may be performed.

Step 2: When an idle resource is found from among N resource candidates in the region of the energy detection by performing the energy detection on the section configured in the sensing window B, one transmission opportunity is selected, and when an idle resource is found from among the N resource candidates in the region of the energy detection by performing the energy detection again, a transmission resource for another transmission opportunity may be selected. Among the selected transmission opportunities, a transmission opportunity before in time may be used for initial transmission and a transmission opportunity after in time may be a transmission resource for sequential retransmission. Step 2 may be repeated to additionally select a transmission opportunity depending on the configured maximum number of retransmissions. Details about the method of selecting a resource via the energy detection in the sensing window B have been described above with reference to Example 4.

When HARQ-based retransmission is configured as the retransmission, step 2 may be performed.

Step 2: When the idle resource is found from among the N resource candidates in the region of the energy detection by performing the energy detection on the section configured in the sensing window B, one transmission opportunity may be selected. Then, the energy detection may be performed at a time point when a transmission time point of another transmission opportunity is satisfied, considering the parameters N, K, and the like related to retransmission and HARQ ACK/NACK feedback in Example 5. Here, when the idle resource is found from among the N resource candidates in the region of the energy detection, a transmission resource for the other transmission opportunity may be selected. Among the selected transmission opportunities, a transmission opportunity before in time may be used for initial transmission and a transmission opportunity after in time may be a transmission resource for sequential retransmission. Step 2 may be repeated to select an additional transmission opportunity depending on the configured maximum number of retransmissions. Details about the method of selecting a resource via the energy detection in the sensing window B have been described above with reference to Example 4.

Step 3: The selected transmission opportunities may be selected for SL grant.

When retransmission is not configured (when the configured number of retransmissions is 0), step 2 below may be performed.

Step 2: When the idle resource is found from among the N resource candidates in the region of the energy detection by performing the energy detection on the section configured in the sensing window B, one transmission opportunity may be selected. Details about the method of selecting a resource via the energy detection in the sensing window B have been described above with reference to Example 4.

Step 3: The selected one transmission opportunity may be selected for SL grant.

The following steps may be performed when the selected SL grant is available via step 3.

Step 4: A UE may determine time and frequency locations where a PSCCH and a PSSCH are transmitted by using the selected SL grant.

Step 5: The selected SL grant may be configured SL grant.

As described above, when retransmission is configured as HARQ-based retransmission, a method of selecting a transmission resource regarding another transmission opportunity considering the parameters N, K, and the like related to retransmission and HARQ ACK/NACK feedback in Example 5 may be used. When retransmission is configured as HARQ-based retransmission, a method of selecting a transmission resource via another method without applying the method provided at step 2 may be applied. According to the method of selecting a transmission resource via a method other than the method provided at step 2, a transmission resource may be selected via step 2 below as in a case where blind retransmission is configured even when retransmission is configured as HARQ-based retransmission (same as step 2 when blind retransmission is configured).

Step 2: When the idle resource is found from among the N resource candidates in the region of the energy detection by performing the energy detection on the section configured in the sensing window B, one transmission opportunity is selected, and when the idle resource is found from among the N resource candidates in the region of the energy detection by performing the energy detection again, a transmission resource for another transmission opportunity may be selected. Among the selected transmission opportunities, a transmission opportunity before in time may be used for initial transmission and a transmission opportunity after in time may be a transmission resource for sequential retransmission. Step 2 may be repeated to additionally select a transmission opportunity depending on the configured maximum number of retransmissions. Details about the method of selecting a resource via the energy detection in the sensing window B have been described above with reference to Example 4.

In other words, a method of selecting a transmission resource is the same for a case where retransmission is configured as blind retransmission and a case where retransmission is configured as HARQ-based retransmission. Here, when HARQ-based retransmission is configured, a reception UE is unable to transmit HARQ ACK/NACK feedback when a transmission resource is selected without considering a time gap to be considered for HARQ ACK/NACK feedback and retransmission. Also, a transmission UE does not expect to receive HARQ ACK/NACK feedback from the reception UE. As described above with reference to Examples 2 and 3, the transmission UE may select a transmission resource and transmit resource reservation information to the reception UE via SCI. Upon receiving the resource reservation information, the transmission UE (reception UE) may determine whether a time gap is guaranteed based on transmission time point information of initial transmission and retransmission included in an SCI field. Accordingly, the transmission UE is able to receive HARQ ACK/NACK feedback from the reception UE only when the selected transmission resource satisfies a time gap to be considered for HARQ ACK/NACK feedback and retransmission. When such a method is used, a method of selecting a transmission resource considering HARQ ACK/NACK feedback and retransmission in a resource selection window is not required to be considered, but when a transmission resource is selected such that the time gap to be considered for HARQ ACK/NACK feedback and retransmission is not satisfied, it may be impossible for the transmission UE to receive HARQ ACK/NACK feedback from the reception UE.

The following method of selecting a resource may be used when resource selection is performed regarding a plurality of MAC PDUs.

When retransmission is configured (when the configured number of retransmissions is not 0), a set of transmission opportunities regarding a plurality of MAC PDUs may be selected according to the number of reservations configured at an interval indicated by each reservation interval, based on a transmission opportunity (a resource regarding retransmission) different from one transmission opportunity (a resource regarding initial transmission) selected when the method of selecting a resource regarding one MAC PDU is applied. Sets may be distinguished depending on initial transmission and the configured number of retransmissions.

The sets may be selected SL grant. Also, step 4 and 5 described above may be performed.

When retransmission is not configured (when the configured number of retransmissions is 0), transmission opportunities regarding a plurality of MAC PDUs may be selected and one set regarding the transmission opportunities may be configured according to the number of reservations configured at an interval indicated by each reservation interval, based on one transmission opportunity (a resource regarding initial transmission) selected when the method of selecting a resource regarding one MAC PDU is applied. The set may be selected SL grant. Also, step 4 and described above may be performed.

Example 8

Example 8 of the disclosure includes a method of selecting a transmission resource when sensing is performed by using both a sensing window A and a sensing window B in Mode 2 and transmission resource selection is performed via the sensing. Also, the disclosure includes a method of finally selecting a transmission resource by a physical layer without reporting a sensing result of the sensing window A to a higher layer of the UE.

The following method of selecting a resource may be used when resource selection is performed regarding one MAC PDU.

Step 1: A resource candidate determined to be not effective to be allocated as a PSSCH transmission resource by using a sensing result of a sensing window A (refer to sensing in a sensing window A in Example 3) from among the number M of resource candidates capable of resource allocation based on resource pool information configured with a resource selection window (see the definition of a resource selection window in Example 3) is excluded to leave X (≤M)) resource candidates capable of resource allocation. Energy detection (see sensing in a sensing window B in Example 4) may be performed on a section configured in the sensing window B to select a PSSCH transmission resource from among the number X of resource candidates capable of resource allocation. An idle resource may be searched for from among N resource candidates in a region of the energy detection. Here, an additional step of excluding a resource determined to be not effective by being occupied by another UE in the resource selection window, by performing SCI decoding and SL measurement in the sensing window B, may be included.

When the method of selecting a resource by the UE is configured to be random resource selection, a procedure of sensing and excluding a resource candidate may be omitted. In this case, X=M, an operation is not performed, and an operation excluding step 1 in Example 6 may be performed.

When retransmission is configured (when the configured number of retransmissions is not 0), the number of transmission opportunities additionally selected may be one or more depending on the configured maximum number of retransmissions.

When retransmission is configured to be blind retransmission, step 2 below may be performed.

Step 2: When the idle resource is found from among N resource candidates in the region of the energy detection by performing the energy detection on the section configured in the sensing window B, one transmission opportunity may be selected and the energy detection may be performed again. Here, when the idle resource is found from among the N resource candidates in the region of the energy detection, a transmission resource for the other transmission opportunity may be selected. Among the selected transmission opportunities, a transmission opportunity before in time may be used for initial transmission and a transmission opportunity after in time may be a transmission resource for sequential retransmission. Step 2 may be repeated to additionally select a transmission opportunity depending on the configured maximum number of retransmissions. Details about the method of selecting a resource via the energy detection in the sensing window B have been described above with reference to Example 4.

When HARQ-based retransmission is configured as the retransmission, step 2 may be performed.

Step 32: When the idle resource is found from among the N resource candidates in the region of the energy detection by performing the energy detection on the section configured in the sensing window B, one transmission opportunity may be selected. Then, the energy detection may be performed at a time point when a transmission time point of another transmission opportunity is satisfied, considering the parameters N, K, and the like related to retransmission and HARQ ACK/NACK feedback in Example 5. Here, when the idle resource is found from among the N resource candidates in the region of the energy detection, a transmission resource for the other transmission opportunity may be selected. Among the selected transmission opportunities, a transmission opportunity before in time may be used for initial transmission and a transmission opportunity after in time may be a transmission resource for sequential retransmission. Step 2 may be repeated to select an additional transmission opportunity depending on the configured maximum number of retransmissions. Details about the method of selecting a resource via the energy detection in the sensing window B have been described above with reference to Example 4.

Step 3: The selected transmission opportunities may be selected as SL grant.

When retransmission is not configured (when the configured number of retransmissions is 0), step 2 below may be performed.

Step 2: When the idle resource is found from among the N resource candidates in the region of the energy detection by performing the energy detection on the section configured in the sensing window B, one transmission opportunity may be selected. Details about the method of selecting a resource via the energy detection in the sensing window B have been described above with reference to Example 4.

Step 3: The selected one transmission opportunity may be selected SL grant.

The following steps may be performed when the selected SL grant is available via step 3.

Step 4: A UE may determine time and frequency locations where a PSCCH and a PSSCH are transmitted by using the selected SL grant.

Step 5: The selected SL grant may be configured as SL grant.

As described above, when retransmission is configured as HARQ-based retransmission, a method of selecting a transmission resource regarding another transmission opportunity considering the parameters N, K, and the like related to retransmission and HARQ ACK/NACK feedback in Example 5 may be used. When retransmission is configured as HARQ-based retransmission, a method of selecting a transmission resource via another method without applying the method provided at step 2 may be applied. According to the method of selecting a transmission resource via a method other than the method provided at step 2, a transmission resource may be selected via step 2 below as in a case where blind retransmission is configured even when retransmission is configured as HARQ-based retransmission (same as step 2 when blind retransmission is configured).

Step 2: When the idle resource is found from among the N resource candidates in the region of the energy detection by performing the energy detection on the section configured in the sensing window B, one transmission opportunity may be selected and the energy detection may be performed again. Here, when the idle resource is found from among the N resource candidates in the region of the energy detection, a transmission resource for the other transmission opportunity may be selected. Among the selected transmission opportunities, a transmission opportunity before in time may be used for initial transmission and a transmission opportunity after in time may be a transmission resource for sequential retransmission. Step 2 may be repeated to additionally select a transmission opportunity depending on the configured maximum number of retransmissions. Details about the method of selecting a resource via the energy detection in the sensing window B have been described above with reference to Example 4.

In other words, a method of selecting a transmission resource is the same for a case where retransmission is configured as blind retransmission and a case where retransmission is configured as HARQ-based retransmission. Here, when HARQ-based retransmission is configured, a reception UE is unable to transmit HARQ ACK/NACK feedback when a transmission resource is selected without considering a time gap to be considered for HARQ ACK/NACK feedback and retransmission. Also, a transmission UE does not expect to receive HARQ ACK/NACK feedback from the reception UE. As described above with reference to Examples 2 and 3, the transmission UE may select a transmission resource and transmit resource reservation information to the reception UE via SCI. Upon receiving the resource reservation information, the transmission UE may determine whether a time gap is guaranteed based on transmission time point information of initial transmission and retransmission included in an SCI field. Accordingly, the transmission UE is able to receive HARQ ACK/NACK feedback from the reception UE only when the selected transmission resource satisfies a time gap to be considered for HARQ ACK/NACK feedback and retransmission. When such a method is used, a method of selecting a transmission resource considering HARQ ACK/NACK feedback and retransmission in a resource selection window is not required to be considered, but when a transmission resource is selected such that the time gap to be considered for HARQ ACK/NACK feedback and retransmission is not satisfied, it may be impossible for the transmission UE to receive HARQ ACK/NACK feedback from the reception UE.

The following method of selecting a resource may be used when resource selection is performed regarding a plurality of MAC PDUs.

When retransmission is configured (when the configured number of retransmissions is not 0), a set of transmission opportunities regarding a plurality of MAC PDUs may be selected according to the number of reservations configured at an interval indicated by each reservation interval, based on a transmission opportunity (a resource regarding retransmission) different from one transmission opportunity (a resource regarding initial transmission) selected when the method of selecting a resource regarding one MAC PDU is applied. The sets may be distinguished depending on initial transmission and the configured number of retransmissions. The sets may be selected SL grant. Also, steps 4 and 5 described above may be performed.

When retransmission is not configured (when the configured number of retransmissions is 0), transmission opportunities regarding a plurality of MAC PDUs may be selected and one set regarding the transmission opportunities may be configured according to the number of reservations configured at an interval indicated by each reservation interval, based on one transmission opportunity (a resource regarding initial transmission) selected when the method of selecting a resource regarding one MAC PDU is applied. The set may be selected SL grant. Also, steps 4 and 5 described above may be performed.

Example 9

Example 9 of the disclosure includes a method of selecting a transmission resource when sensing is performed by using both a sensing window A and a sensing window B in Mode 2 and transmission resource selection is performed via the sensing. The sensing is performed in the sensing window B after resource candidates remaining in a resource selection window is reported to a higher layer of a UE as a sensing result in the sensing window A and the higher layer of the UE selects a resource candidate.

The following method of selecting a resource may be used when resource selection is performed regarding one MAC PDU.

Step 1: A resource candidate determined to be not effective to be allocated as a PSSCH transmission resource by using a sensing result of a sensing window A (refer to sensing in a sensing window A in Example 3) from among the number M of resource candidates capable of resource allocation based on resource pool information configured with a resource selection window (see the definition of a resource selection window in Example 3) is excluded to leave X (≤M)) resource candidates capable of resource allocation.

When the method of selecting a resource by the UE is configured to be random resource selection, a procedure of sensing and excluding a resource candidate may be omitted. In this case, X=M, an operation is not performed, and a procedure excluding step 1 in Example 6 may be performed.

Step 2: A resource candidate list including X resources may be reported to a higher layer of the UE. Then, the higher layer of the UE may randomly select transmission resources regarding Y transmission opportunities from among X candidates (Y<X). Although Y=1 is not excluded, when the size of Y is configured to be small, a resource candidate capable of sensing and resource selecting may be limited as described with reference to FIG. 10D in Example 4, and thus the size of Y may be guaranteed to be equal to or greater than a certain value. For example, X=0.2 M and Y=0.1 M.

Step 3: Energy detection (see sensing in a sensing window B in Example 4) may be performed on a section configured in the sensing window B to select a PSSCH transmission resource from among the number Y of resource candidates capable of resource allocation. Then, an idle resource may be searched for from among N resource candidates in a region of the energy detection. Here, an additional step of excluding a resource determined to be not effective by being occupied by another UE in the resource selection window, by performing SCI decoding and SL measurement in the sensing window B, may be included.

When retransmission is configured (when the configured number of retransmissions is not 0), a following operation may be performed. Here, the number of transmission opportunities additionally selected may be one or more depending on the configured maximum number of retransmissions.

When retransmission is configured to be blind retransmission, step 4 below may be performed.

Step 4: When the idle resource is found from among the N resource candidates in the region of the energy detection by performing the energy detection on the section configured in the sensing window B, one transmission opportunity may be selected and the energy detection may be performed again. Here, when the idle resource is found from among the N resource candidates in the region of the energy detection, a transmission resource for the other transmission opportunity may be selected. Among the selected transmission opportunities, a transmission opportunity before in time may be used for initial transmission and a transmission opportunity after in time may be a transmission resource for sequential retransmission. Step 2 may be repeated to additionally select a transmission opportunity depending on the configured maximum number of retransmissions. Details about the method of selecting a resource via the energy detection in the sensing window B have been described above with reference to Example 4. In Example 4, as described with reference to FIG. 10D, a resource candidate capable of sensing and resource selecting may be limited when the size of Y is configured to be small.

When HARQ-based retransmission is configured as the retransmission, step 4 may be performed.

Step 4: When the idle resource is found from among the N resource candidates in the region of the energy detection by performing the energy detection on the section configured in the sensing window B, one transmission opportunity may be selected. Then, the transmission resource may be selected considering parameters N, K, and the like related to retransmission and HARQ ACK/NACK feedback in Example 5. In particular, the energy detection may be performed at a time point when a transmission time point of another transmission opportunity is satisfied, and a transmission resource for another transmission opportunity may be selected when the idle resource is found from among the N resource candidates in the region of the energy detection. Among the selected transmission opportunities, a transmission opportunity before in time may be used for initial transmission and a transmission opportunity after in time may be a transmission resource for sequential retransmission. Step 2 may be repeated to select an additional transmission opportunity depending on the configured maximum number of retransmissions. Details about the method of selecting a resource via the energy detection in the sensing window B have been described above with reference to Example 4. In Example 4, as described with reference to FIG. 10D, a resource candidate capable of sensing and resource selecting may be limited when the size of Y is configured to be small.

Step 5: The selected transmission opportunities may be selected as SL grant.

When retransmission is not configured (when the configured number of retransmissions is 0), steps 4 and 5 below may be performed.

Step 4: When the idle resource is found from among the N resource candidates in the region of the energy detection by performing the energy detection on the section configured in the sensing window B, one transmission opportunity may be selected. Details about the method of selecting a resource via the energy detection in the sensing window B have been described above with reference to Example 4.

Step 5: The selected one transmission opportunity may be selected as SL grant.

The following operations may be performed when the selected SL grant is available via step 3

Step 6: A UE may determine time and frequency locations where a PSCCH and a PSSCH are transmitted by using the selected SL grant.

Step 7: The selected SL grant may be configured as SL grant.

As described above, when retransmission is configured as HARQ-based retransmission, a method of selecting a transmission resource regarding another transmission opportunity considering the parameters N, K, and the like related to retransmission and HARQ ACK/NACK feedback in Example 5 may be used. When retransmission is configured as HARQ-based retransmission, a method of selecting a transmission resource via another method without applying the method provided at step 4 may be applied. According to the method of selecting a transmission resource via a method other than the method provided at step 4, a transmission resource may be selected via step 4 below as in a case where blind retransmission is configured even when retransmission is configured as HARQ-based retransmission (same as step 4 when blind retransmission is configured).

Step 4: When the idle resource is found from among the N resource candidates in the region of the energy detection by performing the energy detection on the section configured in the sensing window B, one transmission opportunity may be selected and the energy detection may be performed again. Here, when the idle resource is found from among the N resource candidates in the region of the energy detection, a transmission resource for the other transmission opportunity may be selected. Among the selected transmission opportunities, a transmission opportunity before in time may be used for initial transmission and a transmission opportunity after in time may be a transmission resource for sequential retransmission. Step 2 may be repeated to additionally select a transmission opportunity depending on the configured maximum number of retransmissions. Details about the method of selecting a resource via the energy detection in the sensing window B have been described above with reference to Example 4. In Example 4, as described with reference to FIG. 10D, a resource candidate capable of sensing and resource selecting may be limited when the size of Y is configured to be small.

In other words, a method of selecting a transmission resource is the same for a case where retransmission is configured as blind retransmission and a case where retransmission is configured as HARQ-based retransmission. Here, when HARQ-based retransmission is configured, a reception UE is unable to transmit HARQ ACK/NACK feedback when a transmission resource is selected without considering a time gap to be considered for HARQ ACK/NACK feedback and retransmission. Also, a transmission UE does not expect to receive HARQ ACK/NACK feedback from the reception UE. As described above with reference to Examples 2 and 3, the transmission UE may select a transmission resource and transmit resource reservation information to the reception UE via SCI. Upon receiving the resource reservation information, the transmission UE may determine whether a time gap is guaranteed based on transmission time point information of initial transmission and retransmission included in an SCI field. Accordingly, the transmission UE is able to receive HARQ ACK/NACK feedback from the reception UE only when the selected transmission resource satisfies a time gap to be considered for HARQ ACK/NACK feedback and retransmission. When such a method is used, a method of selecting a transmission resource considering HARQ ACK/NACK feedback and retransmission in a resource selection window is not required to be considered, but when a transmission resource is selected such that the time gap to be considered for HARQ ACK/NACK feedback and retransmission is not satisfied, it may be impossible for the transmission UE to receive HARQ ACK/NACK feedback from the reception UE.

The following method of selecting a resource may be used when resource selection is performed regarding a plurality of MAC PDUs.

When retransmission is configured (when the configured number of retransmissions is not 0), a set of transmission opportunities regarding a plurality of MAC PDUs may be selected according to the number of reservations configured at an interval indicated by each reservation interval, based on a transmission opportunity (a resource regarding retransmission) different from one transmission opportunity (a resource regarding initial transmission) selected when the method of selecting a resource regarding one MAC PDU is applied. Sets may be distinguished depending on initial transmission and the configured number of retransmissions. The sets may be selected SL grant. Also, Steps 6 and 7 described above may be performed.

When retransmission is not configured (when the configured number of retransmissions is 0), transmission opportunities regarding a plurality of MAC PDUs may be selected and one set regarding the transmission opportunities may be configured according to the number of reservations configured at an interval indicated by each reservation interval, based on one transmission opportunity (a resource regarding initial transmission) selected when the method of selecting a resource regarding one MAC PDU is applied. The set may be selected SL grant. Also, Steps 6 and 7 described above may be performed.

Example 10

A method of selecting a resource when blind retransmission and HARQ feedback-based retransmission are simultaneously configured and used in Mode 2 will be described in Example 10 of the disclosure. As described above, retransmission considered in NR SL includes blind retransmission in which retransmission is performed without based on HARQ feedback information and HARQ feedback-based retransmission in which retransmission is performed based on HARQ ACK/NACK feedback. The use of these two retransmissions may be distinguished by a transmission type. First, only the blind retransmission may be used because HARQ feedback is not supported in broadcast communication. On the other hand, because HARQ feedback is supported in unicast or groupcast communication, one of the blind retransmission and HARQ feedback-based retransmission may be configured and used. Generally, blind retransmission and HARQ feedback retransmission are not required to be simultaneously configured and used. Accordingly, a case in which the blind retransmission is configured and a case in which HARQ feedback-based retransmission is configured are separately described. However, a case in which the blind retransmission and the HARQ feedback-based retransmission are simultaneously configured and used will be described.

In the case in which the blind retransmission and the HARQ feedback-based retransmission are simultaneously configured and used, when maximum four retransmissions are allowed, the blind retransmission may be used up to two retransmissions and additional retransmission may be determined based on HARQ feedback. In other words, whether to perform the additional retransmission may be determined based on a HARQ feedback result. The blind retransmission may be performed up to first two retransmissions and when NACK is continuously received, additional HARQ feedback-based retransmission may be performed or two blind retransmissions may be performed. Generally, the number of blind retransmissions and the number of HARQ feedback-based retransmissions may be configured. When the number of blind retransmissions is configured to be A and the number of HARQ feedback-based retransmissions is configured to be B, when maximum 4 retransmissions are allowed, A and B may be configured as follows: A=0, B=4; A=1, B=1; A=1, B=2; and A=2, B=0.

A=0 denotes a case in which the blind retransmission is off, A=1 denotes a case in which the blind retransmission is performed two times consecutively, and A=2 denotes a case in which the blind retransmission is performed four times consecutively. Also, B=1 denotes a case in which HARQ feedback-based retransmission is off and B=1 denotes a case in which after the blind retransmission is performed two times first, it is determined whether to perform the blind retransmission two times after, based on HARQ feedback. Also, B=2 denotes a case in which after the blind retransmission is performed two times first, third and fourth retransmissions are determined based on HARQ feedback. Also, B=4 denotes a case in which four retransmissions are all determined based on HARQ feedback. However, embodiments of the disclosure are not limited thereto. In the blind retransmission, a time gap between a previous transmission time point and a retransmission time point is not limited, but when the HARQ feedback-based retransmission is performed, the time gap between the previous transmission time point and the retransmission time point needs to be guaranteed considering the parameters N, K, and the like related to retransmission and HARQ ACK/NACK feedback in Example 5 described above. Accordingly, when resource selection is performed in the case in which the blind retransmission and the HARQ feedback-based retransmission are simultaneously configured and used, the resource selection needs to be performed such that the time gap between the previous transmission time point and the retransmission time point is guaranteed in the HARQ feedback-based retransmission. This may be applied to transmission methods of Mode 1 and Mode 2. When the resource selection is not supported such that the time gap between the previous transmission time point and the retransmission time point is not guaranteed in the HARQ feedback-based retransmission, a transmission UE may be unable to receive HARQ ACK/NACK feedback from a reception UE. In particular, the reception UE does not transmit the HARQ ACK/NACK feedback when a selected resource does not guarantee the time gap between the previous transmission time point and the retransmission time point. Also, the transmission UE does not expect to receive HARQ ACK/NACK feedback from the reception UE. The reception UE may signal transmission time point information of the selected resource via SCI and may determine whether to transmit HARQ ACK/NACK feedback.

Example 11

Figure 16:
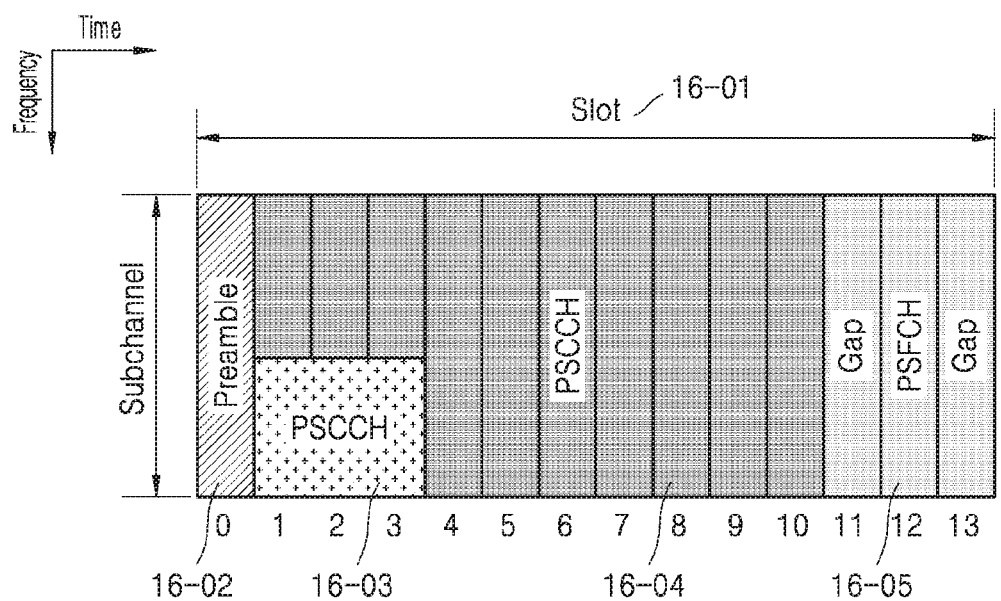
FIG. 16 is a diagram of a mapping structure of physical channels mapped to one slot in sidelink, according to an embodiment.

FIG. 16 is a diagram of a mapping structure of physical channels mapped to one slot in SL, according to an embodiment.

Referring to FIG. 16, a preamble signal 16-02 may be transmitted from one or more symbols before a transmission UE transmits a corresponding slot 16-01. The preamble signal 16-02 may be used for a reception UE to correctly perform AGC for adjusting strength of amplification when amplifying power of a reception signal. A method of repeatedly transmitting a signal of another channel instead of the preamble signal 16-02 from one or more symbols before the transmission UE transmits the corresponding slot 16-01 for AGC may be considered. Here, the repeated signal of the other channel may be a part of a PSCCH symbol or PSSCH symbol. However, when the preamble signal 16-02 is used instead of performing AGC via such a method, AGC performing time may be further reduced. When the preamble signal 16-02 is transmitted for AGC, a certain sequence may be used for the preamble signal 16-02, and at this time, a sequence such as PSSCH DMRS, PSCCH DMRS, or CSI-RS may be used for a preamble. In the disclosure, the sequence used for a preamble is not limited thereto. However, PSSCH DMRS may be appropriate for a preamble sequence. In particular, because PSSCH DMRS is transmitted from all frequency domains where a PSCCH is transmitted, compared to other alternatives, it may be easy to copy a DMRS sequence of a region where a PSSCH is actually transmitted and use the DMRS sequence as a preamble sequence. In addition, according to FIG. 16, PSCCH 16-03 including control information is transmitted in initial symbols of a slot and PSSCH 16-04 scheduled by the control information of PSCCH 16-03 may be transmitted. A part of SCI ($1^{st}$ stage SCI) that is control information may be mapped and transmitted to PSCCH 16-03. Another part of SCI ($2^{nd}$ stage SCI) that is control information may be mapped and transmitted to PSSCH 16-04 together with data information. Also, in FIG. 16, a PSFCH 16-05 that is a physical channel transmitting feedback information is located at a last portion of the corresponding slot 16-01. A gap of certain time may be secured between PSSCH 16-04 and PSFCH 16-05 for a UE that transmits or receives PSSCH 16-04 to prepare to receive or transmit PSFCH 16-05. Also, a gap of certain time may be secured after transmission/reception of PSFCH 16-05.

Figure 14:
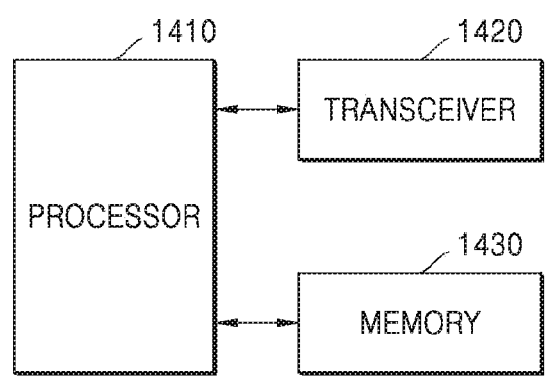
FIG. 14 is a block diagram of an internal structure of a UE, according to an embodiment.

FIG. 14 is a block diagram of an internal structure of a UE, according to an embodiment.

In particular, as shown in FIG. 14, the UE may include a processor 1410, a transceiver 1420, and a memory 1430.

However, the components of the UE are not limited thereto. The UE may include more or fewer components than those described above. The processor 1410, the transceiver 1420, and the memory 1430 may be implemented on one chip. The transceiver 1420 and the processor 1410 operates according to a communication method of the UE described above.

The transceiver 1420 may transmit or receive a signal to or from the UE. Here, the signal may include control information and data. In this regard, the transceiver 1420 may include a RF transmitter for up-converting and amplifying a frequency of a transmitted signal, and a RF receiver for amplifying low-noise and down-converting a frequency of a received signal. However, this is only an embodiment of the transceiver 1420 and components of the transceiver 1420 are not limited to the RF transmitter and the RF receiver.

Also, the transceiver 1420 may receive and output, to the processor 1410, a signal through a wireless channel, and transmit a signal output from the processor 1410 through the wireless channel.

The processor 1410 may control a series of processes such that the UE operates as described above. The processor 1410 may configure a resource for SL communication. The processor 1410 may self-configure the resource for SL communication, based on information received from the base station via the transceiver 1420, or may be allocated with resource configuration from the base station.

The memory 1430 may store a program and data required for operations of the UE. Also, the memory 1430 may store control information or data included in a signal obtained by the UE. The memory 1430 may include a memory configured of a storage medium, such as read-only memory (ROM), random access memory (RAM), a hard disk, a CD-ROM, and a DVD, or a combination of storage media. Also, the memory 1430 may be configured in a plurality of memories.

Figure 15:
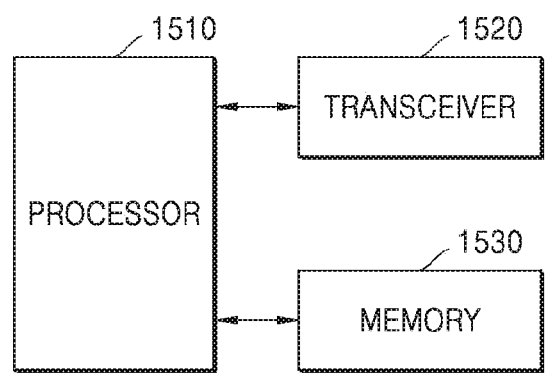
FIG. 15 is a block diagram of an internal structure of a base station, according to an embodiment.

FIG. 15 is a block diagram of an internal structure of a base station, according to an embodiment.

As shown in FIG. 15, the base station may include a processor 1510, a transceiver 1520, and a memory 1530.

However, the components of the base station are not limited thereto. The base station may include more or fewer components than those described above. In addition, the processor 1510, the transceiver 1520, and the memory 1530 may be implemented as a single chip.

The transceiver 1520 may transmit or receive a signal to or from a UE. The signal may include control information and data. In this regard, the transceiver 1520 may include a RF transmitter for up-converting and amplifying a frequency of a transmitted signal, and a RF receiver for amplifying low-noise and down-converting a frequency of a received signal. Also, the transceiver 1520 may receive and output, to the processor 1510, a signal through a wireless channel, and transmit a signal output from the processor 1510 through the wireless channel.

The processor 1510 may control a series of processes such that the base station operates as described above. The processor 1510 may receive a data signal including a control signal through the transceiver 1520 and determine a result of receiving the data signal. When the UE is in a camp-on state, the processor 1510 may transmits SL SIB to the UE and upon receiving a transmission resource request for SL communication from the UE, may transmit DCI including scheduling information to the UE via a PDCCH, based on the received transmission resource request.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

A method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a user equipment (UE), the method comprising:
 identifying information for a resource pool;
 identifying a resource allocation mode;
 identifying physical sidelink feedback channel (PSFCH) information, wherein the PSFCH information includes information for a PSFCH period; and
 performing a resource selection for transmission, by the UE, based on the information for the PSFCH period, a time required for PSFCH reception and decoding, and a time for retransmission preparation, in case that the resource allocation mode is resource allocation mode 2, and
 wherein a time interval associated with the resource selection for transmission is defined as [n+T1, n+T2], where the TI is associated with a processing time for selection of a resource for transmission, and the T2 is associated with a packet delay budget.

2. The method of claim 1, wherein the resource for transmission is selected further based on a time offset between a physical sidelink channel and the PSFCH.

3. The method of claim 1, wherein the resource for transmission is selected on the resource pool.

4. The method of claim 1, wherein the PSFCH information is associated with the resource pool.

5. A user equipment (UE) in a wireless communication system, the UE comprising:
 a transceiver; and
 at least one processor coupled to the transceiver and configured to:
 identify information for a resource pool,
 identify a resource allocation mode,
 identify physical sidelink feedback channel (PSFCH) information, wherein the PSFCH information includes information for a PSFCH period, and
 perform a resource selection for transmission, by the UE, based on the information for the PSFCH period, a time required for PSFCH reception and decoding, and a time for retransmission preparation, in case that the resource allocation mode is resource allocation mode 2, and
 wherein a time interval associated with the resource selection for transmission is defined as [n+T1, n+T2], where the TI is associated with a processing time for selection of a resource for transmission, and the T2 is associated with a packet delay budget.

6. The UE of claim 5, wherein the resource for transmission is selected further based on a time offset between a physical sidelink channel and the PSFCH.

7. The UE of claim 5, wherein the resource for transmission is selected on the resource pool.

8. The UE of claim 5, wherein the PSFCH information is associated with the resource pool.

9. A method performed by a base station, the method comprising:
 transmitting information for a resource pool,
 wherein physical sidelink feedback channel (PSFCH) information is identified by a user equipment (UE), the PSFCH information comprising information for a PSFCH period,
 wherein a resource selection for transmission is performed by the UE, based on the information for the PSFCH period, a time required for PSFCH reception and decoding, and time for the retransmission preparation, in case of resource allocation mode 2, and
 wherein a time interval associated with the resource selection for transmission is defined as [n+T1, n+T2], where the TI is associated with a processing time for selection of a resource for transmission, and the T2 is associated with a packet delay budget.

10. The method of claim 9, wherein the resource for transmission is selected further based on a time offset between a physical sidelink channel and the PSFCH.

11. The method of claim 9, wherein the resource for transmission is selected on the resource pool.

12. The method of claim 9, wherein the PSFCH information is associated with the resource pool.

13. A base station in a wireless communication system, the base station comprising:
 a transceiver; and
 at least one processor coupled to the transceiver and configured to transmit information for a resource pool,
 wherein physical sidelink feedback channel (PSFCH) information is identified by a user equipment (UE), the PSFCH information comprising information for a PSFCH period,
 wherein a resource selection for transmission is performed by the UE, based on the information for the PSFCH period, a time required for PSFCH reception and decoding, and time for retransmission preparation, in case of resource allocation mode 2, and
 wherein a time interval associated with the resource selection for transmission is defined as [n+T1, n+T2], where the TI is associated with a processing time for selection of a resource for transmission, and the T2 is associated with a packet delay budget.

14. The base station of claim 13, wherein the resource for transmission is selected further based on a time offset between a physical sidelink channel and the PSFCH.

15. The base station of claim 13, wherein the resource for transmission is selected on the resource pool.

16. The base station of claim 13, wherein the PSFCH information is associated with the resource pool.

* * * * *